United States Patent [19]

Rutherford Jr.

[11] Patent Number: 4,831,521
[45] Date of Patent: May 16, 1989

[54] VITAL PROCESSOR IMPLEMENTED WITH NON-VITAL HARDWARE

[75] Inventor: David B. Rutherford Jr., Rochester, N.Y.

[73] Assignee: General Signal Corporation, Stamford, Conn.

[21] Appl. No.: 550,693

[22] Filed: Nov. 10, 1983

[51] Int. Cl.[4] .......................................... G06F 11/10
[52] U.S. Cl. ................................ 364/200; 364/264.1; 364/266.4; 364/259.2; 364/259.4
[58] Field of Search ... 364/200 MS File, 900 MS File, 364/300

[56] References Cited

U.S. PATENT DOCUMENTS

| Re. 30,986 | 6/1982 | Sibley | 235/92 T |
|---|---|---|---|
| 3,319,226 | 5/1967 | Mott et al. | 364/200 |
| 3,370,274 | 2/1968 | Kettley et al. | 364/200 |
| 3,372,382 | 3/1968 | Newman | 364/200 |
| 3,505,648 | 9/1966 | McGovern et al. | 364/200 |
| 3,930,236 | 12/1975 | Ferguson et al. | 364/200 |
| 4,079,455 | 3/1978 | Ozga | 364/200 |
| 4,118,776 | 10/1978 | Isomura | 364/474 |
| 4,142,243 | 2/1979 | Bishop et al. | 364/900 |
| 4,149,244 | 4/1979 | Anderson et al. | 364/200 |
| 4,212,076 | 7/1980 | Conners | 364/706 |
| 4,215,399 | 7/1980 | Pavicic et al. | 364/101 |
| 4,244,019 | 1/1981 | Anderson et al. | 364/200 |
| 4,251,885 | 2/1981 | Dodt et al. | 371/60 |
| 4,312,068 | 1/1982 | Goss et al. | 371/37 |
| 4,323,964 | 4/1982 | Gruner | 364/200 |
| 4,347,608 | 8/1982 | Appiano et al. | 371/16 |
| 4,355,390 | 10/1982 | Hellwig et al. | 371/21 |
| 4,357,678 | 11/1982 | Davis | 364/900 |
| 4,358,849 | 11/1982 | Sery | 371/53 |
| 4,368,532 | 1/1983 | Imazeki et al. | 371/21 |
| 4,368,534 | 1/1983 | Sibley | 371/53 |
| 4,412,280 | 10/1983 | Murphy et al. | 364/200 |
| 4,417,305 | 11/1983 | Berstis | 364/300 |
| 4,435,806 | 3/1984 | Segers et al. | 371/25 |
| 4,471,486 | 9/1984 | Sibley | 371/53 |
| 4,566,105 | 1/1986 | Oisel et al. | 371/37 |
| 4,571,724 | 2/1986 | Belmondo et al. | 371/25 |

FOREIGN PATENT DOCUMENTS 0036605  9/1981  European Pat. Off. .
0108655  5/1984  European Pat. Off. .
0112676  7/1984  European Pat. Off. .

OTHER PUBLICATIONS

Von Linde et al., "Computers Can Now Perform Vital Functions Safely", *Railway Gazette International*, Nov. 1979, pp. 1004–1007.

(List continued on next page.)

*Primary Examiner*—Gareth D. Shaw
*Assistant Examiner*—Christina M. Eakman
*Attorney, Agent, or Firm*—Pollock, Vande Sande & Priddy

[57] ABSTRACT

A method and apparatus for effecting vital functions notwithstanding the fact that non-vital hardware is employed. A vital processor is implemented using non-vital hardware in the form of a digital computer which may for example be a microprocessor. The vital processor accepts binary input values and, based on a series of logical expressions relating output values to input values, determines the appropriate output values. Rather than employing a single bit to represent the condition of a particular input or output, unique multibit binary values or names are used. Each input or output has assigned to it at least two unique multibit values, each satisfying the code rules of a different code. Thus rather than representing a closed contact as a single 1 bit, and an open contact as a single 0 bit, the closed contact is represented by a unique multibit name which satisfies the code rules of a first code. At any point in the processing the value representing the contact can be checked to see if it satisfies the code rules, and if it does not a potential error is detected and handled. Although it is highly unlikely that a hardware failure would result in generating one of the few multibit names satisfying the code rule, that occurrence is not unlikely enough to be considered vital. Before actually controlling output devices in accordance with the processing, further tests are implemented which ensure that the multibit value computed for a particular output not only satisfies the predetermined code rule which is required, but is also correct bit for bit. Logic equations describing the relationship between output and input are actually computed using the multibit values as opposed to single bit values.

17 Claims, 16 Drawing Sheets

OTHER PUBLICATIONS

Paul, "Signalling Turns to Microelectronics", *Modern Railroads*, Oct. 1981, pp. 27-30.
Wobig et al., "Process Computational Systems with Fail-Safe Behavior", translated from *Signal and Draht* 66(1974)11, pp. 211-218.
"Use of Electronics Components in Signalling", Report No. 9, produced by office for Research and Experiments of the Int. Union of Railways, Oct. 1975.
Cribbens et al., "The Microprocessor as a Railway Control System Component", *Microprocessor*, vol. 1, No. 1, Sept. 1976, pp. 41-47.
Avizienis, "Fault-Tolerant Systems", *IEEE Transaction on Computers*, vol. c-25, No. 12, Dec. 1976, pp. 1304-1312.
Schwier et al., *Examples of the Future Use of Microprocessors on the DB*.
"British Rail Gets Cheaper Signalling", *International Railway Journal*, Aug. 1961, pp. 30-32.
Cribbens et al., *An experimental Application of Microprocessors to Railway Signalling*, published by the IEE, 1978.
Kewney, "Microprocessors Don't Always Work", *New Scientist*, May 18, 1978, pp. 454-455.
Short, *The Design of Fail-Safe Processor Systems*, published by The Institution of Railway Signal Engineers.
Okumura, "Electronic Interlocking to be Tried in Japan", *Railway Gazette International*, Dec., 1980, pp. 1043-1046.
Sibley, *Safety Assurance Logic*, presented at American Public Transit Association Annual Rapid Transit Conference, June 1982.
Sibley, *Safety Assurance Logic-Using Microprocessors Vitally*, presented at Annual Meeting of the Assoc. of American Railroads, Oct. 5, 1981.
Bhargava, "Forward Error Corrections Schemes for Digital Communications", *IEE Communications Magazine*, Jan. 1983, pp. 11-19.
Greenberg, "Control Word Error Correction", *IBM Technical Disclosure Bulletin*, vol. 13, No. 5, Oct. 1970, pp. 1357-1358.
Glickstein, "Weighted Checksum to Detect and Restore Altered Bit(s) in Computer Memory", *IBM Tech. Discl. Bulletin*, vol. 13, No. 10, Mar. 1971, pp. 3146-3147.
Zick, "Two-Mode Storage Protection Mechanisms" *IBM Technical Discl. Bulletins*, vol. 19, No. 2, Jul. 1976, p. 425.
Vermot-Gaughy, "Program Checking Method", *IBM Technical Discl. Bulletin*, vol. 14, No. 10, Mar. 1972, pp. 3187-3188.
Crandell et al., "Dynamic Self-Checking for a Read-Only Storage", *IBM Tech. Discl. Bulletin*, vol. 19, No. 8, Jan. 1977, pp. 2868-2869.
Graf; Radio Shack Dictionary of Electronics; pp. 81, 96, 819; Indianapolis, Ind.; 1962.

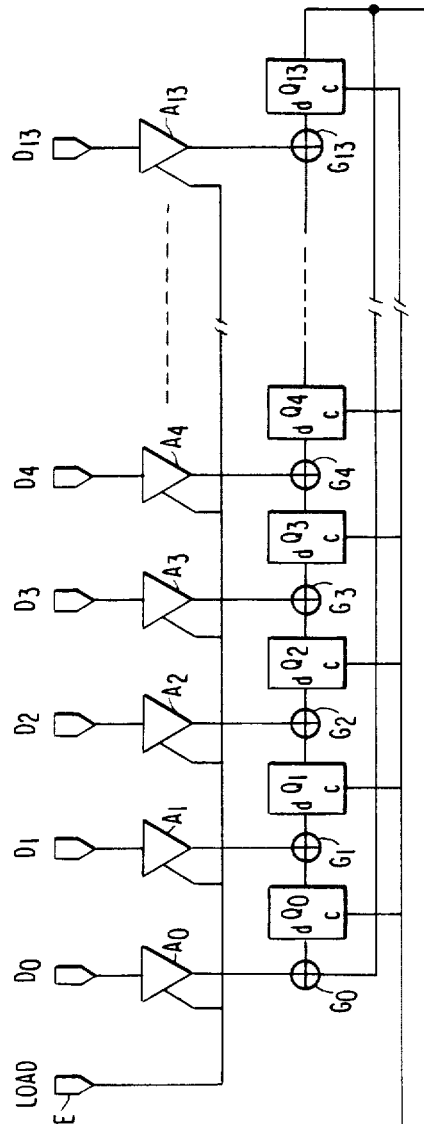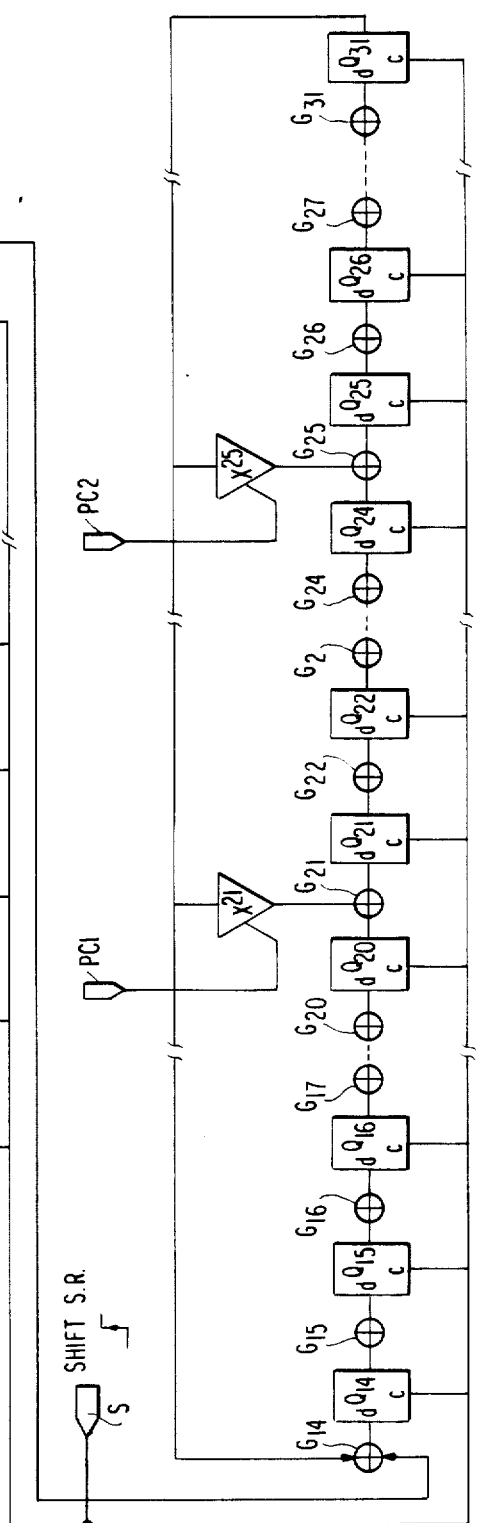
FIG. 10

FIG. 11

```
              DINADS HEAD BLOCK  (DIHEAD)
OFFSET     CONTENTS
   0       # DIRECT INPUT PORTS  (USED AND UNUSED)
   2       # INPUT PORT GROUPS ( 1 GROUP = 16 PORTS )
   4       CH2 RAM OFFSET ( OFFSET FROM CH1BPT )
   6       <DIN> BUFFER SIZE ( IN WORDS )
   8       <DIN> START ADDRESS ( OFFSET FROM RAMSTART )
   A       <DINA> START ADDRESS ( OFFSET FROM RAMSTART )
   C       <DINB> START ADDRESS ( OFFSET FROM RAMSTART )
   E       <TEMPI> START ADDRESS ( OFFSET FROM RAMSTART )
  10       KIO  (LO)
  12       KIO  (HI)
  14       KIO' (LO)
  16       KIO' (HI)
  18       KIA  (LO)
  1A       KIA  (HI)
  1C       KIA' (LO)
  1E       KIA' (HI)
  20       KIB  (LO)
  22       KIB  (HI)
  24       KIB' (LO)
  26       KIB' (HI)
  28       KIT  (LO)
  2A       KIT  (HI)
  2C       KIT' (LO)
  2E       KIT' (HI)
  30       PREIN (LO)
  32       PREIN (HI)
  34       PREIA (LO)
  36       PREIA (HI)
  38       PREIB (LO)
  3A       PREIB (HI)
  3C       PREIT (LO)
  3E       PREIT (HI)
  40       CKIADR  ADDR OF 1st SLOT IN <W> (MAIN) FOR 4 CHECKWORDS
  42       CKTM12  CHECKWORD ADDRESS IN <W> (MAIN)
  44       CKTM23  CHECKWORD ADDRESS IN <W> (MAIN)
  46       CKTM34  CHECKWORD ADDRESS IN <W> (MAIN)
```

DIGRXY
FIG.12

| OFFSET | CONTENTS |
|---|---|
| 0 | POINTER TO NEXT DIGRXY HEAD BLOCK |
| 2 | INPUT PORT GROUP X,Y BOARD ADDRESS |
| 4 | # OF PORTS IN GROUP X,Y |
| 6 | 2$^{nd}$ SUB-GROUP PORT TYPE | 1$^{st}$ SUB-GROUP PORT TYPE |
| 8 | PTR TO TOP OF SECTION X,Y IN <TEMPI> |
| A | PTR TO TOP OF SECTION X,Y IN <DIN> |
| C | PTR TO TOP OF SECTION X,Y IN <DINA> |
| E | PTR TO TOP OF SECTION X,Y IN <DINB> |
| 10 | PTR TO TOP OF DIS1XY DATA BLOCK |
| 12 | PTR TO TOP OF DIS2XY DATA BLOCK |
| 14 | PTR TO TOP OF TIL1XY DATA BLOCK |
| 16 | PTR TO TOP OF TIL2XY DATA BLOCK |

DIS1XY
FIG.13

| OFFSET | CONTENTS |
|---|---|
| 0 | (S0,X,Y) PORT TYPE | LOGICAL PORT # | #CYCLES OF FORGIVENESS | SIG. ORDER SR # |
| 2 | DI (S0,X,Y)(F)(LO) |
| 4 | DI (S0,X,Y)(F)(HI) |
| 6 | (S1,X,Y) PORT TYPE | LOGICAL PORT # | #CYCLES OF FORGIVENESS | SIG. ORDER SR # |
| 8 | DI1 (S1,X,Y)(F)(LO) |
| A | DI1 (S1,X,Y)(F)(HI) |
| C | (S2,X,Y) PORT TYPE | LOGICAL PORT # | #CYCLES OF FORGIVENESS | SIG. ORDER SR # |
| E | DI1 (S2,X,Y)(F)(LO) |
| 10 | DI1 (S2,X,Y)(F)(HI) |
| 12 | (S3,X,Y) PORT TYPE | LOGICAL PORT # | #CYCLES OF FORGIVENESS | SIG. ORDER SR # |
| 14 | DI1 (S3,X,Y)(F)(LO) |
| 16 | DI1 (S3,X,Y)(F)(HI) |
| 18 | (S4,X,Y) PORT TYPE | LOGICAL PORT # | #CYCLES OF FORGIVENESS | SIG. ORDER SR # |
| 1A | DI1 (S4,X,Y)(F)(LO) |
| 1C | DI1 (S4,X,Y)(F)(HI) |
| 1E | (S5,X,Y) PORT TYPE | LOGICAL PORT # | #CYCLES OF FORGIVENESS | SIG. ORDER SR # |
| | |
| 5C | DI1 (SF,X,Y)(F)(LO) |
| 5E | DI1 (SF,X,Y)(F)(HI) |

FIG.14

TILI (L,X,Y)

| OFFSET | CONTENTS | |
|---|---|---|
| | MSB (BIT 15) | LSB (BIT 0) |
| 0 | BIT 7 OF ALL DII(T) VALUES (L=15 TO L=0) | |
| 2 | BIT 6 OF ALL DII(T) VALUES (L=15 TO L=0) | |
| 4 | BIT 5 | |
| 6 | BIT 4 | |
| 8 | BIT 3 | |
| A | BIT 2 | |
| C | BIT 1 | |
| E | BIT 0 | |
| 10 | BIT 15 OF ALL DII(T) VALUES (L=15 TO L=0) | |
| 12 | BIT 14 | |
| 14 | BIT 13 | |
| 16 | BIT 12 | |
| 18 | BIT 11 | |
| 1A | BIT 10 | |
| 1C | BIT 9 | |
| 1E | BIT 8 | |
| 20 | BIT 23 OF ALL DII(T) VALUES (L=15 TO L=0) | |
| 22 | BIT 22 | |
| 24 | BIT 21 | |
| 26 | BIT 20 | |
| 28 | BIT 19 | |
| 2A | BIT 18 | |
| 2C | BIT 17 | |
| 2E | BIT 16 | |
| 30 | BIT 31 OF ALL DII(T) VALUES (L=15 TO L=0) | |
| 32 | BIT 30 | |
| 34 | BIT 29 | |
| 36 | BIT 28 | |
| 38 | BIT 27 | |
| 3A | BIT 26 | |
| 3C | BIT 25 | |
| 3E | BIT 24 | |

VITAL PROCESSOR IMPLEMENTED WITH NON-VITAL HARDWARE

DESCRIPTION

TECHNICAL FIELD

The present invention relates to apparatus and techniques for performing vital processing using both vital and non-vital hardware. The invention finds particular utility in the railroad industry to replace vital equipment used for safety purposes, although the invention is widely applicable where ever digital processing must exhibit vital or fail-safe characteristics.

BACKGROUND ART

In order to provide for rapid and orderly vehicle movement while at all times respecting the overall safety requirement, the railroad industry has evolved a control and communication system. The control problem can be analyzed in terms of sensing real time conditions in a region of the right of way (present vehicle position, direction of motion, and condition of equipment, such as switches, signals, etc.) and based on a set of pre-determined constraints imposed by the layout of the physical plant, determining what changes in equipment condition (e.g. switch position, signal condition, etc.) can be safely made to allow a vehicle to progress in its intended direction of motion. Once these decisions have been made, appropriate control signals are formulated and communicated to the actual physical plant to effect the desired changes.

Although safety is considered at every stage of information and communication processing, the railroad industry's perception and practice has been that satisfying the safety requirement at every stage in the process is unnecessary and unduly complicates the equipment. Accordingly, in practice it is only the field equipment, which translates commands into physical manifestations (throw switch, clear signal), which is designed to meet vital or fail-safe characteristics. At earlier stages in the information and communication processing, while safety is always considered, failures in equipment employed in this earlier stage of processing need not exhibit fail-safe or vital qualities. Rather, the vital or fail-safe characteristic is imposed at the very end of the control chain, e.g. at the signals and switches themselves. This has allowed the railroad industry to modernize the majority of their plant by the use, for example, of solid state circuits and digital processing without necessarily requiring that this modernized equipment exhibit vital qualities.

Nevertheless, imposition of vital design results in a vast quantity of expensive, relatively slow, bulky equipment. There is naturally a desire to eliminate these deleterious characteristics.

At the same time, the decrease in cost for digital processing equipment (e.g. the ubiquitous computer on a chip) has generated a strong desire to employ this very capable, space economical, power economical, decision making component. For a host of reasons, it has been impractical to require that the design of these microprocessors follow the vital design techniques evolved in the railroad industry over the last 100 years. Accordingly, the industry has been searching for some technique (particularly software) which could be used to transform the admittedly non-vital microprocessor into a vital system.

Solution to this problem would result in numerous advantages to the railroad industry. It would simultaneously allow the application of cheap, fast, space saving, power saving and very capable devices for replacing the bulky, slow, electromechnical vital devices which had been employed in the past.

Although control of a railroad or a portion thereof requires the solution of many different control problems, all these different problems can be generalized into a single set of characteristics. The requirements are:

1. Sensing inputs in real time (the majority of the inputs are digital in nature, and to the extent that there are any which are not digital in nature, they can be transformed into digital inputs);
2. Deriving from these real time inputs a set of real time outputs for the control of different components in the railroad plant; where
3. The relation between these inputs and outputs is defined by one or more logic equations which can be rigorously defined in advance.

It would be inadequate for such a device to be merely capable of vitally solving the equations referred to in item 3, because the vital characteristic has got to cover not only the solution of logic equations, but sensing of the inputs and checking that the outputs presented to the railroad plant are in fact those outputs which have been derived by the solution of the logic equations.

Others in the field have attempted solutions to this problem, with differing success; some of these solutions have applied traditional EDP techniques. These solutions include:

A. Providing two identical digital processors each executing an identical program and providing that the processors execute their identical program simultaneously in time by providing for synchronization therebetween, and finally providing some means for comparing the results produced by each of these processors (and in some instances, internal intermediate results as well);

B. Providing two different digital processors solving the same problem in two different fashions (two different programs). In this case there is no need for synchronization since the differences in processor and program characteristics necessarily result in differences in internal machine states; checking in this solution is only at the level of ultimate outputs.

An entirely different solution has been proposed for certain aspects of the problem related to communications. See, for example, Sibley U.S. patent application Ser. No. 273,299 filed June 15, 1981, entitled "Vital Communication System for Transmitting Multiple Messages", now U.S. Pat. No. 4,471,486. In this solution, it appears externally that there is only a single processor solving a single program; internally, however, in a time multiplexed fashion, the single program includes at least some diversity in that at least critical portions of the solution produce check words. The result of the single processor is provided in two forms, the first form is the outputs destined for the real world, and the second form is a series of check words which by their number and content perform a telltale function indicating the particular logic path followed by the program in the solution of the logic problem. Associated with the first processor (or vital processor) is a second processor (a vital driver); note that this is different from the solutions A and B noted above because the second processor is not at all concerned with the solution of any problem related to the real world environment. Rather, the purpose of the second processor is merely to review the number and content of the check words produced by the first processor. Only if the second processor indicates that the check words, by their number and content, verify the accurate execution by the first processor, will the real world outputs of the first processor be allowed to become effective. In order to close the loop, this solution has employed one or more techniques to verify that the input function has been performed vitally (that a closed contact, if present, is actually sensed, and that the representation within the first processor of this closed contact is indeed a representation of a closed contact) as well as checking that the potential outputs which the first processor indicates it will make effective if allowed, are in fact those outputs which flow from the solution of the logic equations by the first processor, e.g. is the output really dictated by the internal processes of the first processor, or does the output merely reflect a failed component?

Since the input information is essentially digital, as is the output, a very real difficulty is the need to verify that the single bit representation of this input which is being sensed or the output which is being checked, is appropriate; specifically that the input representation sensed by the machine, or the output representation being checked by the machine, has not been masked by a failure. Although all failure mechanisms have not been rigorously defined, two of the failure mechanisms which are well known are the "stuck bit" (where a bit is stuck in one of its two conditions) and the shorted terminal (where one terminal is shorted to another). Prior examples of techniques for overcoming these failure modes are illustrated in Sibley U.S. Pat. No. 4,365,164.

Another difficulty which must be overcome is a by-product of the presence within typical microprocessor systems of memory. The memory function presents at least two problems, data stored in the memory is going to be used in one or more intermediate processes, and even assuming that the data which had been stored in the memory was correct at some time in the past, how do we know that data is still valid when it is being used? Furthermore, and also assuming that the data which is stored in the memory was and is correct, how do we know that the data we have extracted from memory is the data which we desire, and is not the result of some failure in an addressing mechanism?

One solution to the second problem is described in co-pending U.S. patent application Ser. No. 241,819, filed Mar. 9, 1981, now U.S. Pat. No. 4,485,435, and assigned to the assignee of this application. This technique requires that once data has been used (or the last time it has been used) the data is destroyed. To ensure that data destruction has actually been carried out, each process which relies on the presence of current data includes an initialization routine solely for the purpose of checking that the data previously residue in the memory location, area or region, has in fact been destroyed. This initialization process produces one or more check words. The check words so produced are actuall shipped over to the vital driver (the other, or checking processor) and unless the check words are correct (proving that old data had previously been destroyed and the results being checked are truly the result of current data) the checking processor will not produce the correct result which will not allow application of the vital processors' outputs. The whole system is arranged so that disallowance of outputs produces an entirely safe condition (albeit not necessarily the most efficient condition—all signals to stop). Furthermore, the check word using technique is arranged such that neither the vital processor nor the vital driver has stored therein the "right" answer. The presence of the "right" answer stored somewhere in machine memory raises the possibility that the "right" answer will be derived from memory and not necessarily reflect the appropriate checks. Therefore, in this and all other uses of check words for verification techniques, we must assure that the "right" answer is not available to the machine except by the intended processing.

SUMMARY OF THE INVENTION

The invention provides a new solution for problems previously solved in the past, as well as providing solutions to those problems which have apparently been insoluble, all with a view toward providing vital characteristics in an admittedly non-vital digital processor.

The present invention is intended for application in an environment including five different elements. Two elements are input and output devices 1 and 2. The input devices 1 are arranged to provide appropriate input signals for processing, the input signals corresponding to that information which is necessary in order to produce the desired output information. The output devices 2 have two functions, firstly they translate the signals representing output information as provided by a primary processor 3 into appropriate format to actually control the physical devices. The output devices 2 are arranged so that they are conditionally controllable in response to output information from the primary processor 3 in such a fashion that they do not actually control real world devices, but in their conditionally controlled condition, can be checked to provide additional input information to the primary processor 3, this additional input information consists of sensing the actual condition of the output devices. The information is used by the primary processor 3 to derive check words which, by their content, allow a comparison to be effected between the conditionally controlled condition of the output devices 2 and the information produced by the primary processor corresponding to the desired condition. A third element of the invention is a primary processor 3, this can be a conventional microprocessor whichis provided with the software described hereinafter. The primary processor 3 has at least two different types of inputs, and two different types of outputs. One necessary input is provided by sensing the condition of the input devices 1. One type of output is information destined for conditional control of the output devices 2. The second form of input is determined by the conditionally controlled condition of the output devices 2. Finally, the second form of output is a time sequence of check words. Thus, software run by the primary processor, in addition to producing the information necessary to conditionally control the output devices 2, produces a sequence of check words which, by their number and content, perform a telltale function indicating the processing logic carried on by the primary processor 3.

The check words are destined for the fourth element, which is a vital relay driver 4 (or VRD). In implementation, the VRD 4 can be another microprocessor. Its sole function is to receive the stream of check words produced by the primary processor, and from that stream of check words, produce, if the check words by their number and content indicate faultless processing, a relatively unique signal which is not available in the apparatus from any other source. In an embodiment of the invention which has actually been constructed, this unique signal is a modulated square waveform of selected duty cycle, repetition and modulation rate. The unique signal is provided to a detector 5. The detector 5 merely responds to the repetition and modulation rate and duty cycle of the unique signal and produces a second relatively unique signal in the event that the repetition and modulation rate and duty cycle of the signal produced by the VRD 4 is (within some tolerance) what the detector 5 is designed to respond to. The second relatively unique signal, can for example be a particular DC voltage which is unavailable from the apparatus from any other source. This second relatively unique signal is provided to the output devices 2, and when so provided enables the conditional controlled output devices to actually control the real world physical devices.

A particular embodiment of the VRD 4 and detector 5 are described in co-pending application Ser. No. 550,431 filed herewith (now U.S. Pat. No. 4,553,200) and assigned to the assignee of this application, the disclosure of which is incorporated herein by reference.

Since vital operation depends on each component, the input and output devices as well as the detector 5 are constructed with vital techniques. The important characteristic of the invention is that the processor 3 (which must also exhibit vital characteristics) is made to exhibit those characteristics, not by its construction, but by the software which is run.

For the purpose of sensing inputs, and/or checking outputs, each input and/or output function is provided with a unique multi-bit name, a name which is different from the name used by any other output or input. The "name" is derived as follows. In order to sense the input and/or check the output (typically the condition of a contact—either closed or open) a sense circuit is provided for each such input and/or output. The sense circuit has two inputs and an output. One input to the sense circuit is the condition being sensed, e.g. the input or output. Another input is driven by a multi-bit signal. The sensing circuit is arranged such that if the condition being sensed is in one of its two states, the driving bit pattern at one input is reproduced at the output in its inverted sense, whereas if the condition being sensed is in its other state, then the output produces a null value. This arrangement satisfies the necessity for stuck bit prevention since the multi-bit driving pattern is a combination of 1's and 0's which will readily detect a "stuck bit". However, this potential solution itself present two additional problems.

Since one of our requirements is not to have the "right" answer stored anywhere in the machine, how do we generate the driving bit pattern to produce the unique name of the input or output, without having that unique bit pattern stored in the machine? The second problem relates to the representation of the condition being sensed when in its other state, e.g. we do not want to maintain any vital information as a null string. The invention solves these problems as follows.

The driving bit pattern for sensing inputs or verifying outputs is derived from a multi-conductor data bus. However, each different sense circuit is associated with a different conductor in the multi-conductor data bus. We drive the multi-conductor data bus with a sequence of multi-bit data units, each unit having a number of bits equal to the number of conductors in the bus. Accordingly, these data units are presented to the data bus in a time sequence, one after the other. However, since each sense circuit is connected to only one conductor of the data bus, each different sense circuit sees only one bit (and the corresponding bit) of each data unit. If the condition being monitored is in one state, the sense circuit produces an output which is the complement of its input, if the condition being sensed is in its other state, then the sense circuit produces a null value. The outputs of the sense circuits are placed back on the data bus and applied to a series of shift registers wherein each shift register is dedicated to a particular conductor of the data bus (and hence associated with a particular sense circuit). After applying a number of data units to the sense circuits equal in number to the length of each shift register, the shift registers are read out in parallel (or broadside), one after the other. This operation transposes the unit serial, bit parallel driving data to bit serial, unit parallel sensed data. The driving data units were presented from the machine memory in bit parallel, unit serial order. For each condition being sensed, the broadside output of the shift registers is now unit parallel, bit serial. The output of the shift registers is now stored in machine memory; as a result of this transposition the "name" of a particular condition or sensing circuit is not available to the machine. While the driving data bit pattern is stored in a table, since it is stored in a bit parallel, unit serial order, the name which is unit parallel, bit serial order, is not available.

The second problem is solved by actually assigning two names to each different input being sensed, or output being verified. Both names are unique, one is a "true" name and the other is a "false" name. The "false" name, since it will not be used except to establish a restrictive condition, need not be vital and thus can be stored and available to the processor. Each time the machine detects an input being sensed and/or output being verified which results in a null word, the "false" name for that function is substituted for the null value. Thus, we have solved both problems and now have a technique for sensing the binary condition of an input in a vital fashion resulting in a unique name for the "true" state of the binary condition as well as a unique name for the "false" state of the binary condition. As will be seen below, the uniqueness of these "names" can be used to verify that a data substitution has not been effected. Furthermore, because of the characteristics of each "name", it can be checked to determine that not only the sensing circuit, but all the other equipment in the chain producing the output of the sensing circuit is operating appropriately. To this end, each "name" is a code word in a set of code words. For example, in one embodiment of the invention, each "name" (true and false) has a bit length of 32 bits. This 32-bit length is broken up into three fields, the least significant bit indicates the binary condition, e.g. 1 or 0 (for true and false, respectively, this is the value bit or true/false bit). The next 13 bits are a unique 13-bit combination (the true combination is the complement of the false combination) and the last 18 bits are determined from the code rules to ensure that the entire word is one of a small set of 32-bit words complying with the code. This has a number of significant advantages. For example, conventional error detecting can be used to determine whether or not any 32-bit word is a valid code word, invalid code words may be the result of some error. If at any stage in the processing an invalid code word is detected, then the false designation for that word is substituted with two effects. Firstly, safety is not compromised (since the false word will result in a more restrictive condition and therefore satisfies vital requirements), and secondly, the substitution enables the subsequent processes to continue by ensuring that the results produced by processing produce valid code words themselves.

This describes a first "channel", for satisfying diversity we provide a second "channel" as follows. Each input being sensed, or output being checked has a second true/false name pair, also 32 bits long, but in this second channel, these names are part of a second, different, 32-bit code word set. Sensing of inputs and outputs is effected in both code sets, and some processing proceeds in parallel. This provides two levels or channels which can later be checked and if an error is determined at either level, the false or most restrictive word is substituted for the result.

Accordingly, we maintain a pair of buffers (one for each channel) in which we store words resulting from the sensing process. Before storing the words, we can effect a non-vital test on the sensed words to ensure that they are members of the appropriate code word set. Null words, or any other word which is not a member of the appropriate set, are converted to the corresponding false word for the associated function (function is another name for a particular input or output).

Because time is an important parameter in the control problem, we target the processor functioning to be effected in a unit time (in one embodiment of the invention this unit time was one second). Knowing this parameter, then we can judge the effect on safety of delaying the change in an input; clearly some are so time sensitive that any further delay cannot be tolerated. However, there are input functions in which further delay can be tolerated, for instance, signal lamp repeater inputs. For those inputs which can be delayed without comprising safety (we will call this parameter a forgiveness parameter), we can increase the reliability (not the safety) of the entire system. Since sensing a condition takes a definite amount of time (measured in milliseconds), we can expect that some sensed words will be corrupted not because of an error but merely because the condition being sensed has changed at some point during the actual sensing process. If that input was a critical determinant of a particular output, then the rules we have thus far proposed (substituting a false value for a corrupted value) may require changing the output until the input is correctly sensed. However, for those input functions which we can determine a priority not to have a significant time sensitive safety factor, we can build some forgiveness into the system by allowing it to use a previously, correctly sensed, value for some short period of time on the assumption that the condition causing the corruption in the sensing function will itself exist for a shorter period of time. To this end, we have identified an additional parameter related to each input function, called cycles of forgiveness, and thus we have in an embodiment of the invention actually constructed, functions with zero, one and two cycles of forgiveness (clearly use of three levels of forgiveness is not essential). To implement this, we triple the size of the buffer and partition it so that those functions with zero cycles of forgiveness directly load the buffer section (DIN) which will be used on the immediately succeeding cycle of processing. On the other hand, for functions which are defined as having one cycle of forgiveness, we may not load this section directly, but load a section (DIN B) one removed from that section which will immediately be used. Similarly, for functions with two cycles of forgiveness, we may not directly load either DIN or DIN B, but rather a third section (DIN A). We adopt the following rules. Whenever a function is accurately sensed, it is loaded into all three sections of the buffer, e.g. it is used immediately, and the other two buffer sections provide some "memory" for this function. If a function is sensed incorrectly and has at least one cycle of forgiveness, then the DIN buffer is not loaded with the false value produced as a result of the incorrect sensing. Rather, the DIN B or DIN A buffer is loaded (depending on whether the function has one or two cycles of forgiveness). At the end of any cycle, the contents of the DIN buffer is cleared, a check word is generated to prove that the clearing has been accomplished, the contents of the DIN B buffer are shifted down one section (to the DIN buffer), the DIN B buffer is cleared, another check word is generated to prove that this clearing has been accomplished, the contents of the DIN A buffer are shifted down to the DIN B buffer and the DIN A buffer is cleared, and finally another check word is generated to prove that the DIN A buffer has been cleared.

To ensure that a word intended for a specific buffer section (DIN A, DIN B, DIN) is not erroneously written or read from the wrong buffer, a constant unique to the buffer section is added to the word on writing such that a word in DIN A has the value WORD, whereas in DIN B, the identical word has the value WORD+A and in DIN the same word has the value WORD+A+B. Thus, if a word is erroneously read from DIN A or DIN B rather than DIN (or read from DIN A rather than DIN) then it will not have the expected value and as a consequence an error will be detected in subsequent processing (as will become apparent hereinafter).

Of course, the purpose for assembling all this information is to solve the control problem. The control problem is embodied in a set of logic equations, each relating a different output or function to one or more inputs and/or inputs and outputs. Each equation is in the form of a sum of one or more terms, each term itself is made up of the product of the value of different functions. The equations are evaluated in a specified order in the following fashion. An equation is selected for evaluation, and the first term is evaluated, this evaluation can either be true or false (evaluation of a term made up of a product of one or more functions is merely the logical product of the value bits of the different functions in the product); if false, the next term is evaluated and so on until a term is found which is true, making the function defined by the equation also true.

An example will illustrate. Assume we wish to evaluate the following equation defining the condition of an ouput N:

$$OF_N = IF_1.IF_3 + IF_7.IF_2 + IF_1.IF_2.IF_4.$$

Thus, the state of the output N ($OF_N$) is defined by three terms, term one is the product of inputs 1 ($IF_1$) and 3, term two is the product of inputs 2 and 7, and term three is the product of inputs 1, 2 and the inverse of input 4. If any evaluation of any term is a logic 1, then the output N is also a logic 1.

If no term is found making the function defined by the equation true, then the false word associated with that function is stored in the appropriate slot in an output buffer. This initial evaluation proceeds in a non-vital fashion by scanning the true/false bit of the value of each function in a term. In this fashion, the first term in an equation which is true is readily determined. Of course, if no term in the equation makes the function true, then the false value is assigned to the function and the false value is stored in the appropriate place in an output buffer.

Once the first term which makes the function defined by the equation, true, has been identified, then processing switches from non-vital to vital in the following fashion. Our assignment of "names" includes the output functions as well as the input functions. Our vital processing is arranged so that we actually "compute" the value of the output function from the present value of those functions in the term we have selected. This "computing" has unique or novel characteristics. We must be able to arrange the computation so that computation of the output function value in accordance with any term will produce the identical and predetermined result. As is described below, we rely on the finite state characteristic of a maximal length feedback shift register for this characteristic. The value of each function in the term which has been selected is "added" in a polynomial divider with the value of each other function in the term. The value of each function is determined by the value for the corresponding function in the DIN buffer. The result of this processing is the value assigned to the output function. By design, the value of the output function is a 32-bit code word in the first code set. The value of the output function can be checked non-vitally for validity at this point by ensuring that its value is truly one of the limited 32-bit code words in this first code set. After checking, it can be placed in an output buffer for later use. Since the output function must have an expected value which is identical regardless of the term in the equation which makes it true, the polynomial divider, employed in the "adding" process, is precharged with a unique quantity for each different term in the equation to ensure that regardless of the term employed, the output function will have the identical value.

Since this process or computing the value of an expression is an important characteristic of the invention, the requirements should be explained.

Since we have already assigned a "name" pair to each function, including the output functions whose value is to be computed, the result of the computation must be identical to the expected result; this characteristic can be relied upon in order to prove faultless operation. First, the result may be a member of the code set, and a test is made after the computation for this feature. While this is a non-vital test, the probability of incorrectly arriving at a result which is a member of the right code set is about $4 \times 10^{-6}$ (1 part in $2.6 \times 10^5$).

The vital test comes at a later stage when the computed result becomes a component in production of a check word using a similar technique. The checkword is tested for correctness by the VRD and failure of the test will prevent application of the resulting output to any real world device.

The actual computation is effected in a polynomial divider which includes a shift register with a controllable feedback network, particularly a feedback network making the feedback shift register capable of producing a maximum length sequence. Selecting the condition of the feedback network personalizes this divider to a particular code set. The computation is divided into an initialization function (which is performed once per computation) and a two-step sequence which is performed for each factor in the product being computed.

Once the shift register feedback network is personalized, an initializing constant is selected and loaded broadside into the shift register. The initializing constant has a bit length equal to the length of the shift register (although is is not essential), and there is a separate initializing constant for each term of each equation. Thus, selecting the correct initializing constant can only be effected once the term being computed has been identified. Once the initializing constant has been loaded into the shift register, the shift register is stepped a number of times I (1 bit shift per step). Because of the feedback network, the result is not a simple shift of the contents, but depends on both the bit pattern of the constant and the condition of the feedback network. The shifting concludes the initialization function.

The two step sequence effects the following functions:

(a) The factor to be "added" is added, modulo 2, to the shift register. This is an independent operation at each bit position, the bit in any shift register position is added, modulo 2 to the corresponding bit of the factor. Addition modulo 2 obeys these rules, $1+0=1$; $0+1=1$; $1+1=0$; and (b) This shift register is again stepped a number of times A (again one bit shift per step).

After the two step sequence is performed once after each factor, the result is the bit pattern in the shift register.

In an embodiment which has been constructed, the number of shifts I and A, are equal to each other and equal to nine. Both selections (I=A, and I=9, A=9) are arbitrary, so wide variations are possible. While we may eliminate shifting after the load (i.e. I may be equal to zero), however, the shifts after the "add" are desirable (i.e. A should be at least one). As implied herein, the embodiment constructed used a hardware shift register and feedback network. It is certainly conceivable that an equivalent operation could be carried out in software, eliminating the hardware requirements.

We also have values in the second channel buffer (values in a second code set) for each function in each term of the equation. Having selected the term in the equation which made the output true (for the first code set or channel), we employ the identical term, but using the values from the second code set (the second channel) and again evaluate the output function. The result, if valid, will be a code word for the output function in the second code set. We can then verify non-vitally that the function value is a valid code word in the second code set. If the output function does not have a value in both channels satisfying the code rules of the respective channels, then the output function is considered false and thus the false value for the function is assigned and loaded in the appropriate locations in the output buffer.

By now, the protection provided by this type of evaluation should be apparent. By prearrangement, evaluation of any function (a logical combination of input values) should produce a value unique to that function. The correct result (which is checked for by the VRD) can only occur (except at a vanishingly small probability) as a result of flawless processing. If an input word is garbled, it will probably not pass the non-vital test and be replaced by the false (or restrictive) name—a safe failure. Even if the garbled sensed word is a valid code word (improbable, but possible), or if a correctly sensed word is mis-read or mis-written, the failure will not (except in a miniscule number of cases) produce the identical word (bit for bit for 32 bits) which is required. Unless every one of the 32 bits is the expected value (in both channel 1 and channel 2), the function evaluation will not produce the expected result. While this may not affect processing in the primary processor 3, it will be caught at the VRD4 and prevent application of inaccurately computed results. The error could be detected if the computed result fails the (non-vital) test effected prior to writing the evaluation results to the result buffer.

While examples thus far discussed describe how output function values are determined from input function values, it is worth noting that output function values may also depend on other output function values. However, of course, an output function value cannot be computed until all factors defining that particular output function have themselves been either sensed or evaluated.

Accordingly, the preceding operations have vitally sensed inputs (both by using a multi-bit driving bit pattern to produce a unique name for each function where the correct name for the function is not stored anywhere in the machine, although the machine is capable of checking to ensure that the value of the function is one of a limited set of values); this sensing is performed in two different channels using two different code sets. The sensed value, after it is checked, is loaded in an appropriate buffer slot. The buffer is divided into two halves, one for each sensing channel, and each half is further subdivided into three sections. If the sensed value is not a member of the appropriate code set, the corresponding false value may be loaded in either one of the three sections, depending on a "cycles of forgiveness" parameter which is associated with each different function. For those functions which have non-zero cycles of forgiveness, buffer management provides for some "memory" of a previously sensed correct value. Provision is made for guarding against misreading the buffer section in the following fashion. After each cycle of processing is completed, the buffer section which is actually used in solution of the control problem is cleared (this clearing is effected vitally and a check word is generated to ensure that clearing has actually been accomplished). The immediately adjacent buffer section contents are then transferred to the just cleared buffer section, but a constant is added to each value in the transfer process. The buffer section just operated on is then also cleared in a vital fashion (again generating a check word to prove that it has been cleared). Thereafter, the contents of a next buffer section are again transferred to the just cleared buffer section, again adding a different constant, and finally the last processed buffer section is again vitally cleared. The use of the different constants ensures that misreading a buffer section will not go undetected for the value read will not be the value expected and the subsequent processing is arranged to ensure that an unexpected value will positively be detected.

The control problem is actually solved once the inputs are appropriately arranged through the use of a set of equations defining a value for each output function in terms of the sensed values and/or previously computed output functions. Each such equation is made up of a sum of terms, where each term in turn is made up of a product of different function values. The processing proceeds in stages. First, an equation is selected for evaluation, second, the first term in an equation is evaluated. This evaluation proceeds quickly in a non-vital fashion based on the true/false bit of each value. In this fashion, evaluation quickly selects the first term in an equation which makes the function defined by that equation true, or quickly determines that there is no term in the equation which makes the function true. In the latter case, the false value for the function is assigned to the function and that false value is stored in an appropriate section in an output buffer. If, on the other hand, the value of the function has non-vitally been determined to be true, then processing switches from a non-vital to a vital mode.

In the vital mode, each value in the term making the parameter true is "added" in a polynomial divider to each other value in the term. The result of this "addition" in the polynomial divider is a value for the output function. Since by design the value for the output function should be identical regardless of which term in the equation makes it true, the polynomial divider is precharged with a unique constant for each different term to ensure that processing will result in a single true value for the output function regardless of the term in the equation which makes the output function true. Furthermore, the values at the output functions are selected to be members of a small set of code words in the first code set. Based on this characteristic, we can check the value of the output function to ensure that it is indeed one of the small set of allowed code words. If it is not, then the false value for the function is assigned. If the output value for the function passes this check, then it is conditionally determined to be the correct value for the output function and is assigned to the appropriate slot in an output buffer.

Processing is not yet complete, since we have a second channel of data (in the first channel, the processing for which has just been discussed, each of the values is a code word in a first code), in the second channel all the values are code words in a second, different, code set.

Processing in this second channel proceeds as follows. We do not search the terms in the equation for one making the output function true in this second channel. Rather, we use the identical term as the one employed in the first channel processing. We extract the values for the functions in this particular term from the second half of the buffer (corresponding to the second channel) and these values are "added" in our polynomial divider. Prior to effecting the "addition" the polynomial divider had been previously "precharged" with a constant related to this particular term in the equation. The result should be a second unique value for the function which should be a code word in the second code set. After "addition" in the polynomial divider, the resulting value is checked to ensure that it is indeed a code word in the second code set. If it is, then this value is stored in an appropriate slot in an output buffer. On the other hand, if it turns out that the value so computed does not belong to this second code set, then an error has been detected. The false value is assigned to the parameter both for this second channel processing, as well as correcting the first channel processing by assigning the false value to the function for the first channel as well.

In a similar fashion, values for each of the functions defined by each of the other equations is similarly effected. At the conclusion of this processing, we have in the output buffer a succession of values for each output function.

It should be emphasized that while we require each function evaluation to produce a unique value, we have no way, at this point, of verifying that the unique value has really been computed. All we can determine at this point is that the parallel function evaluation (one in each channel) has produced values consistent with the respective code rules for the channel. Later processing will be used to verify that the values so computed are the unique expected values.

The output values are now transferred, at least conditionally as follows. The true/false bit of each channel 1 value is sampled non-vitally and the corresponding output bit is set accordingly. Because this is a non-vital transfer, the process must be checked to ensure that even at this late stage in the processing, we have not converted a false to a true or a true to a false. The checking proceeds as follows. The channel 1 and channel 2 expressions for each function are combined and the result of this combination is stored. This result will be employed in subsequent processing. What we want to assure is that we can detect an open contact (or an off output) for each output bit unless the combined channel 1 and channel 2 data allows the output bit to be true. Before describing this checking process, a brief word is in order about timing.

The time required in available equipment to perform this type of processing for a reasonable number of input and output values will take at least 0.5 seconds. We estimate the processing time for the solution of the control problem at a medium sized interlocking which has about 100 vital inputs, 125 vital outputs and 350 equations. However, within this even short period of time, the state of a relay can change (typical relay pick times are about 150 ms). Accordingly, if we are operating in a vital environment, we must ensure that a relay does not change state without being detected. Obviously, we cannot incorporate this protection within our minimal 0.5 second cycle time. To solve this problem, we divide the processing up into a main cycle, nominally 1 second in duration, and a plurality of rechecks (each less than 50 ms in duration and occurring every 50 ms) and thus there are 20 rechecks during a main cycle. It is during the recheck processing that the output function and checking takes place and actually the main cycle processing is fit in between the recheck process. In this fashion, the recheck processing is used every 50 ms to prove that those outputs in their permissible state are supported by the corresponding expressions in channel 1 and channel 2 being both evaluated as 'true'.

The main component in this recheck processing is in many respects similar to the processing described at input sensing. Each output bit is connected to a sense circuit (called an absence of current detector, or AOCD) and is driven by a 32-bit value. The output of the AOCD is the complement of the input if the output is off or false. Thus, null values are returned for output bits which are on. However, these bits must have expression results which allow them to be true.

Thus, after the recheck is completed we have evidence (in the form of check words) that can be used by the VRD to verify that for every output function conditionally in the 'true' state, our function values in both channels allow the true state, and that every other function is in the 'false' or non-permissive state.

Thus, the tentative values for output functions which have been computed are used along with the conditional condition of the output circuit to develop check words. These check words, if correct, indicate that both the computed value of the output as well as the condition of that output are both unique and in correspondence. Any other condition will be detected by the VRD 4 and not allow application of the output signals to the real world.

Thus, in accordance with one aspect, the invention provides:

data sensing apparatus for performing sensing of essentially binary data in a vital fashion, including:

a data bus with plural conductors, a memory maintaining a table of multi-bit data units for outputting to said data bus one or more of said multi-bit data units in bit parallel, unit serial order, a group drive circuit connecting different conductors of said data bus to different sense circuits, a plurality of sense circuits, one for each different input device, each with two inputs and an output, a first input of each sense circuit coupled to an input device, a second input of each sense circuit connected to said group drive circuit, said output coupled to a conductor of said data bus associated with said second input of said sense circuit, transposition means coupled to said data bus and responsive to signals placed thereon by said sense circuits for temporarily storing a sequence of received multi-bit data units equal in length to the multi-bit data units serially output by said memory means and for transposing the received multi-bit data units from bit parallel unit serial order to unit parallel, bit serial order.

The invention also provides:

A method of producing plural outputs for controlling plural elements in dependence on plural binary inputs, comprising the steps of:

(a) assigning each of said inputs first and second groups of binary digits, one of said groups representing a true state of the corresponding input and the other of said groups representing the false state of said input, said first and second 'groups being different from each other and different from all other groups of binary digits assigned to all other inputs, (b) assigning each of said outputs first and second groups of binary digits, one of said groups representing the true state of the corresponding output and the other group representing the false state of the corresponding output, said first and second groups being different from each other, different from all other binary groups assigned to all other outputs, and different from all binary groups assigned to all said inputs, such that a particular binary group not only represents the condition of the corresponding output but also serves to identify the corresponding output, (c) providing a set of equations relating each output to one or more of said inputs and none, one or more of said outputs, (d) testing said inputs and writing a group of binary digits, one for each input, selected from the groups assigned to said input in dependence on the result of testing of the input, (e) computing values for each of said outputs in accordance with said equations and said written groups of binary digits, (f) controlling said outputs in accordance with said computed value for the corresponding output, whereby the absence of fault is confirmed by said computed values for each output being identical to the assigned binary group corresponding to the controlled condition of the output.

The invention also provides:

A method of computing a multi-bit binary value of significance from two or more input multi-bit binary values comprising:
(a) providing a feedback shift register, with plural stages, arranged to provide maximal length sequences,
(b) preconditioning said feedback shift register by controlling each stage thereof to attain a condition identical to a corresponding bit of a predetermined bit pattern,
(c) shifting one of said input multi-bit binary values into said feedback shift register, and
(d) repeating said step (c) for each other of said input multi-bit binary values.

BRIEF DESCRIPTION OF THE DRAWINGS

The invention will now be further described in such detail as to enable those skilled in the art to make and use the same in the following portions of the specification when taken in conjunction with the attached drawings in which like reference characters identify identical apparatus and in which:

FIG. 10 is a similar figure illustrating the shift register and peripheral apparatus arranged to operate in the check mode;

FIGS. 11-14 illustrate the various tables of application data, including DIHEAD—FIG. 11; DIGRX-Y—FIG. 12, DIS1XY—FIG. 13 and TIL1(L,X,Y)—FIG. 14.

DETAILED DESCRIPTION OF PREFERRED EMBODIMENTS

Simplified Description

Figure 1A:
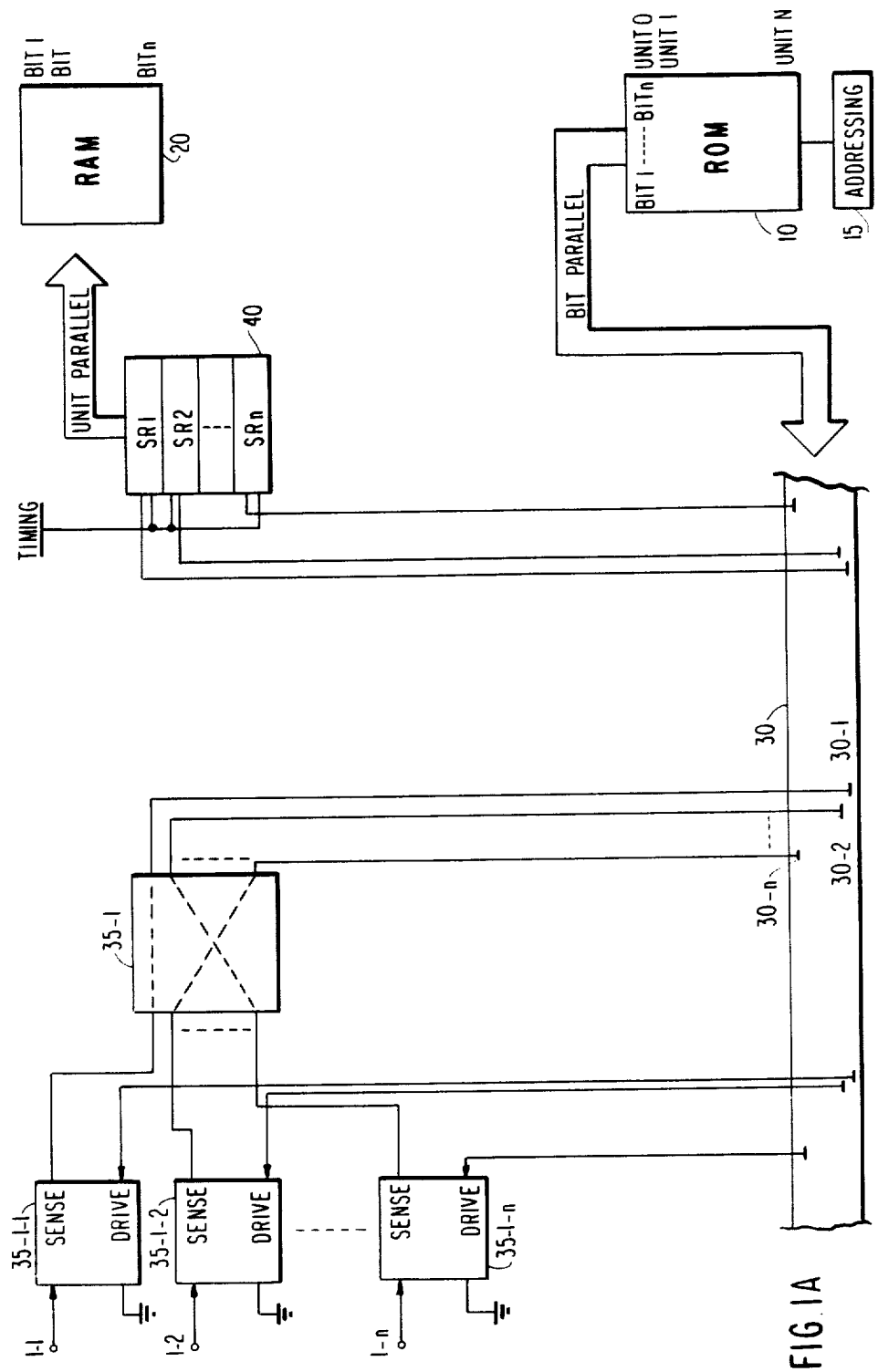
FIGS. 1A, 1B and 1C are functional block diagrams useful in explaining the input sensing functions.
Figure 1B:
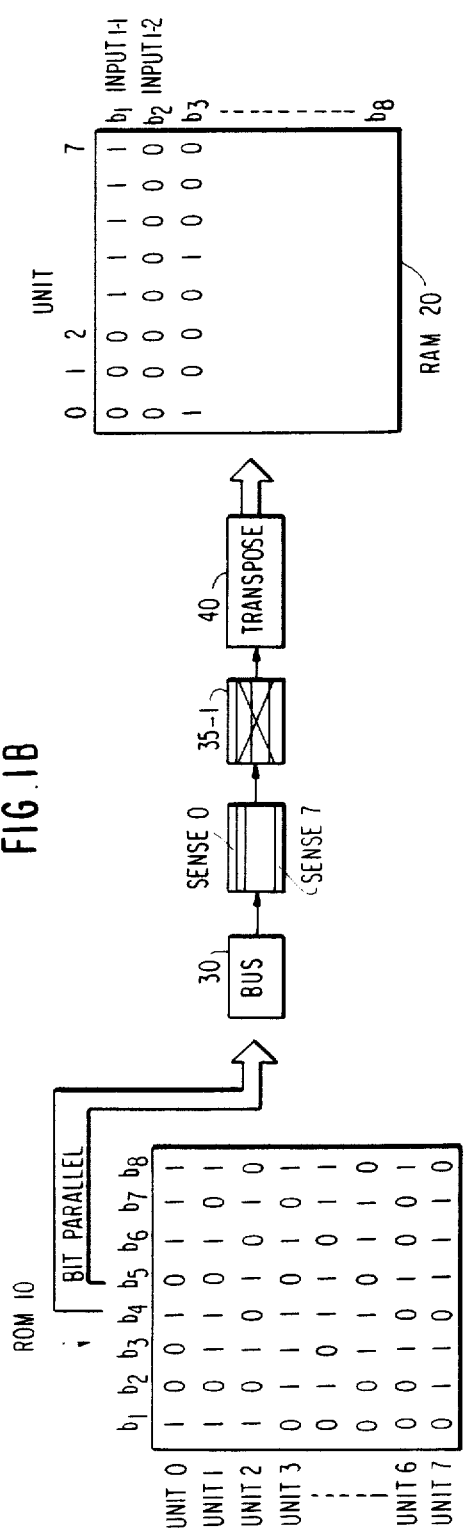
Figure 1C:
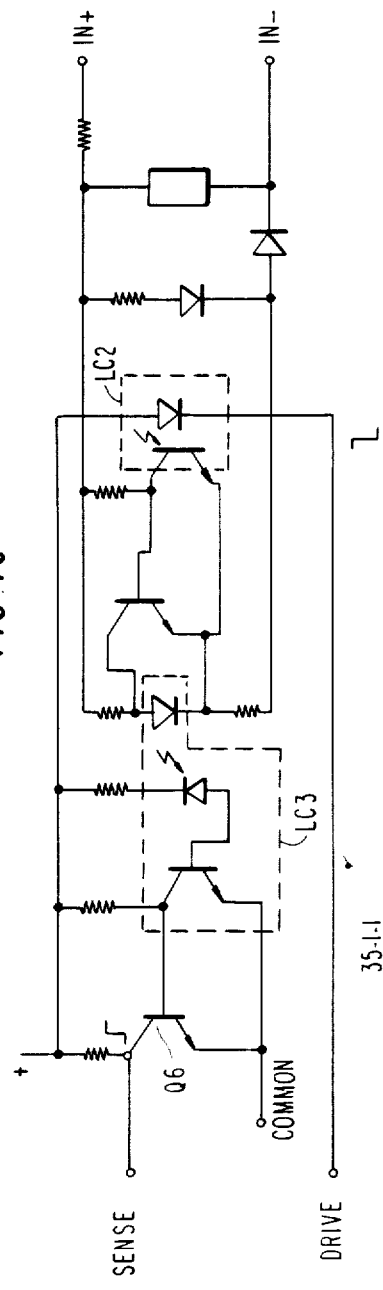
Figure 1D:
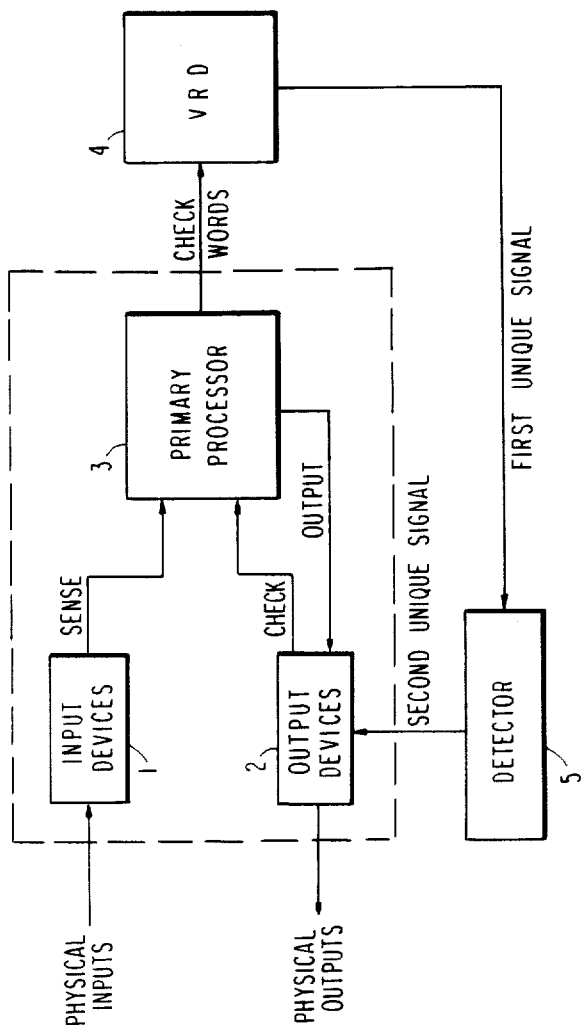
FIG. 1D is an overall block diagram of the various components of the invention in a typical implementation.

FIG. 1D is an overall block diagram illustrating typical application of the invention. As shown in FIG. 1D, the environment comprises five elements, e.g. input devices 1, output devices 2, a primary processor 3, a VRD 4 (vital relay driver) and a detector 5. The present application is particularly concerned with elements 1-3, elements 4 and 5 are disclosed in detail in Sibley copending application Ser. No. 550,431, filed herewith (now U.S. Pat. No. 4,553,200) and assigned to the assignee of this application. As is shown in FIG. 1D, the input devices 1 respond to physical inputs (this can be from such devices as track switch condition (normal, reverse, etc.), track occupancy condition (occupied or unoccupied), traffic direction indication, etc.) The function of the input devices 1 is to translate the condition of these physical devices into signals capable of being sensed by the primary processor 3. The primary processor 3, which for example can be a conventional microprocessor, includes as part of its function the sensing of the condition of the input devices 1. The primary processor 3 uses this information, in a manner to be explained, and produces output information which is coupled to output devices 2. A second class of input information for the primary processor 3, is provided by checking the condition of the output devices 2. In addition to its function of sensing real world information, generating output information for the output devices 2, and checking the condition of the output devices 2, the primary processor 3 also develops a second type of output information. This second type of output information is a time sequence of check words. The check words, by their number and content, perform a telltale function indicating the logic path followed by the primary processor 3 through its software, and includes a telltale indicating whether or not the output devices 2 are in a condition which corresponds to the condition to which they should have been controlled if they had been following the output information provided to them by the primary processor 3. This stream of check words is not at all evaluated by the primary processor 3, rather it is provided to the vital relay driver 4 (or VRD), which can also be implemented as a conventional microprocessor. The sole purpose of the VRD 4 is to evaluate the sequence of check words, and produce a single output. The single output can take a variety of forms, its function is to be a relatively unique signal, at least one that is not available from any other apparatus. In an embodiment of the invention which has been constructed, this relatively unique signal took the form of a modulated square wave of selected carrier frequency, repetition rate and duty cycle. The carrier frequency, repetition rate and duty cycle of the output of the VRD 4 depends on the number and content of the check words, as well as their rate of production. The VRD 4 is arranged so that only if the check words form a sequence whose rate, number and content indicates flawless processing by the primary processor 3, will the output take the form of the modulated square wave with the desired carrier frequency, repetition rate and duty cycle.

In the event that the appropriate output signal is produced, the detector 5 (which is designed to respond to this particular waveform of the appropriate parameters within a given tolerance) will produce a second relatively unique signal. The second relatively unique signal can, for example, be a particular DC voltage. The second relatively unique signal is also relatively unique because it is not available from any other apparatus. This particular level of direct current is necessary to enable the output devices 2 to actually control the physical outputs to which they are connected. Thus, while the invention includes a pair of processors, they are operating on distinctly different information and producing distinctly different results, in fact the VRD 4, and the associated software, has no relation to any real world condition. The VRD 4 merely sees, in essence, a sequence of numbers, and processes those numbers to produce a corresponding output. The VRD 4 has no way of even "knowing" the effect of the output it produces.

The invention can be applied in a variety of circumstances. It can be applied in a quite straight forward manner to control a selected region of the railroad right-of-way, e.g. adjacent switches and signals (in which event the input devices 1 may include control information provided from an operator's keyboard, either directly or indirectly via some communication link), it could be one element (transmitter—or receiver) in a communication system. If the apparatus of FIG. 1D were acting as a transmitter, then the output devices would include a communication link, if the apparatus of FIG. 1D were acting as a receiver, then the input devices would include a communication link. The overall goal of the invention is to provide hardware and software so as to reduce the probability of an unsafe failure to a vanishingly small number notwithstanding the fact the intelligent element (the primary processor 3) is in fact a conventional garden-variety microprocessor or the like.

Error Detecting Codes and Use of Polynomial Divider or Feedback Shift Register At many points in the processing, it is necessary to determine whether a particular word is a valid word, e.g. within a small group of words satisfying particular code rules. The manner in which these words are selected and detected, will now be explained.

Error detecting codes are well known to those skilled in the art, they achieve their error detecting capabilities by adding onto a k bit message, r check bits, so as to form a word with n bits, wherein $n=k+r$. A set of linear algebraic equations can be used to calculate this set of r bits from the set of k message bits. While any set of equations can be used as the basis of a code, a significant subset is the linear block code, where an n bit word is formed from k message bits and r check bits. For ease of implementation, I prefer to use a subset of linear block codes which are similar to cyclic codes. Cyclic codes are linear block codes which satisfy an additional constraint. That is, cyclically shifting a cyclic code word by one place produces another cyclic code word. By extension, all shifts of a cyclic code word result in other cyclic code words. While in general linear block codes can be generated by using matrix multiplication, the cyclic codes allow the use of shift registers to produce and/or check for the presence of valid code words. Those skilled in the art will appreciate that the use of shift registers is simpler and faster than the use of matrix multiplication.

There is, in addition, a subset of cyclic codes which are systematic. In the systematic cyclic codes, the message bits always appear in predetermined positions, so that the check bits necessarily appear in other, predetermined positions.

A systematic cyclic code is generated by the following steps:

1. Multiply $m(x)$ [the message or information] by $x^{n-k}$ (where n is the bit length of a code word, and k is the length of the message bit portion, so that $n-k=r$, where r is the number of check bits in the code word). This first step puts the high order bit in position $n-1$.
2. Divide the product $m(x).x^{n-k}$ by $g(x)$ [wherein $g(x)$ is the generator polynomial for the cyclic code] and keep the remainder; the division produces a quotient $q(x)$ and a remainder $c(x)$. The remainder must be of a degree less than the degree of $g(x)$ so it can have at most degree $r-1=n-k-1$.
3. Add the remainer $c(x)$ to the product $m(x).x^{n-k}$ formed in step 1 to form a code word (in this adding step, we are using binary addition equivalent to subtraction or exclusive OR'ing).

The code word constructed this way consists of two independent fields, a first field containing message or information bits only, and a second field (exclusive of the first field) which contains only check bits. The quotient produced in step 2 is irrelevant and need not be retained.

Figure 1E:
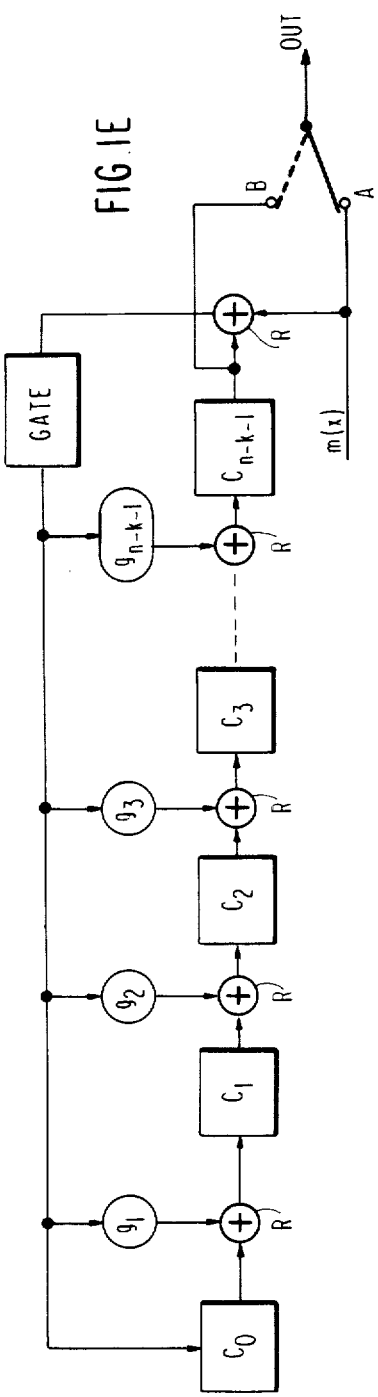
FIGS. 1E-1G are block diagram of the polynomial divider in generic form, and as personalized for the two different channels of processing.
Figure 1F:
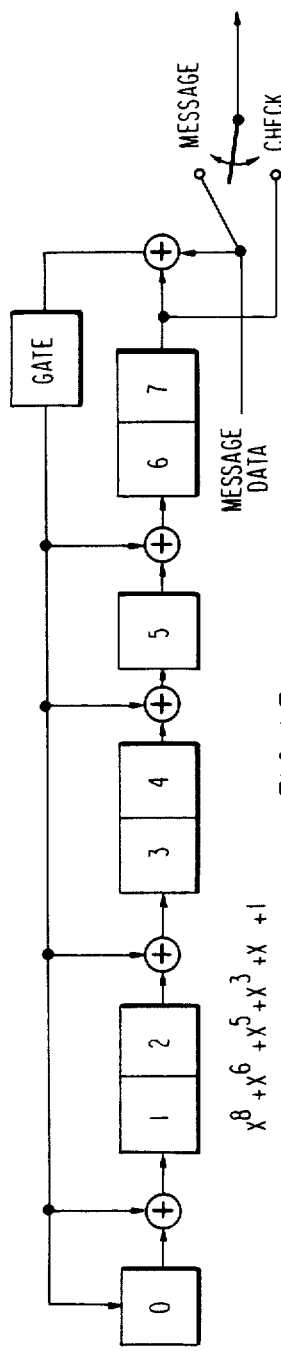
Figure 1G:
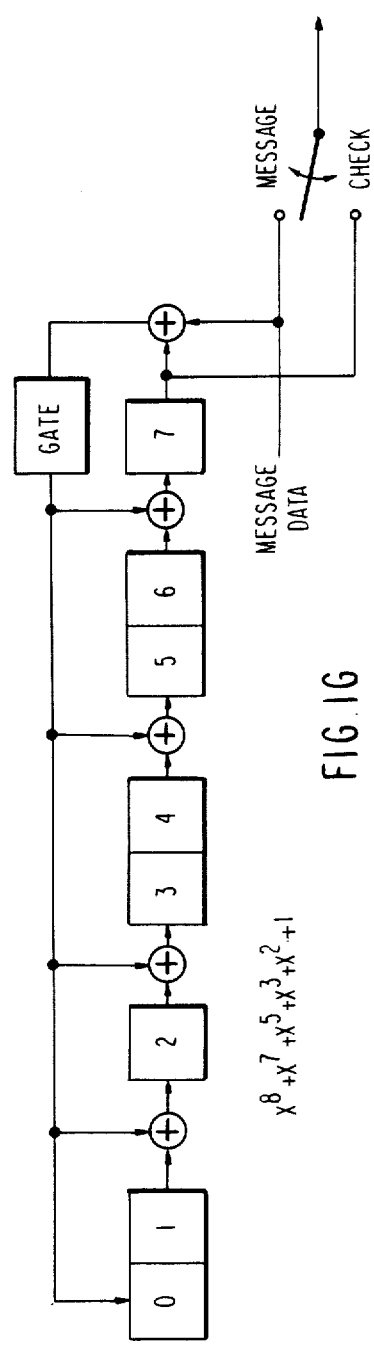

We can implement this coding processing using a feedback shift register which is connected to effect polynomial division. An arrangement that will simultaneously multiply $m(x)$ [the message] to be multiplied by $x^{n-k}$ [step 1] and divide by $g(x)$ [step 2] is shown in FIG. 1E. As shown in FIG. 1E, a shift register of $n-k$ stages ($c_0$ to $c_{n-k-1}$) has a plurality of exclusive OR gates R, a different one at the input to each stage, and a GATE for input control. In addition, a two position switch (with positions A and B) is connected to an output line OUT. With GATE "on", and the output switch in position A, the k information digits $m(x)$ are shifted into the register and simultaneously to OUT. As soon as the last message digit has been shifted in, the $n-k$ digits in the register are the parity check digits. By turning the gate GATE "off" and putting the switch in position B, the check digits can be shifted to OUT. The shift register shown in FIG. 1E is personalized for any particular generator polynomial by selecting the condition (open or closed) for each of $g_1$ through $g_{n-k-1}$ to match the corresponding generator polynomial coefficients.

For our purposes, we want to select code words in such a way that the minimum distance (d) is maximized (the minimum distance is the distance between two valid code words, e.g. the number of bit changes that must be made to turn one code word into another valid code word). The minimum distance is important because it determines the number of undetectable errors. Any number of changes which are less than the minimum distance will be detected. In order to use cyclic codes, it is necessary that the degree of the generator polynomial be $r=n-k$. Furthermore, $g(x)$ must divide $x^n+1$ so that the cyclic properties emerge. The effort to locate good cyclic codes is a continuing one and the resulting studies are tabulated in existing textbooks.

Input Function

FIGS. 1A and 1B are useful in explaining the input sensing function. These figures schematically illustrate the apparatus and processing carried out in order to implement input sensing. As is shown in FIG. 1A, a plurality of input terminals 1-1 through 1-n are each coupled to one input terminal of a dedicated sense circuit 35-1-1 through 35-1-n, one sense circuit for each input circuit. An n conductor bus 30 is coupled to the drive input terminals for each of the sense circuits 35-1 through 35-N, a different conductor in the bus coupled to each different drive terminal. Each of the sense circuits also has an output labelled "SENSE", which is connected to an input terminal of a signature element 35-1. The particular pairing of inputs and outputs for the signature circuit 35-1 pairs outputs and inputs such that, for example, inputs 1 to N-1 are respectively connected to outputs 2 to N, with input N connected to output 1. Obviously, many other variations could be envisaged. The signature element 35-1 is useful in those cases wherein there are more than N input terminals, allowing groups of N input terminals to be uniquely identified by using different signature elements, e.g. 35-1, 35-2, etc. for different groups of input terminals. It should be apparent that the signature element 35-1 would have identically the same function whether it is coupled between the bus 30 and the drive terminals of the sense circuits or the SENSE terminals and the conductor 30.

In order to provide driving signals for the sense circuits, a source of a bit pattern, such as ROM 10 is coupled to the conductors of the bus 30, and the bit patterns stored in the ROM 10 can be selectively applied to the conductors of the bus 30 via conventional addressing arrangement 15. Preferably, the ROM has a bit width which is equal to the bit width of the bus 30. Bit patterns are applied to the bus 30 in what could be termed word serial order; however, since "word" may carry the connotation of 8 bits, and the present invention is not limited to using words of 8 bits, we will hereinafter refer to the bit pattern stored in the ROM 10 as existing in unit serial order wherein we have substituted the generic word unit for the specific term "word". Accordingly, as the ROM 10 is sequentially addressed by the addressing circuit 15, the bit pattern stored in the ROM 10 are applied to the conductor 30 in unit serial, bit parallel order.

Also coupled to the conductors of the bus 30 is a transposition arrangement including N shift registers 40, each shift register SR1-SRn connecting to a different one of the conductors in the bus 30. The shift registers are loaded, bit serially, and are read out broadside. As is shown, the broadside reading of the shift registers is used to load a further memory storage arrangement, e.g. RAM 20.

Each of the sense circuits 35-1-1, etc. senses the condition of its associated input terminal in the following fashion. The input terminal can be in one of two conditions, either it carries a DC potential above a given threshold, or it does not. If the input terminal is in the first condition, then the SENSE output terminal reproduces in its inverted sense the pattern provided at the drive terminal, e.g. for example a 010 pattern at the drive input terminal under those conditions would produce a 101 pattern at the SENSE terminal. On the other hand, if the input terminal is in the other condition, then the SENSE terminal will produce a string of null values (e.g. logic 0) regardless of the input pattern applied at the drive terminal. Although the particular sense circuit is not essential to the invention, one implementation of the sense circuit is shown in FIG. 1C. The implementation of the sense circuit, however, must be 'vital', i.e. must have no failure modes which would allow an output simulating an on input without a DC potential at the input terminal.

In view of the foregoing, the operation can now be explained. At those times set aside for sensing input condition, the ROM 10 is addressed to provide a sequence of bit patterns on the bus 30 (in unit serial, bit parallel order) corresponding to the bit pattern stored in ROM 10. Each sense circuit is responsive to the bit pattern on a single one of the conductors in the bus 30. The sense circuit also directs output to a single one of the conductors in the bus 30. (In the absence of the signature circuit 35-1, these two conductors are identical, but in the presence of the signature element 35-1, they may be different.) After the first cycle of driving the bus 30, developing the sense pattern and shifting the pattern into the transposition element, each one of the shift registers SR1-SRn has one bit stored therein derived from a different one of the sense circuits 35-1-1 through 35-1-N. After a second cycle, each of the shift registers has two bits stored, and after a number of cycles equal to the length of the shift registers, each of the shift registers are full. The shift registers are now read out broadside, one after the other, and the contents of the shift registers are transferred to the RAM 20 in the same order as the shift registers are read.

FIG. 1B shows more clearly the result of the operation of the apparatus shown in FIG. 1A. More particularly, FIG. 1B schematically identifies the equipment, e.g. ROM 10, bus 30, sense circuits, signature element 35-1 and the transpose arrangement 40 as well as the RAM 20. FIG. 1B, however, shows in some detail the bit patterns employed. As indicated in FIG. 1B, in the first cycle of operation unit 0 is read from ROM 10 in parallel. Thereafter, unit 1 is read, and following unit 1, unit 2, etc. After the eighth unit, e.g. unit 7, has been read, then the shift registers and the transpose element 40 would be full if they were 8 bits deep. Thereafter, assume that the transpose element 40 is read broadside, one shift register after the other, to load RAM 20. Then the first shift register will produce the inverted bit pattern 00011111 which corresponds to bit 1 of the first eight units (assuming that the input terminal coupled to sense circuit 35-1-1 was in a logic 1 condition to allow the output to repeat the input, and of course also assume that the signature element 35-1 coupled its first input and output). The RAM 20, illustrating for bit $b_2$ an all 0 pattern indicates that the sense circuit 35-1-2 had an input terminal not in its logic 1 condition (also again assuming that the input and output position 2 of the signature element 35-1 were interconnected).

Although we have shown a square matrix, e.g. an 8 conductor bus 30 driving sense circuits with 8 data units, that of course is not essential to the invention. There is a relation between the number of conductors in the bus 30 and the number of sense circuits (there must be at least as many conductors in the bus as there are sense circuits or input terminals). However, the number of units which are used is related to the length of the shift registers and the depth of the RAM 20. For example, if the RAM 20 was 16 bits deep, and that was the length of the shift registers, then rather than using 8 units (units 0–units 7), we could have used 16, e.g. unit 0–unit 15, to develop 16-bit units in the RAM 20 rather than the 8 bits illustrated. Furthermore, the operation can be concatenated as follows. Assume that the shift registers are 16 bits long, meaning that after application of 16 units by ROM 10, the shift registers are full. The registers can then be read broadside. This provides for 16 bits per input. However, this operation can be repeated. We can arrange the addressing of RAM 20 so that the first and second 16 bits read from a single shift register are associated as a single 32-bit data unit.

Checking of the Input Sensing Function

In a preferred embodiment of the invention, the sensing bit pattern actually employed with any sense circuit is made up of two 16-bit units so that a single sensing word is 32 bits long. To allow ready checking of the sense word, each sense word is a code word in a limited code set. As described above, the sense word is broken up into three fields, the least significant bit is the T/F bit, the next 13 bits uniquely identify the input port, position or function. Actually, there are two different 13-bit fields associated with each input port, a true field, and the complement of the true field for those cases where the input port is in its off condition. These first two fields (T/F bit and 13-bit "name") can also be considered a first information field, since the two names are complementary through the first 14 bits. The following 18 bits comprise a check field. There are in fact two different sensing channels, using the same apparatus, but with different driving bit patterns. One results in sense words in a first code set CH 1 and a second channel results in sense words in a second code set CH 2. So in practice, we have two "name" pairs for each input (and output, as described below), one pair in each of two code sets or channels.

After the raw sensed data is stored in the RAM 20, a number of functions have to be performed prior to equation evaluation. Firstly, the words have to be checked to determine if they are valid words; during the course of this process, null words are replaced by the false value for the function. Secondly, as has also been described above, each input buffer is divided into three sections based on a parameter called cycles of forgiveness. In those cases where a corrupted word has been sensed, the false value will be stored, however, depending on the number of cycles of forgiveness, not all sections of the buffer will be written with a false value. The apparatus to perform these functions is functionally illustrated in FIG. 2.

Figure 2:
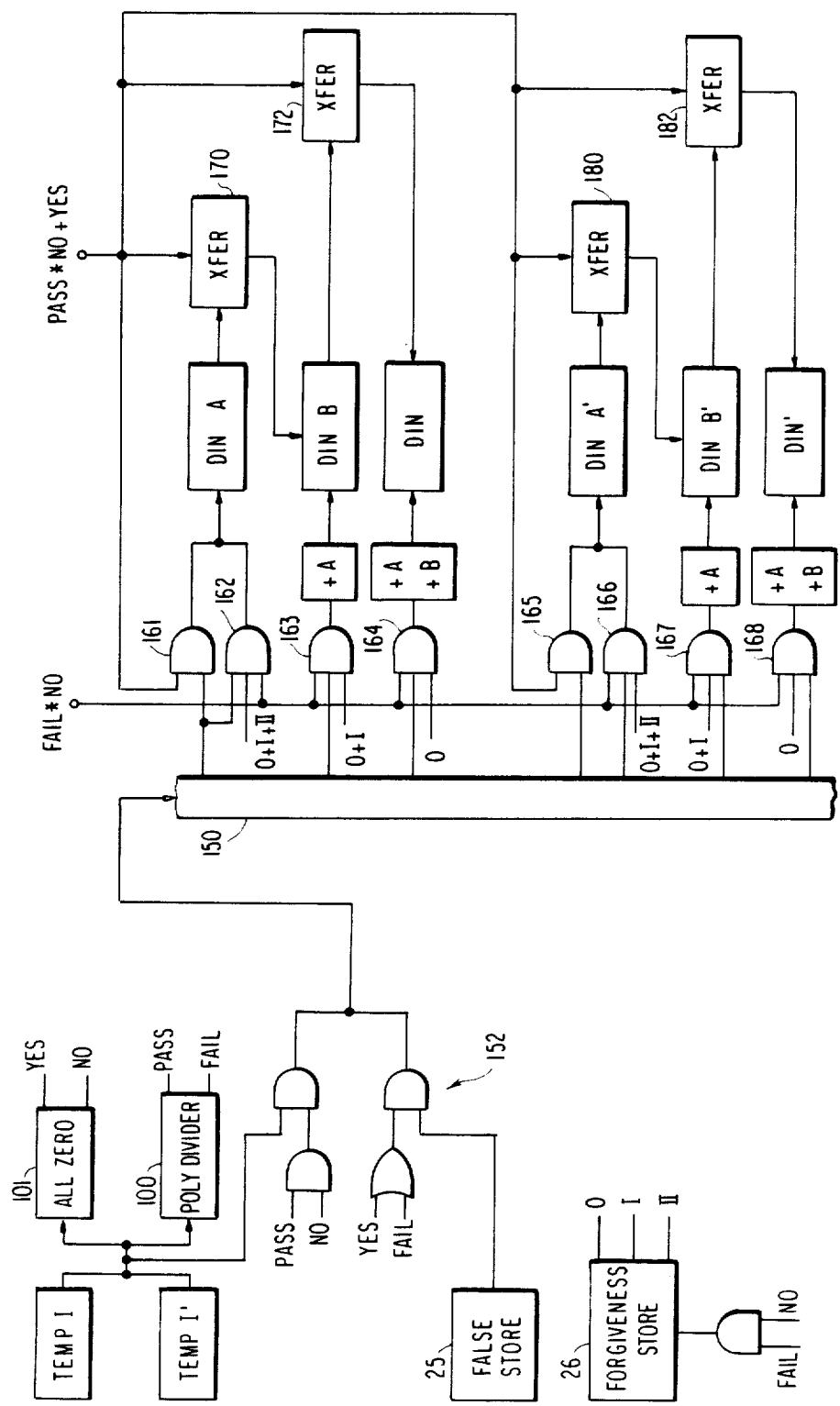
FIG. 2 is a functional block diagram useful in explaining the manner in which the values produced from the input sensing function are checked and stored for later use.

FIG. 2 illustrates two sections of the RAM 20, TEMPI and TEMPI', corresponding to the first and second sensing channels. Furthermore, a storage area 25 is provided for storage of false values and a forgiveness store 26 is provided producing signals $\emptyset$, I and II, corresponding to 0, 1 and 2 cycles of forgiveness. The raw data is applied to an all zero test 101 producing a YES or NO output, the first indicating that all bits of the word are 0's or null values, and the second output indicating that not all bits of the word are null. A polynomial divider test 100 is provided to check whether or not the word is or is not a member of the appropriate code set. The poly divider test 100 produces PASS and FAIL outputs, the first indicating that the word is indeed a member of the appropriate code set, whereas the second indicating that it is not. A plurality of logic gates 152 are provided to couple either the sensed raw data or the appropriate false value (from the false store 25) to a data bus 150. In the event that the all zero test 101 indicates that all bits are not zero, and the polynomial divider 100 indicates the word is in the appropriate code set, then the raw data is used; on the other hand, if all bits in the unit are zeros or if the polynomial divider test 100 indicates that the unit is not in the appropriate code set, then the false value, from the false store 25 is passed to the bus 150.

As indicated above, the input buffer is first divided into two halves, one corresponding to each input sensing channel, and each half is divided into three sections corresponding to, respectively, 0, 1 and 2 cycles of forgiveness. More particularly, the three sections in the first half of the buffer are DIN, DINB and DINA while the second half includes DIN', DINB' and DINA'.

In the event that a particular sensed word passes both tests, i.e. the polynomial divider 100 produces a PASS output and the all zero output produces a NO, then the sensed word will be used unchanged. However, in order to distinguish between the three sections in each half of the buffer, there is a constant (+A) difference between the representation of a sensed word in the highest section (DIN A), and the same representation in the immediately adjacent section (DIN B). Furthermore, there is a different constant (+B) between a representation in that section (DIN B) and the immediately adjacent lower section (DIN). To implement these rules, in the event that the tests indicate PASS * NO, then the sensed word is output from the bus 150 through a gate 161, and it is stored in buffer section DIN A. Thereafter, the same enabling signal couples that quantity through XFER 170 (wherein the constant +A is added thereto and it is loaded into DIN B). Thereatfer, the same control signals allows the same quantity to be coupled through XFER 172 (where the constant +B is added thereto and it is stored in DIN). Accordingly, in the event of the PASS * NO condition, a quantity ($Q_0$—for example) is stored in DIN A; the quantity $Q_0 + A$ is the same representation in the next adjacent section and is stored in DIN B; and the quantity $Q_0 + A + B$ (which is the identical representation in the next buffer section) is stored in DIN. Similar action occurs in the second channel corresponding to buffer sections DIN A', DIN B' and DIN' employing gate 165 and XFER 180 and XFER 182. If the condition YES (all zero word) occurs, then the action is identical, except the value input to DINA is the FALSE value for the word (CH 1) and the value input to DINA' is the FALSE value for the word (CH 2).

On the other hand, if the condition FAIL * NO occurs, then the following action is different, and the particular cycle of forgiveness for the particular function is important. Firstly, in the condition FAIL * NO, the sensed data is not at all employed, rather the corresponding quantity from FALSE store 25 is gated onto bus 150. Furthermore, under these circumstances, and assuming $\emptyset$ cycles of forgiveness, then gates 162-164 pass the data from bus 150. That quantity is directly stored in DIN (via gate 164). On the other hand, if the quantity had I cycle of forgiveness, then gate 164 is unenabled and the contents of DIN remain unchanged. Rather, the contents of DIN A are altered. Finally, if the quantity had II cycles of forgiveness, then gates 163 and 164 are disabled, thus quantities in DIN and DIN B are unchanged and the quantity from the false store coupled via bus 150 is used to only write DIN A. Similar action occurs in the other buffer section, e.g. buffer portions DIN A', DIN B' and DIN'.

As a result, and especially since registers DIN and DIN' contain quantities which will be immediately used in logic evaluation, there is no delay in rendering effective a false or corrupted value corresponding to functions with $\emptyset$ cycles of forgiveness. There is a 1-cycle delay in rendering effective those quantities for functions with 1 cycle of forgiveness, and a two cycle delay in rendering effective those quantities respecting functions with 2 cycles of forgiveness.

Function Evaluation

Figure 3:
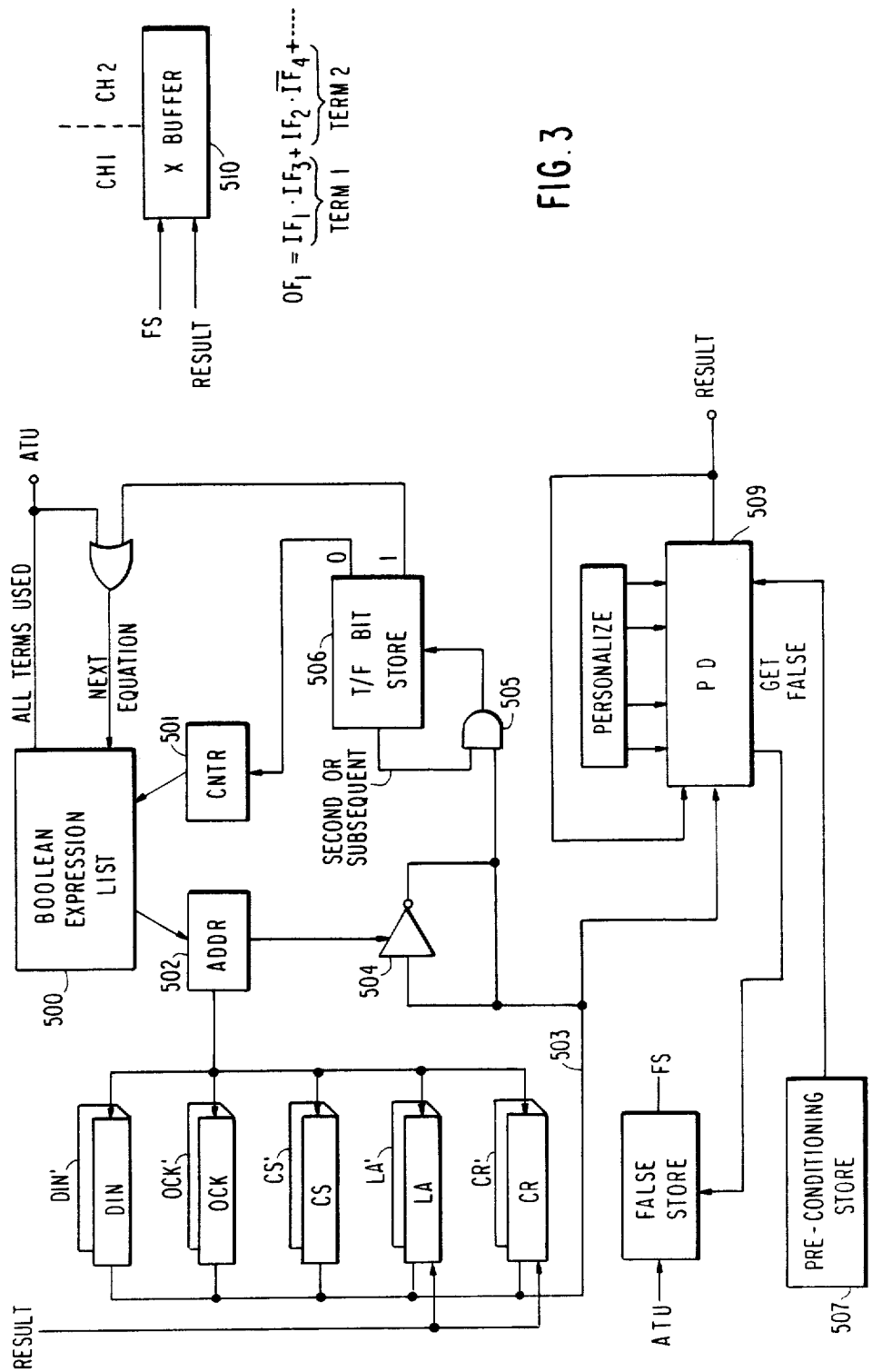
FIG. 3 is a functional block diagram useful in explaining the evaluation function.

The apparatus shown in FIG. 3 is useful in illustrating the function evaluation. The input data on which function evaluation occurs is located in the set of registers DIN, OCK, CS, LA and CR, for respectively direct input, output check, control store, latched expressions and current results. The manner in which information is circulated to the direct input buffer (DIN) has been explained above. A similar process (which will be described hereinafter) takes place using, as inputs, the state of the output functions. At least those of the output functions which are inputs for the purposes of evaluation are located in the OCK buffer. The control store (CS) is a buffer which includes non-vital data derived from an operator input keyboard or the like. Certain expressions in the Boolean expression list which must be evaluated may contain latched functions. Such a function is one in which at least one of the terms to maintain it true includes the presence of the output function itself. Latched expression data is found in the buffer LA. Finally, some functions important in evaluating the expressions are the result of the evaluations of previous functions in the same cycle. This data is found in the buffer CR.

The Boolean expression list contained at storage device 500 relates the condition of an output function to one or more input/output functions in the form of the sum of products such as the equation shown in FIG. 3 (i.e. $OF_1 = IF_1.IF_3 + IF_2.IF_4 + \ldots$). This equation represents that output function 1 ($OF_1$) is defined by the product of input function 1 ($IF_1$) and input function 3 ($IF_3$) or input function 2 ($IF_2$) and the inverse of input function 4 ($IF_4$), etc. Using these terms as exemplary, if both input functions 1 and 3 are in their logic 1 condition, then output function 1 will be in its 1 condition. On the other hand, if input function 2 is in its 1 condition and input function 4 is not in that condition, then that is another condition which will render output function 1 in its 1 condition. The Boolean expression list 500 maintains a series of these definitions, and these are evaluated in turn. The Boolean expression list is addressed by a control counter 501; when any particular definition is addressed, the term in the definition are sequentially accessed via the addressing device 502. For example, if the equation shown in FIG. 3 is addressed, the first function (input function 1) must be evaluated. Device 502 locates the present condition of the input function in one of the buffers. The present condition of the input function 1 is identified by its T/F bit (the least significant bit). This bit is output from the appropriate buffer on the line 503. Typically, that bit will pass unaltered to an AND gate 505. However, if the function is inverted (such as input function 4), then the bit will be inverted by inverter 504. AND gate 505, in the case of second or subsequent factors in a single term, AND's the evaluated bit with the contents of the T/F bit store 506; the first term is inserted directly in the T/F bit store 506. In this fashion, after the T/F bit in each function of a single term has been addressed, the T/F bit store 506 determines whether the term is true or false; if true, then the output function is evaluated as true; if false, the next term in the definition must be evaluated in the same fashion. Accordingly, a zero result in the T/F bit store 506 calls for evaluation of the next term by stimulating control counter 501. On the other hand, a true output calls for evaluation of the next equation. However, preceding the evaluation of the next equation, a vital evaluation is made on the equation whose preliminary evaluation was just completed.

In general, the vital evaluation involves reevaluating the same term of the equation which made the output function true. However, in this instance, rather than evaluating merely the T/F bit only, the entire unit is "added" in a polynomial divider with all other values which are factors of the term. In our example, input functions 1 and 3 would be "added" in the polynomial divider. As indicated above, there are two channels of computation and the unique values of functions in each channel are in a different respective code set. Thus, the PD 509 is personalized prior to each computation for the appropriate code set. This personalization sets the state of the feedback network. Evaluation of channel 1 input expressions produces a result (also 32 bits long) which is also in the first code set. Since each true value is different, and since it is a necessity that the output function evaluate to a single value (the name for the particular function) regardless of the particular term in the equation which makes the expression true, we must somehow compensate for the fact that different input functions must yield the same output function. This compensation is provided by a preconditioning store 507. The preconditioning store 507 has a preconditioning constant for each different term of each different equation. The preconditioning constant compensates for the different product terms so that regardless of which term is evaluated, the output value will be identical. Thus, vital evaluation of an output function includes preconditioning the polynomial divider with the appropriate preconditioning constant, loading in a value for the first factor in the term, and thereafter loading in a value for each other factor in the term. At the conclusion (for channel 1 computations) the result should be a code word in the first set. The polynomial divider is arranged to check that fact. If the code word is indeed one of the small number of code words in the first set, then it is treated as the correct result and RESULT is transferred to the X buffer 510. On the other hand, if the expression result is not in the appropriate code set, then the polynomial divider 509 initiates access to the false word store for this particular expression result and FS is stored in the X buffer 510 (the output buffer).

If, on the other hand, during the expression evaluation, all terms in the expression are used and no term is found which makes the function true, then the signal ATU is produced; this signal has two effects, e.g. it signals evaluation of the next expression in the Boolean expression list 500 and it also accesses the false store to produce FS for storage in the X buffer.

In this fashion, then a list of Boolean expressions can be evaluated and the X buffer loaded with either the false value, or the true value. It is important to note that while the FALSE value is extracted from the FALSE STORE, the true value is computed, i.e. it is not stored anywhere. Since the correct true value is one of a small set, computation of the true value requires flawless processing. The test for the true value may not catch all errors, but the ones which are not detected are of low probability and the processing is designed to detect these errors later. This completes the description of channel 1 processing. We have in addition to the channel 1 data values, channel 2 data values and they are used as follows.

Rather than looking through each equation again to find a term which makes the equation true, channel1 processing has identified a particular term in each equation (if the equation to be evaluated is true) which makes it true. In channel 2 processing, the processing can be shortcut somewhat; first the personalization of PD 509 is changed to the second code set, second, a preconditioning constant corresponding to this particular term (for channel 2) is accessed from the preconditioning store 507 to precondition the polynomial divider 509. Thereafter, and in turn, the channel 2 values for the functions in the term making the expression true are accessed from the appropriate buffer and loaded into the polynomial divider 509. At the conclusion of the operation of the polynomial divider, the expression result should be a code word in the second code word set. If it is, the RESULT is loaded in the X buffer 510 in an appropriate position; on the other hand, if an expression results which is not in the second set, then the false word is accessed from the store and the expression FS is loaded in the X buffer at the appropriate location. As we will see below, those expressions which are evaluated as valid in channel 1 but are found to be false in channel 2, will be hereafter treated as false. Only expressions in which true results were validly evaluated in both channel 1 and channel 2 will be treated as true.

Output and Output Check Processing

The output and output check processing begins with the results of the evaluation stage stored in the X buffer 510 and the X' buffer 510'. Two processes must be performed, i.e. first the output ports must be controlled to be either on or off, depending on the results which are reflected in the X and X' buffers. Furthermore, the actual state of the output ports must be checked against the allowed state (as reflected by the evaluation results) in order to determine that the port is or is not in the appropriate condition vis a vis the evaluation result. Note that the vital processor does not make the determination, the vital processor only prepares the appropriate check word so that the result can be determined elsewhere (in the VRD).

Figure 6:
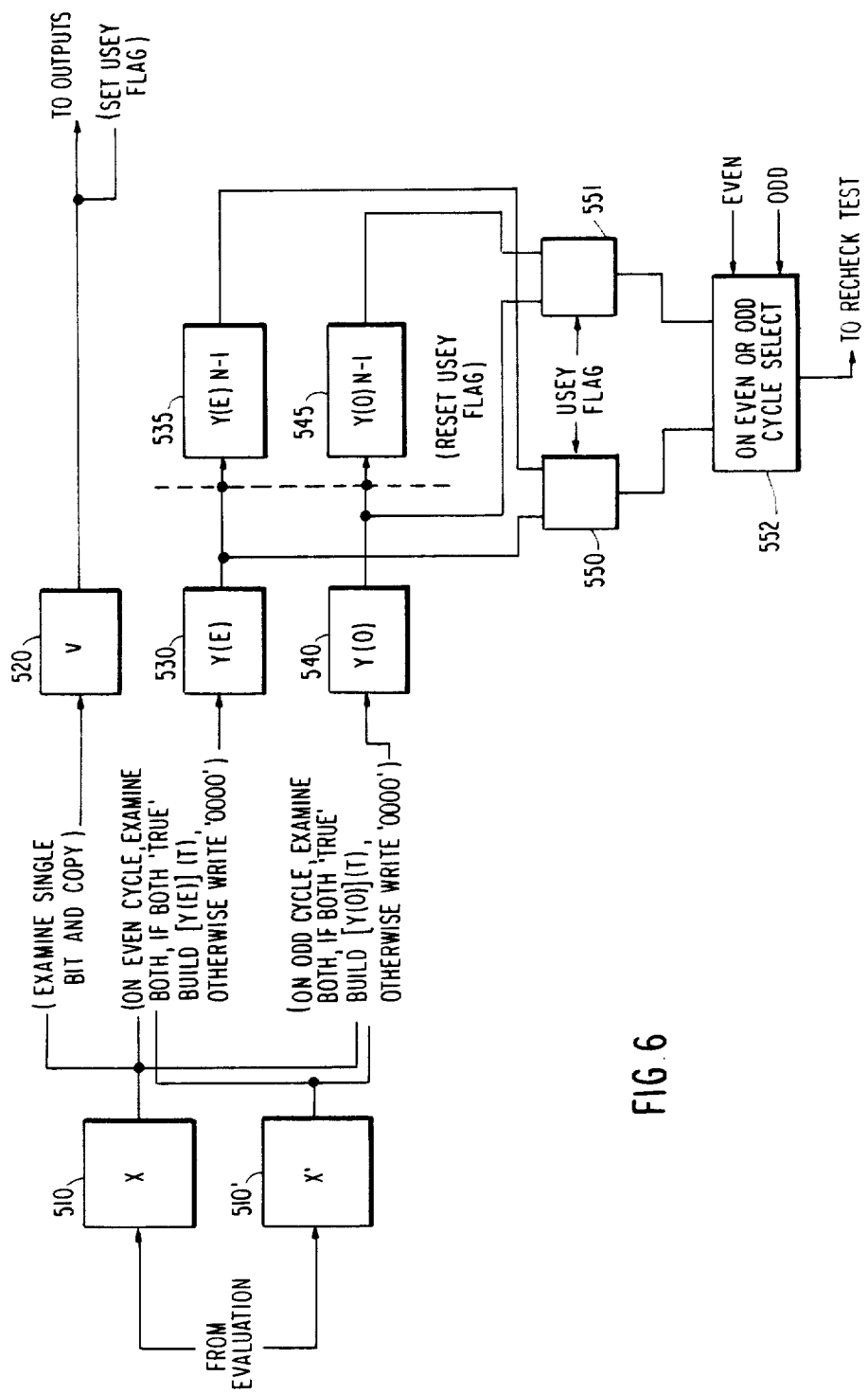
FIGS. 6 and 7 represent functional block diagrams of the output and output check process.

As shown in FIG. 6, the output function is effected from the contents of a V buffer 520. The V buffer is loaded, at the appropriate time, by merely examining an appropriate bit (the T/F bit, or least significant bit in the expression result) in the evaluation result stored in the X buffer, copying that bit to the V buffer in the appropriate location and, at the appropriate time controlling each output port so as to reflect the status of its corresponding bit in the V buffer 520. Whenever the contents of the V buffer 520 are copied to the output ports, an USEY flag is set, the reason for this action will appear shortly.

The recheck processing employs a more comprehensive complement of buffers. These include the Y(E) buffer 530 and the corresponding Y(O) buffer 540. Recheck operations are divided into even and odd 50 ms. cycles. The contents of the buffers 530 and 540, however, are written on each one second cycle in the following fashion. The corresponding positions in the X and X' buffers are examined. If both positions indicate a "true" or on condition for the corresponding port, then particular words Y(E) (T) and Y(O) (T) are constructed (described below) and inserted into the corresponding location in the buffers 530 and 540; if both the values at the X and X' buffers do not reflect a "ture" or on state for the port, then different values ('0000') are copied into the appropriate location in the buffers 530 and 540, respectively. Accordingly, whereas the condition of the X and X' buffers reflected only channel 1 or channel 2 processing, respectively, the contents of buffers 530 and 540 represent a combination of results in both channels, in a restrictive sense in that the value is in the buffer 530 and 540 only if both channel 1 and channel 2 processing agree on a true value, otherwise the false value is found in buffers 530 or 540. As is described below the Y(E) values are accessed on even recheck cycles and the Y(O) values are accessed on odd recheck cycles.

Since, as has been described above, the main cycle processing (which is used to set the output ports in accordance with the status of the V buffer 520) and the recheck cycle (the processing for which is now being discussed) are asynchronous with each other, we have to have some means of locating the appropriate data. More particularly, this recheck processing will produce check words which correlate the state of the output ports with the state that the output ports should have, as reflected by the internal data. Because of the asynchronous relation between the recheck processing and the main cycle processing, the internal data which should be reflected at the output ports may have already been overwritten in the buffers 530 and 540 by the time the recheck processing take place. Thus, a lack of correspondence could be signalled only because the output ports have not yet been controlled in accordance with the data appearing in buffers 520, 530 and 540. In order to avoid this situation, a further set of buffers Y(E)N-1 and Y(O)N-1 are provided. These buffers are used to hold the results of earlier main cycle processing (from the previous cycle, i.e. cycle N-1) for comparison with the output ports if the output ports have not yet been controlled to reflect the condition of the buffers 520, 530 and 540. A flag, the USEY flag, is used to determine whether the data in buffers 520, 530 and 540 will be used for comparison or, in lieu of that data, the data in buffers 525, 535 and 545 will be used. When the output ports are controlled to reflect the data in buffers 520, 530 and 540, then the USEY flag is set. If, prior to recheck processing, the USEY flag is set, then the data from buffers 520, 530 and 540 is used. On the other hand, when the data from buffers 520, 530 and 540 is transferred to the buffers 525, 535 and 545, respectively, then the USEY flag is reset; if that flag is reset during the recheck processing, then the data from the latter set of buffers, i.e. 525, 535 and 545 is employed.

As has been referred to above, the recheck processing occurs in even and odd cycles and therefore even or odd data must be selected. These selections are effected by gates 550, 551 and 552, the former two gates are controlled by the USEY flag and the latter gate operates in dependence on whether or not the recheck cycle is even or odd. Accordingly, as shown in FIG. 6, at the appropriate time in the recheck cycle, the gates 550-552 are controlled to pass the appropriate even or odd data to the recheck test. The recheck test is functionally illustrated in FIG. 7.

Figure 7:
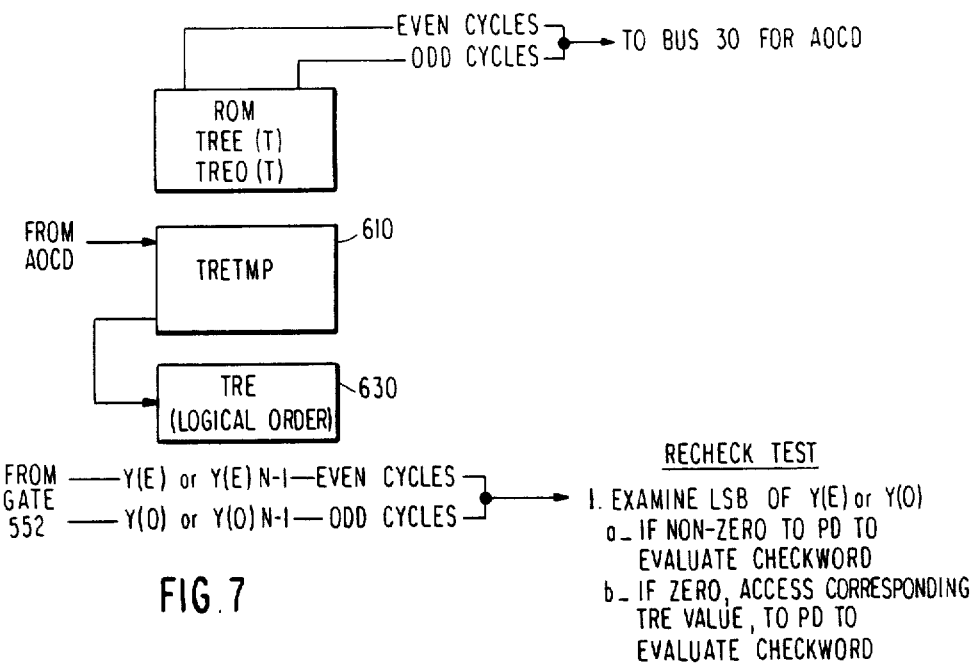

As shown in FIG. 7, a ROM 600 has stored even and odd values TREE(T) and TREO(T). In the course of recheck processing, either the even or the odd values are placed on a bus 30' (similar to the bus 30 of FIG. 1A). Each output port has an absence of current detector (or AOCD) which is similar in purpose to the sense circuits (see FIG. 1H, discussed below). The bit patterns from the ROM 600 are applied to the bus and through the bus (and through a corresponding signature element similar to 35-1) are applied to the AOCD's associated with each port. In the event that the port is off or false, the AOCD repeats the input bit pattern in its inverted sense applied to it, if the output port is on (or true) the AOCD returns a null value. A transposition apparatus similar to the transposition apparatus 40 (of FIG. 1A) is interposed between the AOCD and the RAM buffer TRETMP 610. The transposed data from the AOCD's are stored in the buffer 610, necessarily in signature order, since that is the order in which they are returned. The reader will note a similarity between this output port check and the input port sensing of FIG. 1A. The raw data is written to TRETMP in signature order. Note that while ROM 600 stores TREE(T) and TREO(T), these are stored in transposed relation, relative to the presentation in TRETMP 610 to maintain the rule that the 'correct' result of vital values not be available to the machine.

At the conclusion of this processing, therefore, TRETMP has a value for each output port. If the port was on, then the value '000' is located in TRETMP at the location corresponding to the port. If the port was off, then the value TREE(T) or TREO(T) is stored in the corresponding location of TRETMP depending on whether the cycle is odd or even.

Once this processing is completed, the values from TRETMP are written into the buffer TRE 630. However, in this writing, the order is changed from signature order to logical order. Once the TRE buffer 630 is written, we now can effect the substantive recheck processing; a comparison of the actual state of the port (as reflected by the contents of TRE) with the state the port should be in based on the data passed through gate 552. If should again be emphasized that the vital processor does not actually make a decision on whether or not the port and the data disagree, a check word is determined for each port or groups of ports, and the check word is passed to the vital driver (the other processor) where a decision is made as to whether or not a potentially unsafe failure has been detected.

Once TRETMP has been loaded, the recheck processing can calculate recheck checkwords. For ports allowed to be on, we have a 'true' word in Y(E) and Y(O), or in Y(E)N-1 and Y(O)N-1 (depending on recheck processing timing). For ports actually off, we have TRE(T) or TRO(T) in TRE buffer 630. In the absence of an error, the data should exist in either the Y buffer or the TRE buffer. In the recheck processing, we examine the Y buffer value, if the LSB is a 1, we use the Y value. If the LSB is a 0, then we use the TRE value, as shown in FIG. 7. As a result is a unique value which must be either: YE(T) represents an "on" function which is allowed to be on, or TREE(T), represents an off function which is actually off.

As will be now described, the various values have been preselected so that these two values are in fact identical and thus form a telltale word whose presence is required for maintaining the effectiveness of the output from the vital processor.

The value YE(T) is constructed by combining a preconditioning constant PREYET with the true values X(T) and X'(T). The preconditioning constant PREYET is also arbitrarily selected. The value TREE(T) is the name selected from the 'TRUE' function TREE. Thus, given the selected values for X(T) and X'(T) as well as the selected value of TREE(T), the arbitrary value selected for the preconditioning constant PREYET is selected to make the two values noted above, in fact, identical.

Having derived, then, either YE(T) or TREE(T), we must now form a recheck check word to reflect this value so that after it is passed to the vital driver, a determination can be made as to whether or not the check word reflects faultless processing. While we can, theoretically, use the selected value itself as the checkword, time constraints in an embodiment actually constructed, prohibits such a practice. Rather, a set of YE OR TREE values are collected to form a recheck check word (where YE or TREE means the value YE of the value TREE). The number of such values in the set is in essence arbitrary, and is actually selected based on the amount of time available for execution of the recheck routine. In accordance with the embodiment actually constructed, the recheck checkword is generated by combining a number of the derived YE OR TREE values, as follows:

1. The polynomial divider is set to the selected 32-bit polynomial, e.g. the CH 1 32-bit polynomial, evaluate mode of the PD 509, as described hereinafter.
2. The polynomial divider is loaded with a selected preconditioning constant PREZE unique to a selected checkword to be formed.

Each of the YE OR TREE values are "added" into the polynomial divider in the order in which they were generated. The result in the polynomial divider is the checkword CHKZE.

This process is repeated for each set of values until a checkword is generated for each set.

The preceding description has been in terms of even cycle operation; odd cycle operation is identical except that rather than accessing YE values, YO values are accessed; instead of extracting TREE values from buffer 630, values TREO are extracted; and finally the preconditioning constant is PREZO and the checkwords are identified as CHKZO.

Accordingly, each recheck cycle (20 of which are carried out interleaved with each main cycle) transfers a set of checkwords to the vital relay driver. This set of checkwords includes a pair of checkwords, CHKZE and CHKZO, for each set of results of the recheck test. However, in addition to these, the recheck check words also include other check words related, for example, to the clearing operation of the TRE buffer as well as the clearing operation of the TRETMP buffer. Finally, in each recheck cycle, a first recheck checkword is formed by the "sum" (via the polynomial divider) of all other recheck check words in that cycle.

The recheck check words CHKZE and CHKZO (as well as all other check and recheck check) words are processed through one more step before they are transferred to the VRD. We wish to ensure that check (or recheck) words from one cycle will not validate operations in any other cycle. The reason behind this desire should be apparent. To effect this goal, the primary processor alters each computed check (and recheck) word by a unique quantity. The VRD is arranged to effect a complementary process. As a result of check word CHKZE (for example) computed at the primary processor becomes CHKZE+U(n,k). U(n,k) is different for every check word on every recheck cycle (it is never repeated during the same one second main cycle). At the VRD, the received word CHKZE+U(n,k) is manipulated with U(n,k) to produce CHKZE. Since each processor (primary and VRD) independently determines U(n,k), the check words must be accessed by the VRD in the correct order. Any other order will not produce CHKZE (for example), and in the absence of CHKZE, the VRD will signal an error and prevent the effectiveness of the computed results.

Complete Description

Figure 4:
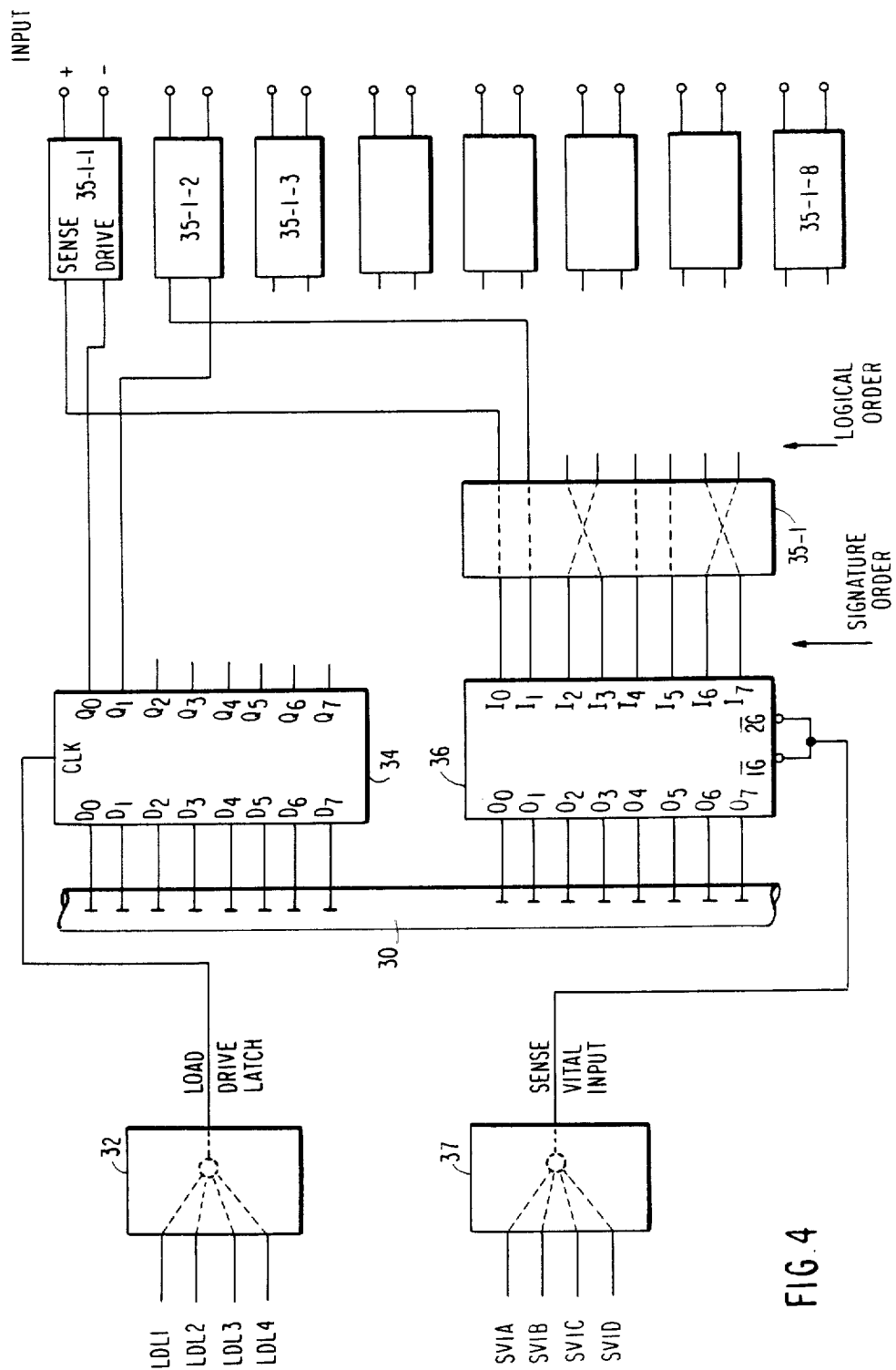
FIGS. 4 and 5 are block diagrams of the input equipment.
Figure 5:
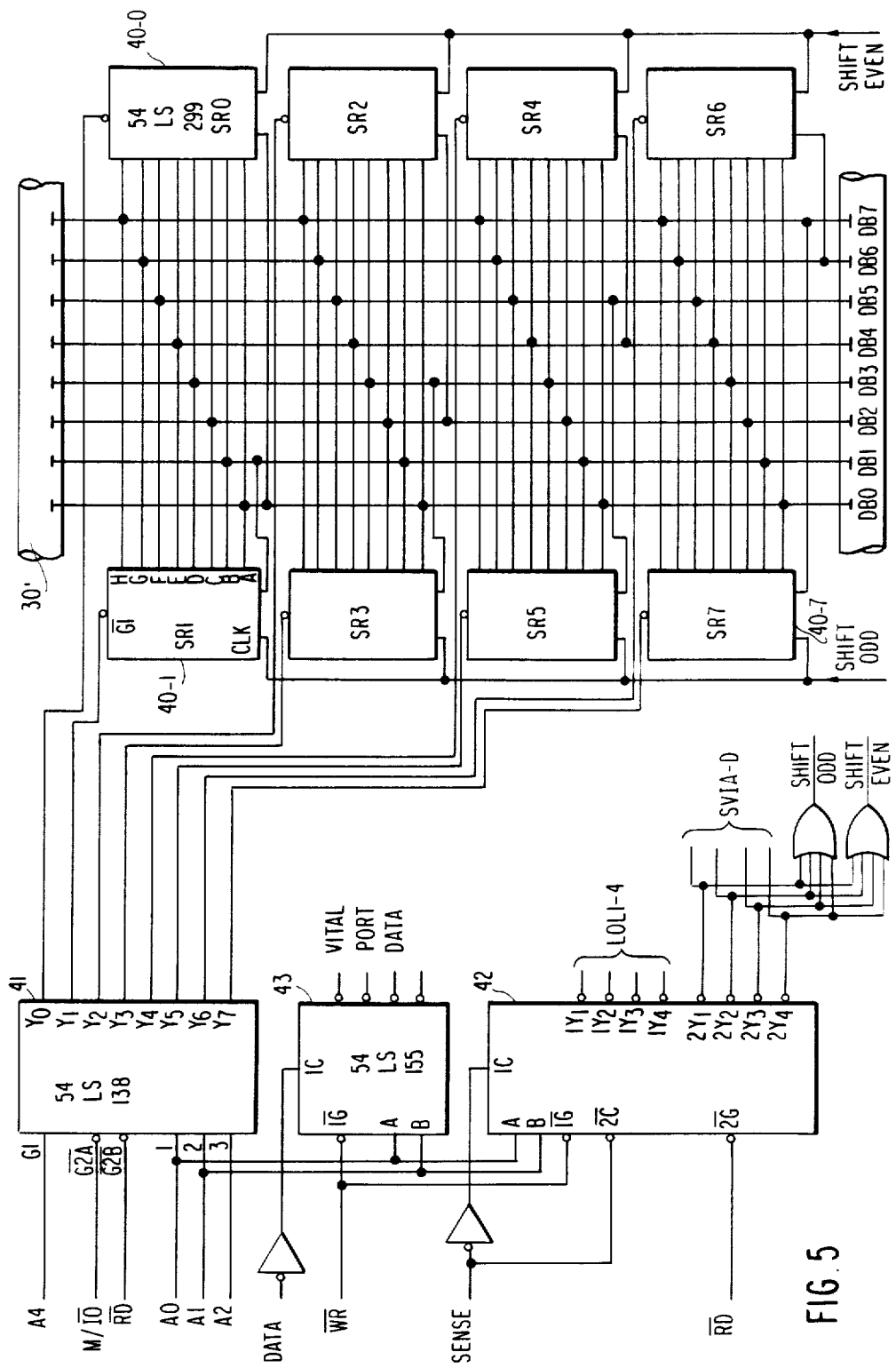

FIGS. 4 and 5 illustrate the input arrangement for the vital processor. Input actually has two connotations, in a first connotation input refers to information input, which is the information which is processed in order to produce the output functions to operate various devices. However, input has another connotation in the sense of signals fed to the processor. In this connotation, input refers not only to input information, but output information as well. Therefore, in connection with FIGS. 4 and 5 and the accompanying description, the "input" conditions being sensed include not only input information but output information as well.

FIG. 4 illustrates a plurality of input sensing circuits 35-1-1 through 35-1-8, each arranged to sense one bit of input; in particular, whether or not the voltage between the terminals + and − or is not in excess of a given threshold. The sensing circuits 35-1, etc. are shown in more detail in FIG. 1C and are further described below. Each sense circuit includes a drive input, as well as the condition sensing input (+, −). The drive input is derived from a latch 34 which has an output for each sense circuit. The input to the latch 34 is derived from the bus 30 and is loaded on the presence of the signal "load drive latch". This control signal is derived from the selector 32 which, as is illustrated, is capable of selecting any one of a LDL1 through LDL4 to produce the "load drive latch". The bit pattern latched at the time of "load drive latch" is determined by the condition of the different conductors in the bus 30.

Each of the sense circuits also includes a sense output terminal, and the different sense output terminals are coupled to different inputs of a signature element 35-1. As illustrated in FIG. 4, corresponding inputs and outputs of the signature element 35-1 are not necessarily connected together. This provides for a group signature as already described. The sense outputs, as modified by the signature element 35-1 are then applied to a data buffer 36. The buffer 36 operates in the presence of the "sense vital input" control signal which is derived from selected 37. As illustrated in FIG. 4, selector 37 can produce the "sense vital input" which is employed in the buffer 36 from any one of four inputs, SV1A through SV1D. When enabled, the sensed signals are applied to different conductors of the bus 30. Accordingly, it should be apparent that the arrangement of FIG. 4 meets the requirements in the description heretofore given.

FIG. 5 illustrates the remainder of the interface between the input and the processing device mainly for the purpose of transposing the sensed information as shown in FIGS. 1A and 1B. More particularly, a plurality of shift registers 40-0 through 40-7 are connected to a series of conductors DB0 through DB7 which are in turn connected to corresponding conductors in the bus 30. Indeed, each of the shift registers has two sets of connections in these conductors. Each shift register has a serial input terminal connected to a different one of the conductors, e.g. shift register 40-0 has a serial input terminal connected to DB0, SR1 has a serial input connected to DB1 . . . and SR7 has a serial input connected to DB7. Each time a different sensing bit pattern is applied to the sense circuits via the latch 34, and then enabled back onto the bus via buffer 36, the shift registers 40-0 through 40-7 have their contents shifted one place. After a number of sensing bit patterns (units) have been applied to the bus 30 in unit serial order equal in length to the length of the shift registers, each of the shift registers is full. In order to transpose the data so far described, the shift registers are read out in parallel. For this purpose, the shift registers can be read in turn via the demultiplexer 41. On reading a particular shift register, its contents are placed broadside or parallel on the conductors DB0–DB7. Those skilled in the art will understand that the eight conductors shown for broadside reading the shift registers is only exemplary. The output of each shift register is placed on a different conductor in the CPU bus 30'. The length of the shift registers should match the number of conductors in the bus 30'. If the conductor 30' has 8 conductors, then 32 bits can be passed in transposed form of four groups of 8 bits each. Obviously, other arrangements are also possible.

FIGS. 1A and 4 illustrate the use of the input sense circuits 35-1-1 through 35-1-n. A schematic of a suitable circuit is shown in FIG. 1C. The terminals IN+ and IN− are the input terminals to the control system, and the condition of these terminals (the voltage across them) is the parameter being sensed. An input which is on, has a positive voltage across the terminals exceeding a given threshold, and an input that is off has no voltage across the terminals or a voltage below the threshold. The driving bit pattern is applied to input terminal DRIVE, and the corresponding output is taken from the terminal SENSE. In the absence of a voltage across the input terminals, the optical coupler LC3 is not transmitting, transistor Q6 is on and the voltage at the terminal SENSE, is low. This condition is maintained regardless of the bit pattern at the terminal DRIVE, i.e. when the input terminal is off, the bit pattern available at the terminal SENSE is a null bit pattern.

On the other hand, when there is a voltage across the terminals IN+ and IN− in excess of a given threshold, then the optical coupler LC3 can transmit, enabling the voltage at the terminal SENSE to go high. However, this condition is inhibited when the potential at the terminal DRIVE goes low. When the input at DRIVE is low, the optical conductor LC2 conducts, which inhibits conduction of LC3, allowing the potential at the terminal SENSE to go high. Only when the potential at DRIVE is high, will the output at SENSE (in the presence of an on condition at the input) be low. Accordingly, when the input terminal is off, the terminal SENSE is low, and when the input terminal is on, the voltage at SENSE is the inverse of the voltage at DRIVE. The sense circuit 35-1-1 is vital in that no failure condition will allow the terminal SENSE to repeat, in inverted form, the bit pattern DRIVE, and thus this pattern is indicative of an on terminal. Any failure in the sense circuit 35-1-1 will tend to simulate an off input condition, which, since it is restrictive, is a safe failure. While the circuit of FIG. 1C is that used in an embodiment of the invention which has actually been constructed, those skilled in the art will perceive how various changes and modifications can be made without departing from the scope of the invention.

In addition to sensing the condition of the input terminals, it is also necessary for apparatus to sense the condition of output terminals. Whereas in the case of the input terminal, any failure which simulated the presence of an on input condition (in the absence of such a condition) had to be guarded against, the converse is true in the output terminal. More particularly, sensing the output condition in a vital fashion requires that no failure mechanism be allowed which would simulate an off output condition when the output terminal is actually on. This is implemented, in the circuit shown in FIG. 1H, which is an absence of current detector (AOCD).

Figure 1H:
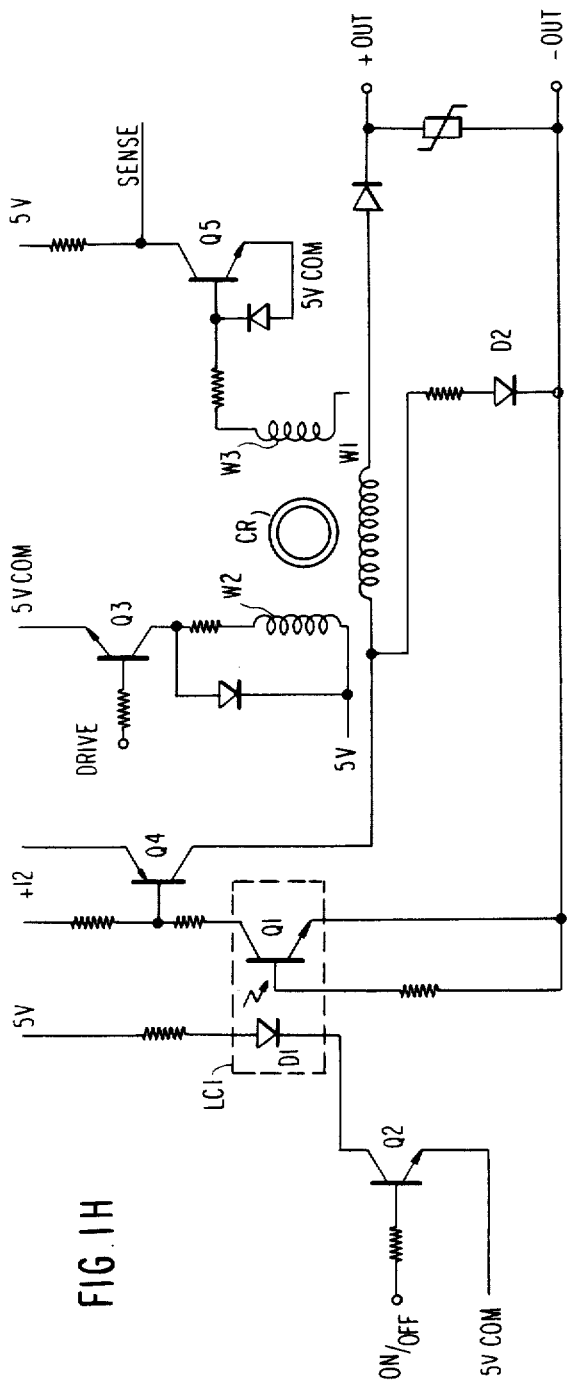
FIGS. 1H and 1J are useful in describing the AOCD and its method of operation.

Referring now to FIG. 1H, a terminal ON/OFF is provided for controlling the condition of the illustrated, representative, output terminal. This terminal is driven by the output of the primary processor 3. As shown in FIG. 1H, the transistor Q2 is rendered conductive when the output is to be on, and at other times it is rendered non-conductive. When transistor Q2 conducts, the optical coupler LC1 transmits optically to enable the transistor Q1. Enabling transistor Q1 enables transistor Q4, which provides a current path through the winding W1 to the terminals OUT+ and OUT−. The diode D2, a light emitting diode, performs a telltale indicating by the presence of an optical output, that the output terminals OUT+ and OUT− are in an on condition.

The remaining elements in FIG. 1H comrise the elements for sensing the condition of the output terminals OUT+, OUT−. More particularly, these elements include an additional pair of windings W2, W3, magnetically coupled by a core CR. So long as current is traversing winding W1, in excess of a given threshold, the winding CR is saturated; only in the absence of current (in which event the output is in an off condition) is core CR unsaturated.

For the purpose of driving the sensing circuit, a terminal DRIVE is coupled through a resistor to the base of a transistor Q3. Accordingly, in the presence of a positive voltage, the transistor Q3 conducts, and current flows through the winding W2. A voltage across the winding W3 is arranged to enable the transistor Q5, the collector of which is coupled to the output terminal SENSE. The windings W2 and W3 are arranged so that in the absence of a saturation condition of the core CR, the transition, in turning on the transistor Q3, will produce a voltage to enable the transistor Q5. Thus, a positive transition at the drive terminal produces a negative transition at the sense terminal, i.e. the driving bit pattern is inverted. However, this in only true when the core CR is unsaturated, for when the core CR is saturated, the flux produced as a result of the transition in the current in winding W2 does not produce a corresponding voltage in the winding W3, and therefore the terminal SENSE produces a null bit pattern. Furthermore, the circuit of FIG. 1H is designed so that there is no failure mechanism which would allow the driving bit pattern to be reproduced, in its inverted form, at the SENSE terminal, unless the output is in an off condition.

Figure 1J:
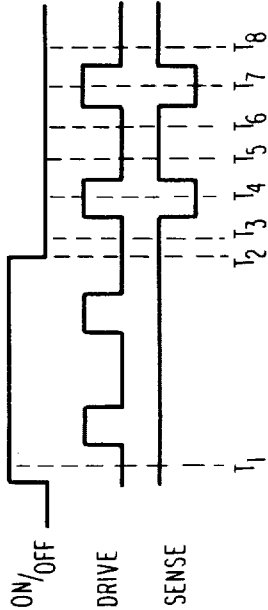

This operation is illustrated with the representative waveforms shown in FIG. 1J, including the waveform at the ON/OFF terminal, a waveform for the DRIVE Terminal, and the resulting waveform at the SENSE terminal. As shown in FIG. 1J, between times $T_1$ and $T_2$, the ON/OFF terminal is on. During this period of time, the terminal SENSE remains high regardless of the driviing bit pattern because the core CR is saturated, and therefore transitions in the current level in winding W2 do not produce a resulting voltage in the winding W3.

However, at the time $T_3$, when the ON/OFF terminal is off, and the driving bit pattern is high, the sense voltage is low. At times $T_5$ and $T_6$, when the driving bit pattern is low, the sense voltage is high, and finally at time $T_7$, the driving bit pattern is high, the sense voltage is low. Thus, when the output terminals OUT+ and OUT− are on, the sense voltage does not respond to the driving bit pattern, but when the output terminals OUT+ and OUT− are off, then the bit pattern at SENSE is an inverted replica of the bit pattern applied at DRIVE.

Figure 8:
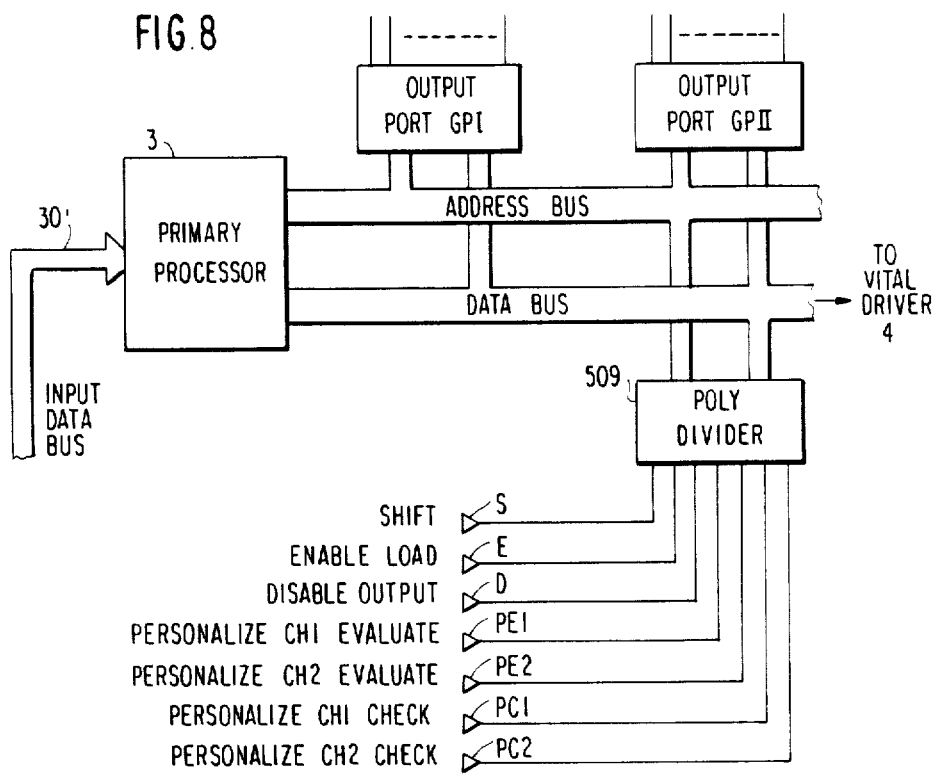
FIG. 8 illustrates how the polynomial divider 509 is connected as peripheral to the primary processor 3, and specifically breaks out the control bits (also derived from the primary processor 3) which are used to operate the polynomial divider 509 in its various modes.

FIG. 8 illustrates a block diagram of the relationship between the primary processor 3 and the polynomial divider 509. The polynomial divider 509 is described in more detail in FIG. 9 and 10, it suffices here to note that the polynomial divider 509 includes a 32-stage shift register with a controllable feedback network that can be personalized to operate in two different modes. A first mode can be termed the evaluation mode in which 32-bit quantities are manipulated. In this mode, the feedback network for the shift register can be personalized to one of two different code sets corresponding to channel 1 or channel 2. In this mode, the shift register will, in response to appropriate control commands, load a 32-bit quantity from the data bus, execute a controlled number of shifts, "add" modulo 2, a 32-bit quantity contained on the data bus, with the quantity contained in the shift register, and after a sequence of these operations, output a 32-bit quantity to the data bus.

In a second mode of operation, the shift register is loaded with a 14-bit quantity and, in response to appropriate commands, produces an 18-bit quantity corresponding to the 18 check bits which are related to the 14 bits originally loaded, by one of two code rules, corresponding to channel 1 or channel 2 operations. In this so-called check mode, 14 bits are loaded from the data bus in the 14 low bit positions of the 32-bit shift register, and then with the shift register feedback network personalized to either channel 1 or channel 2 code rules, the shift register is shifted a predetermined number of times and produces an 18-bit result, which is the check bits associated with the 14 bits originally loaded, by the selected code rule. This latter mode of operation is useful to check whether or not a 32-bit word is or is not a member of the appropriate code set. This is accomplished by personalizing the shift register for check mode along with the appropriate code rule, loading the low order 14 bits of the word to be checked into the low order 14 bits of the shift register, and operating the shift register in the check mode to produce 18 check bits. These 18 check bits can then be compared, bit for bit, with the 18 high order bits of the 32-bit word that was originally submitted for testing. If the comparison is an equality, then the originally submitted 32-bit word is a word in the appropriate code set, and vice versa. Accordingly, the polynomial divider, and more specifically the shift register located therein, responds to the control commands shift, enable load, disable output, personalize channel 1 evaluate mode, personalize channel 2 evaluate mode, personalize channel 1 check mode and personalize channel 2 check mode. The specific control commands are provided by the primary processor 3, in a manner that will be apparent to those skilled in the art after reviewing the softeware description, below.

Figure 9:
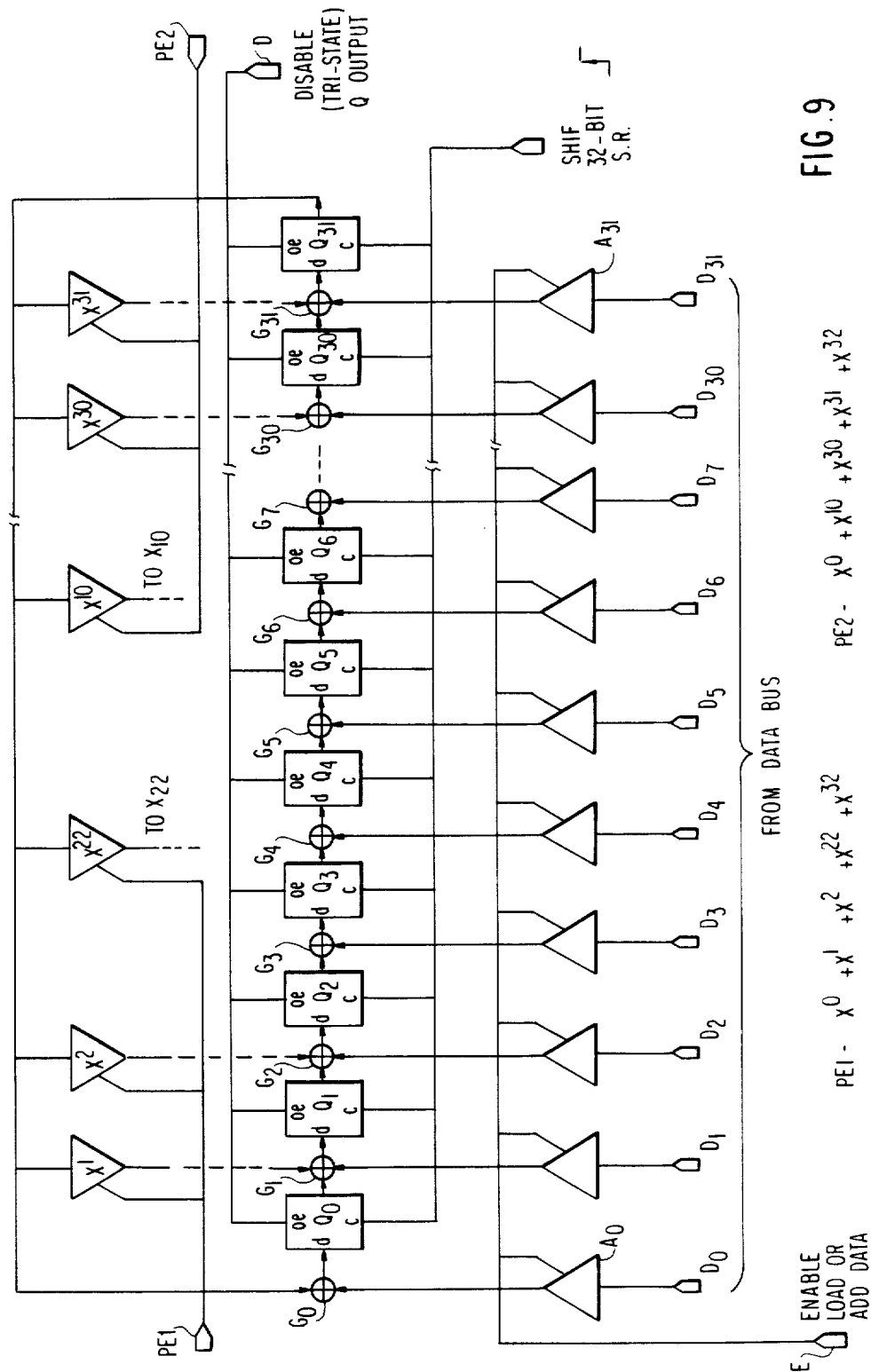
FIG. 9 is a schematic of the polynomial divider, specifically the shift register and its peripheral apparatus arranged to operate in the evaluation mode.

FIG. 9 shows the shift register (comprising stages $Q_0$–$Q_{31}$ of the polynomial divider 509). Each stage has an input from an exclusive OR gate designated X, with a numerical subscript identical to the numerical subscript of the stage, and therefore exclusive OR gates $X_0$–$X_{31}$ are present. In general, an exclusive OR gate can have up to three inputs, an input from the output of the preceding stage, an input from a gated input amplifier with the corresponding subscript or an input from a gated feedback buffer amplifier of corresponding superscript (i.e., $X^1$ through $X^{31}$). Gate $G_0$ is different in that firstly it has no input from a preceding stage, and secondly there is no feedback amplifier, the feedback path to gate $G_0$ is always present. For enabling the loading or adding of data, the enable (E) control terminal gates the gated amplifiers $A_0$–$A_{31}$ to provide the corresponding bit from a data bus to the associated exclusive OR gate. To personalize the feedback of the shift register, two control terminals are present, PE1 and PE2, the former personalizing the shift register for evaluation in channel 1, the latter personalizing the shift register for evaluation in channel 2. As can be seen from FIG. 9, the personalization corresponds to enabling different sets of the gated feedback buffer amplifiers, $X^1$, $X^2$ and $X^{22}$ for channel 1, and $X^{10}$, $X^{30}$ and $X^{31}$ for channel 2. Another control terminal is the S or shift terminal which is coupled to the clock input of each of the stages $Q_0$ through $Q_{31}$. A positive going transition at the S terminal provides for a right shift, one stage per positive transition. Finally, the D control terminal provides for disabling the tri-state Q outputs of the stages $Q_0$–$Q_{31}$. Normally, that is when not disabled, the shift register outputs are available to the data bus.

Expression evaluation uses the mode shown in FIG. 9 and performs the following operations:

1. The preconditioning constant is loaded into the 32-bit shift register, by placing the preconditioning constant on the data bus and enabling the E control terminal. The S terminal undergoes a positive transition and the data is loaded, e.g. the bit pattern at $D_0$ through $D_{31}$ then appears at $Q_0$–$Q_{31}$ (the D terminal is rendered high to disable the outputs and no feedback path is enabled).

Thereafter, the shift register is personalized for channel 1 or channel 2 operations by gating either PE1 or PE2. The S terminal is then pulsed a number of times, producing a right shift for each pulse, as indicated above, in an embodiment of the invention actually constructed, nine shifts are used.

To add a 32-bit quantity then, the 32-bit word to be added is placed in the data bus and then appears at $D_0$ through $D_{31}$. The E terminal is gated and the S terminal is pulsed (and this time the D terminal is not gated) but the feedback is disabled. After this first shift, at any stage $Q_n$, the condition is the modulo 2 sum of $D_n$ and $Q_{n-1}$, in the special case of $Q_0$, that stage is the modulo 2 sum of $D_0$ and $Q_{31}$.

After the modulo 2 addition, the S control terminal is pulsed n times (again n is 9 in the embodiment constructed). This last sequence of steps is repeated for each factor to be "added". The result in the shift register can then be parallel loaded to the data bus for use by the primary processor 3.

FIG. 10 is a detailed schematic of the shift register in the polynomial divider 509 in the check mode. Comparing FIGS. 9 and 10, the differences between the evaluate mode and the check mode should be apparent. For one thing, whereas in FIG. 9 (evaluate) there is a feedback path from the 32nd stage ($Q_{31}$) to the first stage ($Q_0$), in the check mode, that feedback path is broken. Rather, there is a feedback path from the 14th stage ($Q_{13}$) to the first stage ($Q_0$), and there is no other feedback in the first 14 stages. The feedback path from the 32nd stage ($Q_{31}$) is taken back to the 15th stage ($Q_{14}$). There are two further feedback paths which are conditional on the particular channel being operated on, e.g. the 22nd stage ($Q_{21}$) for first channel operation and the 26th stage ($Q_{25}$) for the second channel operation. First channel operation is personalized by gating the terminal PC1, to enable the gated buffer $X^{21}$, and second channel operation is personalized by gating the terminal PC2 to enable the gated buffer $X^{25}$. The switching arrangement (under control of the primary processor 3) to personalize to the evaluate or check mode, although not illustrated, should be apparent to those skilled in the art. Furthermore, the gated buffer amplifiers which are not involved in the evaluate mode operation are not shown in FIG. 9, and similarly, the gated buffer amplifiers not involved in the check mode are not shown in FIG. 10, for clarity.

In order to operate in the check mode, the primary processor, by controlling the polynomial divider 509, performs the following procedures.

A 14-bit information field (that is, the T/F bit and the following 13-bit "name") are placed in the lower order 14 bits of the data bus, and the E terminal is gated to enable the gated buffer amplifiers $A_0$ through $A_{13}$. At the same time, the shift terminal S is gated to clock each stage of the shift register. After this operation, the state of the shift register is equivalent to the corresponding data bus bit ($Q_n = D_n$, for n=0, 1, 2, 3, . . . 13). And $Q_n$ is 0 for n=14, 15, . . . 31.

Thereafter, the terminal S is pulsed, 14 times, producing a right shift of the contents of the shift register for each pulse at the terminal S. If we are operating in channel 1, the terminal PC1 is also enabled, or if we are operating in channel 2, terminal PC2 is enabled. The former enabling the gated buffer amplifier $X^{21}$, the latter enabling the gated buffer amplifier $X^{25}$. At the conclusion of the operation, the states of the 32 stages of the shift register $Q_0$ through $Q_{31}$ are in the following condition, the original 14-bit information field now resides in its original location, e.g. $Q_0$–$Q_{13}$, but now instead of the 18 bits $Q_{14}$ through $Q_{31}$ being 0, they correspond to the check bits in the appropriate code set (either channel 1 or channel 2) corresponding to the 14-bit information field.

The 14-bit information field which was originally loaded ($D_0$–$D_{13}$) was derived from a 32-bit value calculated or sensed in accordance with the preceding description. The purpose for loading the 14-bit information field was to derive the appropriate 18-bit check field in order to compare the 18-bit check field so derived with the 18-bit check field originally associated with the 14 bits in the primary processor 3. With the derived 18-bit check field (in stages $Q_{14}$ through $Q_{31}$), we can now compare these 18 bits with the 18 bits that had been associated with the 14-bit information field in the primary processor 3. Any suitable operation can be used for this comparison (for example an exclusive OR), and if the comparison is not an equality, then we have determined that the 32-bit word was not a word satisfying the appropriate code rules.

Software Overview

System software is organized into a number of different sections:
1. Sense input states of vital inputs.
2. Evaluate Boolean expression list.
3. Set vital direct outputs to states corresponding to the appropriate evaluated expression.
4. Accumulate main cycle check words on this cycle to be sent to the vital relay driver at the beginning of the next main cycle.

5. Perform vital "recheck" of vital outputs every 50 ms and send recheck check words set to the vital relay driver every 50 ms.

Each "entity" internal to the system is assigned 2 pairs of names. Each name is a unique 32-bit word. This 32-bit word has 2 fields, an information field and a check field. The information field is 14 bits long, so that there are 16 K such names. These names are arranged in pairs, each pair representing a "true" value and a "false" value. The pair is determined by assigning a 14-bit word whose least significant bit is a "0" as the "false" value of the pair, and assigning the complemented 14-bit word as the "true" value of the pair. Thus, there are 8 K such pairs, or, there are 8 K entities which can be assigned a unique name pair.

The 18-bit check field is then determined by polynomial division using a certain code.

A name pair is associated with each entity, and the check field for the name pair is determined by code C1,1. (C1,1 is merely the feedback configuration which will give us the 18-bit check field if we load the 14-bit information field into the PD 509 and operate it in the check mode, as described above.) This name pair is associated with the "channel 1" name of the entity.

Another code, C1,2 is then used to form different check fields for the same name pair information fields. This name pair is associated with the same entity and is called the "channel 2" name of the entity. Again, C1,2 merely identifies the feedback configuration of PD509 which will produce the 18-bit check field if we load the 14-bit information field and operate the PD509 in the check mode, as described above.

Now we see that there are 2 pairs of names associated with each entity, one pair for CH1, the other for CH2. The "false" value of each pair has the same information field, but a different 18-bit check field. The "true" value of each pair has the same information field and this field is the complement of the "false" name field, and again the 2 18-bit check fields are different.

The reason that the names are assigned as "codewords" is that a non-vital test can be made to see if any entity name is valid without actually knowing what the value of the name should be. This non-vital test is made as follows:

If the instance a 32-bit "true" value is circulated (actually the complement of the "true" value is input so that the 'true' value may be returned) through the vital input circuitry of an input port to determine the port state, the returned value may be the actual "true" value (if the port was "on"), or it may be "0000" (if the port was "off") or it may be a corrupted value.

The returned value can be checked for validity by putting its information field into the polynomial divider or PD (using the appropriate code configuration) and shifting the PD the prescribed number of times. If the resulting check field thus generated matches that of the returned 32-bit value, the returned value is a codeword. Since there are "2 to the 32" (approx. 4 billion) 32-bit words, and there is only a small set of "2 to the 14" (approx. 16 thousand) codewords, the probability that the returned value was corrupted into another code word is 1 in "2 to the 18" approx. 1 in 250 thousand).

It must be emphasized that this is only a non-vital check, used to keep "corrupted" data out of the system. If an input parameter was corrupted into another code word, however, it would not evaluate correctly in the expression evaluation anyway.

A Note About "Order"

In the following descriptions of the system software, terms like "logical order", "signature order" and "physical order" will appear in reference to the order in which values representing information about input and output ports are listed within a buffer. These terms are defined as:

Physical Order

This is the order in which the input of output port circuits appear on the printed circuit board. It has little or no significance to the software, but is used in assigning input and output functions to particular circuits on the board. Once the physical functions have been assigned to the board circuits, the "logical order" is determined.

Logical Order

Let's take the case of input boards. In an embodiment which has been constructed, there are 16 input ports on each board. There are 16 data bits in the data bus. Each bit in the data bus (bit 0 through bit F-hexadecimal notation) is assigned to the "permanent side" of the input port sense circuit. Thus, a list of the input functions assigned to one input port board, if listed in the order which is determined by the data bus bit connected to the "permanent side" of the input circuits (starting with bit 0 and ending with bit F), would be in "logical order".

Therefore when the processor outputs a set of 16 32-bit words to circulate through the input port circuitry (1 32-bit word circulates through each of the 16 input port circuits), the word meant for "logical" input port number 0 is transmitted on data bus bit 0. The same goes for port numbers 1, 2, 3, . . . , F.

Whatever goes out has to come back, and the transmitted data is eventually returned for reading by the processor. The order in which the words are returned, however, is not logical order at all. It is in "signature order".

Signature Order

The "non-permanent" side of the input port circuit is the "data sense" line. This line ends in a programming pin on the input board and is then jumpered to another programming pin which connects the "data sense" line to one of the 16 bits on the data bus. The pattern in which all 16 of the "data sense" lines of the 16 ports in group X,Y are connected through programming pins to the data bus bits is called the "group signature" of the input group.

There are 16 such group signatures defined, and one of this predefined set must be used.

The group signatures may be defined as follows:

If "AIN" is the data bus bit connected to the permanent side of the input circuit and if "AOUT" is the data bus bit connected to the "data sense" side of the input circuit, then a list showing AIN from 0 to F corresponding to the AOUT bit it is connected to defines the group signature.

Next, there is the concept of "supergroups". There may be a maximum of 16 input boards in a supergroup. Each supergroup has an I/O interface board connecting the set of up to 16 input boards (input groups) to the CPU. Each of the input boards within one supergroup must have a unique group signature.

The I/O interface board also has a signature associated with it. This is called the "supergroup signature", and is defined as follows:

The I/O interface board has 16 8-bit shift registers. The input to each serial shift register is connected to a programming pin. This pin is in turn connected to one of the 16 bits of the data bus. The pattern in which the shift register inputs are connected to the data bus bits on the I/O interface board is called the supergroup signature. Each supergroup signature in the system is unique. There is a set of 16 predefined supergroup signatures, and each signature must be one of this predefined set.

The shift registers on the I/O interface board are accessed in a fixed order, i.e. SR0 (shift register 0) is read by the processor by addressing the I/O interface board with address bits A4 through A1=0. This address will always address SR0 regardless of the supergroup signature pattern, however, the contents of SR0 vary with the signature pattern.

Now, let's see how this all fits together.

Suppose a 32-bit parameter AI1 (O,X,Y) (T) is circulated through input port O,X,Y. (∅,X,Y means logical port ∅ in group X, supergroup Y.) Which SR on the I/O interface board will this data end up in? Well, suppose the group signature for group X is such that AIN(0) corresponds to AOUT(7). Then, suppose that the supergroup signature Y connects data bus bit 7 to the input of SR5. The data AI1 (O,X,Y) (T) will end up in SR5 as a result of the two signature transpositions, the group X signature and the supergroup Y signature.

The order of the returned input port parameters within the section of the DIN buffer corresponding to group X, Y will be that which is determined by the effect of the two signatures.

All this being said, it now follows that the order in which the values of the input port parameters in DIN is that determined by the effect of the two signatures effecting input port group X, Y. This is called "signature order".

The reason that we use signatures at all is as follows. Through the other techniques we have used, we have assured ourselves that when a bit pattern is circulated through a sensing circuit, it will only be returned in its inverted form if and only if that sensing circuit is in a logical 'on' condition. We rely on two different tests to assure ourselves that no errors have crept into this sensing function, the first test is the non-vital test to assure ourselves that the sensed word is a word which satisfies the code rules set up in advance, i.e. does the 18-bit check field correspond to the 14-bit information field in accordance with the appropriate code set? The vital test generates a check word which will not be the expected check word unless every bit of the 32-bit sense word is exactly as expected. If the check word so computed is not the expected check word, then the vital driver will detect this and not allow the results to become effective. However, consider the following: a 32-bit sense word is circulated to a particular input port (in particular, the one which is associated with the 32-bit word). However, because of a malfunction, the 32-bit word is actually also connected to another port. Let us assume that the "right" port is off, and the "wrong" port is on. Let us also assume that the "wrong" port is in the same physical position as the "right" port, but on a different board. Under these circumstances, the conductor on the data bus associated with both ports would "see" a null pattern from the "right" port, and the inverted pattern from the "wrong" port. Thus, the response from the "wrong" port will be placed on the data bus and would be accepted by the remaining components of the processor and stored in the location for the "right" port. This would give the appearance that the "right" port is on, when in actuality it is off. This is an unsafe failure. The scrambling effected by the signature order, different for different groups, means that the response from the "wrong" port will not be directed to the same data conductor as is the response from the "right" port. This will preclude us from failing to detect this error.

Input States of Vital Direct Input Ports

The states of the vital direct inputs are determined by circulating two 32-bit parameter values through the vital input circuitry of each input port (one 32-bit value for each of two channels).

The returned value from this circulating operation is non-vitally checked for integrity by passing it through the PD (polynomial divider) to derive its check bits. If the check bits derived match those contained in the returned value, then it is a "codeword", and is assumed to be the "true" value, (indication that the input port is "on"). If the value returned is not a codeword, the "false" value is substituted in its place.

This operation is carried out for CH2 values also. Thus, the representation of each input port value is a total of 64-bits. These values are re-generated each main cycle (1 sec.).

Evaluate Boolean Expressions

The heart of the system is the list of Boolean expressions which define the logic of the interlocking. This list of expressions must be "primordially" safe, that is the expression list, and the order in which they are executed, must, when executed accurately, operate the signals, switches and other vital hardware at the interlocking to allow the safe passage of trains through the interlocking.

The expressions are in "sum-of-products" form and arranged in order to execution. Each expression can contain any number of product terms, which in turn can contain any number of functions.

Each expression is evaluated in two channels, and each expression in each channel produces a 32-bit result, which, if correct, is a codeword, particularly in C1,1 (CH1), or C1,2 (CH2).

There are several different types of expressions:

A. Expressions whose result is used to determine the state of a vital output (a direct output port, for example).

B. An expression whose result is used as a function in a subsequent expression in the list. The result thus generated is called a "current result", since it is valid only for the current main cycle.

C. An expression which contains its own result as a parameter in one or more of its product terms. This is called a "self-latched" expression, since it is the equivalent of a latching relay (a relay which sustains power to its coil through its own front contact).

After the expressions have been evaluated, those expressions which determine the states of the vital direct output ports are non-vitally sampled (actually only the CH1 expression result list is sampled), and the corresponding output ports are set to "on" of "off", depending on the expression result.

In addition to setting the output ports to their "assumed" correct state, two buffers of 32-bit data are compiled which represent a combination of the CH1 and CH2 expression results. These buffers are used by the "vital recheck" routine to assure that the states of the direct output ports are in their permissive states only if the expression results of both channels (64-bits) allow that direct output port to be "on". This vital assurance is left to the "recheck" routine which executes every 50 ms.

Transmit Main Cycle Checkwords to the VRD

The final arbiter of safe operation in the system is the VRD (vital relay driver). The main software must prove that it has performed all of its vital main cycle operations correctly in order to satisfy the requirements of the VRD which in turn uses this information to keep the vital relay energized. The vital relay allows power to be delivered to the direct output ports of the system through its front contacts. Each bit in the set of main checkword data must be correct for the VRD to generate a modulated digital output of a certain frequency which energizes the detector 5 so as to energize the coil of the vital relay.

The set of main checkwords is accumulated throughout the current main cycle and delivered to the VRD at the beginning of the next main cycle.

The main checkwords assure that all the internal buffers used by the system software have been vitally cleared, so that data operated on during the current main cycle has been generated during that cycle, i.e. it is not "old" data.

Vital Direct Output "Recheck"

The state of each vital direct output port is checked every 50 ms by circulating a 32-bit parameter value through the A.O.C.D. (absence of current detector) of the output port.

If the "true" value which was circulated through the A.O.C.D. is returned inverted, it provides assurance that the output port is in its "off" state. Only those output ports whose corresponding expression results (in both channels) are "true" are allowed to return any value other than the "true" value circulated through the A.O.C.D.

The recheck cycle checkword set is a set of 32-bit checkwords which represent the correspondence of expression result values with the actual states of the direct output ports.

The recheck cycle uses different data every other cycle. On the "even" recheck cycle, CH1 type values are circulated through the output A.O.C.D.'s, while on the "odd" recheck cycle, CH2 values are circulated. This provides "32-bit protection" over each 50 ms recheck cycle, and "64-bit protection" over 2 recheck cycles.

```
            High Level Routine Organization
        (Routines Listed in "Logical" Order,
         Not Necessarily in Order of Execution)
Note:  "[ ]"  indicates "interrupt driven"
Note:  (N)    indicates routine description
              given in "Note N" below.
Note:   *     indicates "produces main cycle
              checkword".
       VPINIT (1) (Initialize)
       INTRUP (2) (Produce interrupts)
[ ] FORMWM (3)
   [ ] MAIN (4)          DIRINT (5)  *DINCLR   (6)
                                     DNBXFR    (7)
                                     *DNBCLR   (8)
                                     DNAXFR    (9)
```

```
-continued
                                     *DNACLR   (10)
                                     *TPICLR   (11)
                         [ ] DIRIN1 (12)
                         [ ] DIRIN2 (13)
                             [ ] DIRIN3 (14)
                             [ ] DIRIN4 (15)
                             DIRINX (16)
                         OCKINT (17)  *OCKCLR  (18)
                                      *TPOCLR  (19)
                         OCKX (20)
                         XFRCSD (21)
                         CSINT (22)   *TPCCLR  (23)
                         *CSCLR (24)
                         RECCSC (25)
                         EVXINT (26)  *LACLR   (27)
                                      LATXFR   (28)
                                      *LATCLR  (29)
                                      *CRCLR   (30)
                                      *XCLR    (31)
                         EVALXP (32)
                         *YVCLR (33)
                         FORMYV (34)
                         *YNVCLR (35)
                         YNXFR (36)
                         XMTCSI (37)
                         *MEMCHK (38)
        [ ] RECHK (39)   TREINT (40)  TRECLR   (41)
                                      TPTCLR   (42)
                         TREX (43)
                         FORMWR (44)
                         XMTWMR (45)
```

Routines Listed in Order of Execution as
Determined by Calls in the "Intrup" Routine
The "main" cycle is nominally 1 sec.
The "recheck" cycle is nominally 50 ms.
(i.e. the "rechk" routine is called to
execute every 50 ms. and is nominally
less than 25 ms. long)
The routine "VPINIT" is executed only on
system restart or "power on".
A. VPINIT (System Restart)
B. INTRUP (produces 20 interrupts at 50 ms. intervals,
          called "50 ms. Intr 0", "50 ms. Intr 1", etc.,
          through "50 ms. Intr 19", as well as 4 other
          interrupts (Dirin1 Intr", "Dirin2 Intr",
          "Dirin3 Intr", & "Dirin4 Intr".))
Note:     "50 ms. Intr 0" initiates the 1 sec.
          main cycle.
Note:     * Indicates "Produces Main Cycle
          Checkword".
Note:     The times "OXX' ms and 'OYY' ms are selected so
          that DIRIN3 and DIRIN4 are executed 7 ms apart
          and an integral number of 7 ms from the
          execution of DIRIN2. This is done to assure
          that vital input sensing is immune from 60 HZ
          or 100 HZ impressed AC on the input port lines.
          Times can vary depending on the frequency of
          the impressed AC to which the system must be
          immune.

| Time From Main Cyc Start | Intr Name | Routine Called | "Main" Subroutine List |
|---|---|---|---|
| 000 ms. | 50 ms. INTR0 | Call RECHK | 1. DIRINT |
|  |  |  | 2. OCKINT |
|  |  | Jmp MAIN | 3. OXKX |
|  |  |  | 4. XFRCSD |
| 050 ms. | 50 ms. INTR1 | Call RECHK | 5. CSINT |
|  |  | Ret to MAIN | 6. RECCSC |
|  |  |  | 7. EVXINT |
| 085 ms. | *DIRIN1 INTR | Call DIRIN 1 | HALT1 |
|  |  | Ret to MAIN |  |
| 092 ms. | *DIRIN2 INTR | Call DIRIN2 | 8. DIRINX |
|  |  | Ret to MAIN | 9. EVALXP |
|  |  |  | 10. YVCLR |
| 100 ms. | 50 ms. INTR2 | Call RECHK | 11. FORMYV |
|  |  | Ret to MAIN | 12. YVNCLR |
|  |  |  | 13. YVNXFR |
| 0XX ms. | *DIRIN3 INTR | Call DIRIN3 | 14. XMTCSI |

| | | Ret to MAIN | 15. MEMCHK |
| --- | --- | --- | --- |
| | | | 16. FORMWM |
| 0YY ms. | *DIRIN4 INTR | Call DIRIN4 | HALT2 |
| | | Ret to MAIN | |
| 150 ms. | 50 ms. INTR3 | Call RECHK | |
| | | Change | |
| | | "HALT1" To | |
| | | "CONTINUE" | |
| | | Ret to MAIN | |
| 200 ms. | 50 ms. INTR4 | Call RECHK | |
| | | Ret to MAIN | |
| 250 ms. | 50 ms. INTR5 | Call RECHK | |
| | | Ret to MAIN | |
| 300 ms. | 50 ms. INTR6 | CALL RECHK | |
| | | Ret to MAIN | |
| 350 ms. | 50 ms. INTR 7 | CALL RECHK | |
| | | Ret to MAIN | |
| 400 ms. | 50 ms. INTR 8 | Call RECHK | |
| | | Ret to MAIN | |
| 450 ms. | 50 ms. INTR9 | Call RECHK | |
| | | Ret to MAIN | |
| 500 ms. | 50 ms. INTR10 | Call RECHK | |
| | | Ret to MAIN | |
| 550 ms. | 50 ms. INTR11 | Call RECHK | |
| | | Ret to MAIN | |
| 600 ms. | 50 ms. INTR12 | Call RECHK | |
| | | Ret to MAIN | |
| 650 ms. | 50 ms. INTR13 | Call RECHK | |
| | | Ret to MAIN | |
| 700 ms. | 50 ms. INTR14 | Call RECHK | |
| | | Ret to MAIN | |
| 750 ms. | 50 ms. INTR15 | Call RECHK | |
| | | Ret to MAIN | |
| 800 ms. | 50 ms. INTR16 | Call RECHK | |
| | | Ret to MAIN | |
| 850 ms. | 50 ms. INTR17 | Call RECHK | |
| | | Ret to MAIN | |
| 900 ms. | 50 ms. INTR18 | Call RECHK | |
| | | Ret to MAIN | |
| 950 ms. | 50 ms. INTR19 | Call RECHK | |
| | | Ret to MAIN | |

1. VPINIT—Initialize System—

The VPINIT Routine is called only on system power-up or on system restart. Its tasks are as follows:

A Configure the processor Board Timers.

There are 3 16-bit counters on the main processor board. The first is configures as "Timer 0", and is used as the interrpt timer. It is driven by a 1 MHz. clock. The second is concatenated with the third forming a 32-bit timer, called "Timer 1,2". It is driven by the same 1 MHz. clock and once set is never reset until VPINIT executes again. This timer is used as the "cycle time check", and provides proof (in the form of main cycle checkwords) that the initiation of the 1 sec. main cycle does occur every second, and that the execution of the interrupt driven routines DIRIN1, DIRIN2, DIRIN3, and DIRIN4 occurs at precisely the correct points in the main cycle.

B. Initialize [MISC] Buffer Entries.

Those entries in the [MISC] buffer which are used by the system routines are initialized to their proper start-up values.

C. Initialize All Vital Direct Output Ports to "Off".

2. INTRUP—"Interrupt" Routine—

The operation of the INTRUP routine is described above. Its only purpose is to initiate execution of those interrupt driven routines (RECHK, DIRIN1, DIRIN2, DIRIN3 and DIRIN4) at the proper times in the main cycle, and to initiate execution of the main cycle at precisely 1 sec. intervals.

3. FORMWM—Form 'Main Checkword List' Whose Entries Have Been Calculated During The Previous Main Cycle.

A. The main checkword list is accumulated in buffer [W] (Main). It is transmitted to the VRD once per main cycle at the beginning of the cycle during the 1st execution of "RECHK"routine of the main cycle. (The main cycle is nominally 1 sec. long).

The list is accumulated during the previous main cycle and indicates that all of the "vital" checks required during the main cycle have been made. These checks insure that those system RAM buffers which must be cleared each cycle have indeed been cleared, and that the 1 sec. main cycle time is accurate, as well as those times which the "DIRIN1, DIRIN2, DIRIN3 and DIRIN4" routines have been executed.

B. The main checkword list is prefaced by a set of data which provides "offset" information to the VRD. This data is called "main checkword parameter data". The main checkword offset data are the 4 16-bit words MD, MI, MD' and MI'.

MD=Main Checkword Displacement.

MI=Main Checkword Increment.

MD'=Main Checkword Incremental Displacement.

MI'=Main Checkword Incremental Increment.

Each set of main checkwords (there are 20 16-bit word pairs in the set) has the same "base values". However, before transmission to the VRD, the value of each 16-bit word in the set has an "offset" subtracted from it. This has the effect of making the actual checkword values in each set different for every main cycle since the offset calculated for each main cycle changes each cycle. Thus, the main checkword buffer [W] (Main) does not have to be vitally cleared each cycle, and if the values in the buffer should become "stuck", they would not be acceptable to the VRD for more than the first cycle.

The calculation of the main checkword "offset" is as follows:

Given that there are 40 16-bit main checkwords in the set (20 pairs), each word can be labeled WM8N), where $N = 0, 1, 2, 3, 4, \ldots, 39$.

Let the "base" value of checkword WM(N) be denoted WM(N)*.

Let the main cycle number be designated as Q where Q=0 is the first main cycle after system start-up, Q=1 is the next main cycle, Q=2 the next, and so on. Q will increment indefinitely until a system restart is required (more on this later).

On main cycle 0 (Q=0), the actual checkword values are calculated as follows:

$$WM(0) = WM(0)^* - (MD + MD' + MI + MI')$$
$$WM(1) = WM(1)^* - (MD + MD' + MI + MI' + MI + MI')$$
$$WM(2) = WM(2)^* -$$
$$(MD + MD' + MI + MI' + MI + MI' + MI + MI')$$

$$\cdot$$
$$\cdot$$

$$WM(N) = WM(N)^* - (MD + MD' + (N + 1)^*(MI + MI'))$$

On the 2nd main cycle (Q=1), the actual checkword values are calculated as follows:

$$WM(0) = WM(0)^* - (MD + MD' + MD' + MI + MI' + MI')$$
$$WM(1) = WM(1)^* -$$
$$(MD + MD' + MD' + MI + MI' + MI' + MI + MI' + MI')$$

.
.
.

$$WM(N) = WM(N)^* -$$
$$(MD + (N + 1)^*MD' + (N + 1)^*(MI + MI' + MI'))$$

Therefore, as general rule, the "offset" subtracted from the base value of WM(N) on main cycle "Q" is:

$$\text{Offset} = MD + (Q+1)^*MD' + (N+1)^*MI + (Q+1)^*(N+1)^*MI'$$

Thus, even though the "initial" offset values (MD, MD', MI, MI') are transmitted to the VRD at the head of each main checkword set, the VRD will expect the vaues in the 40-word main checkword set to be offset from the previous set by the value of the offset accumulated from the previously executed main cycles.

The offset values are only initiated from the initial main checkword offset values in 3 cases:
1. On system "power on".
2. On system restart.
3. After the VRD has dropped out, timed its vital time delay, and is ready to begin accepting main cycle checkword data.

C. The next 4 16-bit values are the initial offsets for the recheck checkwords, denoted as follows:
RD = Recheck Checkword Displacement
RI = Recheck Checkword Increment
RD' = Recheck Checkword Incremental Displacement
RI' = Recheck Checkword Incremental Increment.

The description of how the recheck checkword set is constructed and offset is listed under the "recheck" routine description (39).

D. The remainder of the "main checkword parameter data" are as follows:
1. CYCNBR (cycle number) (16-bits)
2. CYCTOT (16-bits)
3. "0000" (6 16-bit words)

E. The Definition of the 20 main checkword pairs is as follows:
1. MCKSUM—Main Checkword Sum—
   The "MCKSUM" checkword is a "sum" (via the PD, using code 3,1 or evaluate mode, PE1) of the remaining 19 checkword pairs in the main checkword set.
2. CHKIN—DIN & DIN' Buffers Cleared—
   Formed by the "PD Sum" (via C3,1 or PE1) of:
   DIN Start Address
   DIN Contents Filled with KIB
   DIN End Address
   DIN' Start Address
   DIN' Contents Filled with KIB'
   DIN' End Address
   Sum Preconditioned by PREIN
3. CHKIB'—DINB & DINB' Buffers Cleared—
   Formed by "PD sum" (via C3,1 or PE1) of:
   DINB Start Address
   DINB Contents Filled with KIA
   DINB End Address
   DINB' Start Address
   DINB' Contents Filled with KIA'
   DINB' End Address
   Sum Preconditioned by Constant PREINB
4. CHKIA—DINA & DINA' Buffers Cleared —
   Formed by "PD sum" (via C3,1 or PE1) of:
   DINA Start Address
   DINA Contents Filled with KIO
   DINA End Address
   DINA' Start Address
   DINA' Contents Filled with KIO'
   DINA' End Address
   Sum Preconditioned by Constant PREINA
5. CHKIT—TEMPI & TEMPI' Buffers Cleared—
   Formed by "PD sum" (via C3,1 or PE1) of:
   TEMPI Start Address
   TEMPI Contents Filled with KIT
   TEMPI End Address
   TEMPI' Start Address
   TEMPI' Contents Filled with KIT'
   TEMPI' End Address
   Sum Preconditioned by Constant PREIT
6. CHKOC—OCK & OCK' Buffers Cleared—
   Formed by "PD sum" (via C3,1 or PE1) of:
   OCK Start Address
   OCK Contents Filled with KOC
   OCK End Address
   OCK' Start Address
   OCK' Contents Filled with KOC'
   OCK' End Address
   Sum Preconditioned by Constant PREOCK
7. CHKOTC—TEMPO & CSCTMP Buffers Cleared—
   Formed by "PD sum" (via C3,1 or PE1) of:
   TEMPO Start Address
   TEMPO Contents Filled with KOT
   TEMPO End Address
   CSCTMP Start Address
   CSCTMP Contents Filled with KCSC
   CSCTMP End Address
   Sum Preconditioned by Constant PREOTC
8. CHKCS—CS & CS' Buffers Cleared—
   Formed by "PD sum" (via C3,1 or PE1) of:
   CS Start Address
   CS Contents Filled with KCS
   CS End Address
   CS' Start Address
   CS' Contents Filled with KCS'
   CS' End Address
   Sum Preconditioned by Constant PRECS
9. CHKLA—LA & LA' Buffers Cleared—
   Formed by "PD sum" (via C3,1 or PE1) of:
   LA Start Address
   LA Contents Filled with KLA
   LA End Address
   LA' Start Address
   LA' Contents Filled with KLA'
   LA' End Address
   Sum Preconditioned by Constant PRELA
10. CHKCR—CR & CR' Buffers Cleared—
    Formed by "PD sum" (via C3,1 or PE1) of:
    CR Start Address
    CR Contents Filled with KCR
    CR End Address
    CR' Start Address
    CR' Contents Filled with KCR'
    CR' End Address
    Sum Preconditioned by Constant PRECR
11. CHKLAT—LAT & LAT' Buffers Cleared—
    Formed by "PD sum" (via C3,1 or PE1) of:

LAT Start Address
LAT Contents Filled with KLAT
LAT End Address
LAT' Start Address
LAT' Contents Filled with KLAT'
LAT' End Address
Sum Preconditioned by Constant PRELAT CHKX—X & X' Buffers Cleared—
Formed by "PD sum" (via C3,1 or PE1) of:
X Start Address
X Contents Filled with KX
X End Address
X' Start Address
X' Contents Filled with KX'
X' End Address
Sum Preconditioned by Constant PREX 13. CHKY—YE & YO Buffers Cleared—
Formed by "PD sum" (via C3,1 or PE1) of:
YE Start Address
YE Contents Filled with KYE
YE End Address
YO Start Address
YO Contents Filled with KYO
YO End Address
Sum Preconditioned by Constant PREY 14. CHKYN—YE(N-1) & YO(N-1) Buffers Cleared—
Formed by "PD sum" (via C3,1 or PE1) of:
YE(N-1) Start Address
YE(N-1) Contents filled with KYEN
YE(N-1) End Address
YO(N-1) Start Address
YO(N-1) Contents filled with KYON
YO(N-1) End address
Sum Preconditioned by Constant PREYN 15. CHKMEM—PARTIAL Prom Memory Checksum—
The prom memory of each system is divided into blocks of 800H bytes. Each main cycle, one of the blocks is "summed" via the PD using code C3,1 or PE1, starting at block 0 and continuing on successive cycles until all "B" blocks are summed. Then the blocks (starting from block 0 again) are summed on successive cycles via the PD using code C3,2 or PE2. After all "B" blocks are summed again, the entire cycle is repeated.

Each "CHKMEM" main checkword thus constructed is preconditioned with a constant PMS1N (Code C3,1 or PE1) or PMS2N (Code C3,2 or PE2). Each preconditioning constant is determined such that the resulting actual checkword value is "partially offset", so that if a block is summed out of sequence, the base value of "CHKMEM" will be incorrect.

16. CHKTMO—Main Cycle Start (Time 0) Check—
Each time the main cycle is started (at 50 ms. INTR 0), the contents of the 32-bit interval timer is sampled, and the difference between that value and the value taken on the previous cycle is combined with preconditioning constant PRETMO to form CHKTMO (via C3,1 or PE1).

The purpose of the CHKTMO checkword is to insure that the main cycle begins on a 1 sec. interval, so that the "data" developed within the main cycle is not "old".

17. CKTM12—DIRIN1/DIRIN2 Time Check—

The DIRIN1 routine is executed once per main cycle at the same point in the main cycle.

The DIRIN1 routine circulates the least significant 8-bits of each direct input parameter value through the input port state detection circuitry.

The point in the main cycle at which the DIRIN1 routine executes is arranged such that in conjunction with the times of execution of DIRIN2, DIRIN3 and DIRIN4, no input port is sampled in a way which would allow a "true" (or "on") state to exist due to 60 HZ. or 100 HZ. power coupling on the input line.

Unlike "CHKTMO", the interval timer is read at the "DIRIN1 INTR" interrupt and again at the "DIRIN2 INTR", and the difference is taken. This difference must correspond to a real time of 7 ms. (or suitable multiple thereof). This time difference is preconditioned with PRTM12 (via C3,1 or PE1).

18. CKTM23—DIRIN2/DIRIN3 Time Check—
Same as CKTM12 above, but for time interval between "DIRIN2 INTR" and "DIRIN3 INTR", and preconditioning constant PRTM23.

19. CKTM34—DIRIN3/DIRIN4 Time Check—
Same as CKTM23 above, but for time interval "DIRIN3 INTR" and "DIRIN4 INTR", and preconditioning constant PRTM34.

20. CHKDUM—Dummy Main Cycle Checkword—

4. Main—Main Program Segment—
"Main" is a list of sub-routine calls to those routines which are not interrupt driven. As listed in Section 3. above, "main" contains the following routine calls in the order shown:
A. DIRINT
B. OCKINT
C. OCKX
D. XFRCSD
E. CSINT
F. RECCSC
G. EVXINT
—HALT1—

H. DIRINX
I. EVALXP
J. YVCLR
K. FORMYV
L. YNVCLR
M. YNXFR
N. XMTCSI
O. MEMCHK
P. FORMWM
—HALT2—

The "HALT1" entry in the above list is inserted to insure that routines "DIRIN1, DIRIN2, DIRIN3 and DIRIN4", which are interrupt driven, are completed before MAIN continues past the "HALT1" point.

The "HALT2" entry marks the completion of the "MAIN" routines, and the system halts at this point (except for performing the "RECHK" routine every 50 ms.) to wait until the beginning of the next 1 sec. main cycle.

5. DIRINT—Initialize Direct Input Routine Buffers—
"DIRINT" calls 6 sub-routines which vitally clear the buffers DIN, DIN', DINA, DINA', DINB, DINB', TEMPI and TEMPI'. The routines also transfer data from DINB to DIN and from DINA to DINB in CH1, and likewise from DINB' to DIN' and from DINA' to DINB' in CH 2. These transfers are necessary for the "vital FIFO" input buffer configuration.

6. DINCLR—Vitally Clear DIN and DIN' Buffers—

The DIN and DIN' buffers (direct input parameter buffers in CH1 and CH2 respectively) are the lowest levels in the CH1 and CH2 3-level direct input FIFOs.

The DIN and DIN' buffers hold the direct input parameter values used in the expression evaluation for CH1 and 2.

DIN and DIN' are cleared by the following method:
Formed by the "PD sum" (via C3,1 or PE1) of:
DIN Start Address
DIN Contents Filled with KIB
DIN End Address
DIN' Start Address
DIN' Contents Filled with KIB'
DIN' End Address
Sum Preconditioned by PREIN 7. DNBXFR—Transfer the Contents on DINB to DIN—(and transfer DINB' to DIN')

When this routine executes, DIN already contains KIB and DIN' contains KIB'.

The contents of DINB and DINB' are the CH1 and CH2 input parameter values in the 2nd level of the input FIFO. All input parameter values in DINB and DINB' are offset from their actual values by the constants KIB and KIB' respectively.

The "XFRDNB" routine takes a 32-bit entry from DINB and "adds" it (modulo 2) to the contents of the corresponding 32-bit entry in DIN. Thus, the entry now in DIN is the actual value of the input port parameter. ("Adding" in modulo 2 is the same as "subtracting").

The 32-bit entries in DINB' are transferred to DIN' in the same way.

8. DNBCLR—Clear DINB and DINB' Buffers—

The DINB and DINB' buffers are vitally cleared as follows:
Formed by DINB Start Address
DINB Contents Filled with KIA
DINB End Address
DINB' Start Address
DINB' Contents filled with KIA'
DINB' End Address
Sum Preconditioned by constant PREINB 9. DNAXFR—Transfer the contents of DINA into DINB—

When this routine executes, DINB already contains KIA and DINB' contains KIA'.

The contents of DINA and DINA' are the CH1 and CH2 input parameter values in the 1st level of the input FIFO. All input parameter values in DINA and DINA' are offset from their actual values by the constants (KIB+KIA) and (KIB'+KIA') respectively.

The "XFRDNA" routine takes a 32-bit entry from DINA and "adds" it (modulo 2) to the contents of the corresponding 32-bit entry in DINB. Thus, the entry now in DINB is the actual value of the input port parameter+KIB. ("Adding" in modulo 2 is the same as "subtracting").

The 32-bit entries in DINA' are transferred to DINB' in the same way.

10. DNACLR—Clear DINA and DINA' Buffers—

The DINA and DINA' buffers are vitally cleared as follows:
Formed by "PD sum" (via C3,1 or PE1) of:
DINA Start Address
DINA Contents Filled with KIO
DINA End Address
DINA' Start Address
DINA' Contents Filled with KIO'
DINA' End Address
Sum Preconditioned by Constant PREINA 11. TPICLR—Clear TEMPI and TEMPI' Buffers—

The TEMPI and TEMPI' buffers contain the raw input parameter data as the 32-bit parameters are circulated through the input port circuitry. If an input port has been designated as having 2 "cycles of forgiveness", its actual value is offset by (KIA+KIB) for CH1, and (KIA'+KIB') for CH2.

If the port has 1 cycle of forgiveness, its actual value is offset by KIB for CH1 and KIB' for CH2.

If the port has 0 cycles of forgiveness, each channel's parameter is its actual value.

These temporary buffers must be cleared vitally each main cycle and the vital clearing is done as follows:
Formed by "PD sum" (via C3,1 or PE1) of:
TEMPI Start Address
TEMPI Contents Filled with KIT
TEMPI End Address
TEMPI' Start Address
TEMPI' Contents Filled with KIT'
TEMPI' End Address
Sum Preconditioned by Constant PREIT 12. DIRIN1—Circulate 1st byte of input port 32-bit parameter value through input port for each channel—

"DIRIN1" is interrupt driven and must be executed only after "DIRINT" has been completed. DIRIN1 circulates the 1st byte of the 32-bit input port CH1 parameter values through the input port circuitry and returns them to the TEMPI buffer.

It then circulates the 1st byte of all the CH2 32-bit input port parameter values through the input port circuitry and returns them to the TEMPI' buffer.

The returned values are in "signature order".

DIRIN1 is interrupt driven (as are DIRIN2, DIRIN2 and DIRIN4) so that the 4 bytes of the input port parameter values in each channel can be circulated through the input port circuitry, so that they will not be coincident with the positive peaks of a 60 hz or 100 hz induced signal on the input port wire which may give an incorrect indication that the input is "on".

The input port parameters used are the "true" values of the CH1 and CH2 pairs. These values are arranged "vertically" in system prom so that the "true" values are not machine readable, and are thus hidden from accidental reading by the CPU.

13. DIRIN2—Circulate 2nd byte of input port 32-bit parameter value through the input port circuitry for each channel—

"DIRIN2" operates identically to "DIRIN1" in note 12 above, but on the 2nd byte of the prameter value.

14. DIRIN3—Circulate 3rd byte of input port 32-bit parameter value through the input port circuitry for each channel—

"DIRIN3" operates identically to "DIRIN1" in note 12 above, but on the 3rd byte of the parameter value.

15. DIRIN4—Circulate 4th byte of input port 32-bit parameter value through the input port circuitry for each channel—

"DIRIN4" operates identically to "DIRIN1" in note 12 above, but on the 4th byte of the parameter value.

16. DIRINX—Execute Direct Input Parameter Compilation—

The "DIRINX" routine operates on the raw input parameter data in the TEMPI and TEMPI' buffers. The tasks it performs are as follows:

A. Test each 32-bit returned input port parameter in TEMPI for "0000" or for being a codeword using the check mode of the PD (see FIG. 10).

B. If the value is "0000", the "false" value of the appropriate name pair is substituted.

C. If the value is a codeword in CH1 it is assumed that the returned value is the correct "true" value of that input port's name pair, and no substitution is made.

D. If the returned value is neither "0000" or a codeword, then the returned value is assumed to have been corrupted and the "false" value of the name pair is substituted.

E. If the input port was designated as having 2 "cycles of forgiveness", then the uncorrupted value (the substituted "false" value or the assumed "true" value) is inserted into that input port's slot in the DINA buffer. The constant KIA is then added to this value and the result is stored in the appropriate slot in DINB. Then the constant (KIA+KIB) is added to the returned value and the result is inserted into the appropriate slot in DIN.

If the value was corrupted, the "false" value (without a constant added) is inserted into the DINA buffer only.

F. If the input port was designated as having 1 "cycle of forgiveness", then the uncorrupted value is inserted into the DINB buffer and then the constant KIB is added to it and the result is inserted into the appropriate slot in DIN.

If the value was corrupted, the "false" value is inserted into the DINB buffer only.

G. If the input port was designated as having 0 "cycles of forgiveness" then the uncorrupted value is inserted directly into the DIN buffer.

If the value was corrupted, then the "false" value is also inserted directly into DIN.

H. The same processes of A. through G. above are repeated in the same way for channel 2, however in the check mode PC2 is enabled, rather than PC1, and CH2 values of the parameters are circulated.

After the "DIRINX" routine is completed, the DIN and DIN' buffers contain the actual name pair values ("true" or "false") for all of the input ports. It is these buffers which are referenced for input parameter values by the expression evaluation routine.

17. OCKINT—Initialize the "Output Check" Data Buffers—

The "OCKINT" routine calls 2 routines which vitally clear the OCK and OCK' buffers as well as the TEMPO buffer.

18. OCKCLR—Clear the OCK and OCK' Buffers—

The OCK and OCK' buffers hold the output check parameter values cycled through the A.O.C.D.'s of selected output ports. The output ports selected are those whose states are necessary to be used as parameters in the Boolean expressions.

One type of output port state information used in the expressions is the lamp driver output filament check. This check is made by turning the lamp driver output off for a few microseconds and toggling the "vital low current source" on the lamp output port while circulating the 32-bit port parameter through the A.O.C.D.

OCK and OCK' are vitally cleared once each main cycle. The process used to clear them is as follows:
Formed by "PD sum" (via C3,1 or PE1) of:
OCK Start Address
OCK Contents Filled with KOC
OCK End Address
OCK' Start Address
OCK' Contents Filled with KOC'
OCK' End Address
Sum Preconditioned by constant PREOCK 19. TPOCLR—Clear the Buffer TEMPO—

Buffer TEMPO is used to store the raw data which has been circulated through the A.O.C.D.'s of the selected output ports.

This buffer is cleared once each main cycle. The procedure for clearing it is as follows:
Formed by "PD sum" (via C3,1 or PE1) of:
TEMPO Start Address
TEMPO Contents Filled with KOT
TEMPO End Address
Note that the TEMPO buffer has no CH2 counterpart. It is used as temporary storage for both OCK and OCK'.

20. OCKX—Execute the Selected Output Port Check Compilation—

The "OCKX" routine compiles the raw data circulated through the A.O.C.D.'s of those output ports whose states are used as parameters in the Boolean expressions from TEMPO into the OCK and OCK' buffers.

The operation on TEMPO and OCK is as follows:

A. Output port check 32-bit "true" values (stored vertically in PROM) are circulated through the A.O.C.D.'s of the selected output ports and stored in TEMPO.

B. Each returned 32-bit value in the TEMPO buffer is tested for "0000" or for being a codeword in CH1, e.g. the check mode, PC1.

C. If the value is a codeword, it is assumed to be the correct "true" value which was circulated through the A.O.C.D. of the output port. ("True" value being returned intact indicates that the output port is "off").

This value is transferred intact to its slot in the OCK buffer.

D. If the returned value is neither a codeword nor is "0000", then the "false" value of the name pair associated with that output port is substituted into OCK. This value indicates that the output port is "not off", or probably "on".

E. Steps A. through D. above are performed on the values in the TEMPO buffer (via check mode, PC2) and are inserted in OCK'.

The contents of the OCK and OCK' buffers are then accessed by the expression evaluation routine for those values indicating the states of the selected outputs as parameter values.

26. EVXINT—Initialize Expression Evaluation Buffers—

To initialize the expression evaluation buffers for this cycle's expression evaluation routine, "EVXINT" calls the following sub-routines:

A. LACLR—Clear LA and LA' buffers
B. LATXFR—Transfer LAT to LA and LAT' to LA'
C. LATCLR—Clear LAT and LAT'
D. CRCLR—Clear CR and CR'
E. XCLR—Clear X and X'

27. LACLR—Clear LA and LA' Buffers—

The buffers LA and LA' hold the CH1 and CH2 results from those expressions in the expression list which are self-latched (i.e. those expressions which contain their own results as parameters in one or more of their own product terms.

The LA and LA' buffers are vitally cleared each main cycle as follows:

Formed by "PD sum" (via C3,1 or PE1) of:
LA Start Address
LA Contents Filled with KLA
LA End Address
LA' Start Address
LA' Contents Filled with KLA'
LA' End Address
Sum Preconditioned by Constant PRELA 28. LATXFR—Transfer Contents of LAT to LA and from LAT' to LA'—

When the expression list is evaluated, the results of self-latched expressions are stored in the appropriate slots in LA and LAT simultaneously for CH1 expressions, and in LA' and LAT' for CH2 expressions.

Just prior to the "LATXFR" routine's execution, the LA and LA' buffers are cleared. LAT and LAT' still contain the self-latched expression results from the previous main cycle.

These results are now transferred from LAT to LA and from LAT' to LA', thus preserving the "self-latched" characteristics of the expressions.

29. LATCLR—Clear the LAT and LAT' Buffers—

After the LAT and LAT' buffer contents have been transferred to LA and LA', the LAT and LAT' buffers are vitally cleared.

These buffers are cleared as follows:
Formed by "PD sum" (via C3,1 or PE1) of:
LAT Start Address
LAT Contents Filled with KLAT
LAT End Address
LAT' Start Address
LAT' Contents Filled with KLAT'
LAT' End Address
Sum Preconditioned by Constant PRELAT 30. CRCLR—Clear the CR and CR' Buffers—

The CR and CR' buffers hold the "current results" of the expressions evaluated on this cycle whose results are used in subsequent expressions. Only those expressions which are self-latched have results included in this list.

It is not necessary that a result inserted in the CR and CR' buffers be used as a parameter in a subsequent expression. For instance, if an expression result is used as a bit in an indication message, or for some other purpose, and the expression is not self-latched, the result may be stored in CR and CR'.

The CR and CR' buffers are vitally cleared each main cycle as follows:
Formed by "PD sum" (via C3,1 or PE1) of:
CR Start Address
CR Contents Filled with KCR
CR End Address
CR' Start Address
CR' Contents Filled with KCR'
CR' End Address
Sum Preconditioned by Constant PRECR 31. XCLR—Clear Buffers X and X'—

The X and X' buffers hold the results of expressions which directly determine the states of individual direct vital output ports. The entries in the X and X' buffers correspond 1 for 1 with the list of all direct output ports (of any type) contained in the system, whether the output port is actively used or not. (In the case of unused outputs, the X and X' buffer entries always contain the "false" 32-bit values). Note that the list of direct output ports is in the "logical" order of the ports within each port group.

In order for a vital direct output port to be set to its permissive or "on" state, the evaluated expression in each channel whose result represents the state of the output must be "true".

The X and X' buffers are vitally cleared each main cycle as follows:
Formed by "PD sum" (via C3,1 or PE1) of:
X Start Address
X Fill Contents With KX
X End Address
X' Start Address
X' Fill Contents with KX'
X' End Address
Sum Preconditioned by Constant PREX 32. EVALXP—Evaluate Boolean Expressions—

The vital logic of the interlocking or other controlled region is defined by a list of "primordially safe" Boolean expressions, i.e. the list of expressions is such that if the expression are evaluated correctly in the sequence in which they are listed, the "machinery" at the interlocking (switches, signals, vital communication links, etc.) will operate to allow safe and efficient passage of trains through the interlocking.

Each expression is in "sum of products" form. Each product term is in turn composed of a set of parameters. There is no limitation on the number of product terms in each expression or in the number of parameters comprising any product term.

Each expression is evaluated in 2 channels; the CH1 expression uses parameter values listed in the CH1 buffers and the CH2 expression uses parameter values listed in the CH2 buffers.

The result of a CH1 expression is a 32-bit value which is defined as a unique codeword name pair in the CH1 code.

The result of a channel 2 expression is likewise defined as a 32-bit codeword name pair in the CH2 code.

A CH1 expression is evaluated as follows:

A. The 1st product term list of parameters is accessed from the expression's data structure. This list is a list of pointers to 32-bit value slots in any of the CH1 parameter buffers. The buffers could be any one of the following: [DIN], [OCK], [CS], [LA] or [CR].

B. The least significant bit in each parameter pointer defines the "sense" of the parameter value which will make the particular product term evaluate to "true". If the "sense" bit=0, the parameter value must exist in its "true" state (i.e. the least significant bit of the 32-bit parameter value must=1).

If the "sense" bit=1, then the parameter value must exist in its "false" state (i.e. the least significant bit of the 32-bit parameter value must =0).

Note: Caution must be exercised in using a "false" parameter value to allow a product term to be evaluated as "true", since this is the equivalent of routing a logic signal through the back contact of a relay in relay logic.

C. A quick non-vital check is made to see if the states of the parameters called for in the product term parameter list agree with the required "sense" bits. If the check is positive, then this product term is evaluated.

If the check is negative, then the list for the next product term in the expression is checked.

D. If the non-vital product term check is negative for all product terms in the expression, then the expression is determined to be "false", and the "false" 32-bit value of the CH1 name pair is used as the result of the expressions evaluation.

E. If the non-vital product term check is positive for a given product term in the expression, then no further product terms in the expression are checked, and the parameters specified by this product term's list are accessed again for vital evaluation.

Vital evaluation of a product term proceeds as follows:

1. The feedback arrangement of the PD is set to evaluate mode, PE1.

2. The 32-bit preconditioning constant associated with the selected product term is "loaded" into the PD. This PD "loading" includes a 9-bit shift of the loaded constant through the feedback paths of the PD.

(The 32-bit preconditioning constant is necessary for each product term to make the calculated "true" value of the expression equal the preselected "true" value of the name pair. Also, each product term's calculated value must arrive at the same expression result.)

3. Each value in the product term is accessed from its buffer in the order determined by the product term list and "added" into the PD. This PD "addition" is accomplished by adding the 32-bit value (modulo 2) to the current contents of the PD and then shifting the PD 9 times through its feedback network.

4. The result in the PD after the last entry should be the correct "true" 32-bit value of the predefined CH1 name pair. The actual "true" value exists nowhere in PROM in machine readable form. This result is then stored in X (if it determines the state of a vital direct output port) or in LA and LAT (if it is a self-latched expression), or in CR (if the result is used as a parameter in a subsequent expression) or in a combination of the above (CR and (LA,LAT) are mutually exclusive, however)).

5. Since the correct "true" result is a codeword in CH1, the actual result can be non-vitally checked for validity by putting its 14-bit information field into the PD and generating the 18-bit check field using the check mode, PC1. If the generated check field matches the check field in the result, the PD result is assumed to be the correct "true" value and it is stored as described in 4. above.

If the generated checkfield bits do not match the checkfield in the expression result, then it is assumed to be a corrupted result, and the "false" value is accessed from the expression's data structure and stored in the designated result buffers.

6. The CH2 expression is now evaluated as follows.

If the CH1 expression results was "false", the CH2 expression is automatically assumed false, and its "false" value is placed in the designated result buffers.

7. If the CH1 expression was true, then the CH2 expression should evaluate to true using the same corresponding product term which caused the CH1 expression to be true.

To ensure that the CH2 expression evaluates using the same product term, the EVALXP routine "prepreconditions" the PD with the CH2 preconditioning term associated with the corresponding CH2 expression product term after the CH1 product term is evaluated and found to be "true".

Thus, the CH2 expression must evaluate the corresponding product term since the CH2 section of the routine does not have immediate access to its own preconditioning terms.

8. If in evaluating the corresponding product term, either one of the values in the product term's list is not in the correct sense, or somehow the CH2 result is corrupted, (corruption is detected by doing a test on the resulting checkfield using check mode, PC2) then the "false" value is assigned to the CH2 expression result and stored in the appropriate result buffers.

In addition, the CH1 result in the result buffer is changed from the assumed "true" value to the designated false one.

Thus, at the end of the EVALXP routine, the expression results in the result buffers of both channels should correspond, i.e. either both should be true or both fase. This is necessary to keep the VRD from dropping out due to "garbage" in the system.

Note:
Even thought the assumed "true" value of an expression passed the checkfield non-vital test, it does not insure that correct checkwords will be generated to be sent to the VRD each recheck cycle (where the vital direct output states are vitally checked).

If the "true" result generated by the PD from an expression's product term list was incorrect, and yet still a codeword, it would not generate the correct checkwords during the recheck cycle.

33. YVCLR—Clear YE, YO and V Buffers—

The V buffer is the non-vital port image of the states of all of the vital direct output ports (arranged in "logical" order). The bits in V (1 bit per output port) are derived non-vitally using the least significant bit of each 32-bit result in the X buffer. These states are used to set the vital direct output port states after the expression evaluation is completed. The states are vitally checked against the Y buffer contents on each recheck cycle.

The V buffer is non-vitally cleared to all zero's. A main cycle checkword is not generated.

The YE and YO buffers contain 32-bit values which correspond 1 for 1 with values in the X and X' buffers and with all the vital direct output ports arranged in "logical" order.

These values are used by the RECHK routine every recheck cycle to vitally check the states of all the output ports.

The definition of the contents of the YE and YO buffers is explained in 34. below.

These buffers are vitally cleared each main cycle as follows:

Formed by "PD sum" (via C3,1 or PE1) of:
YE Start Address
YE Contents Filled With KYE
YE End Address
YO Start Address
YO Contents Filled with KYO
YO End Address
Sum Preconditioned by Constant PREY 34. FORMYV—Form Buffers YE, YO and V—

As explained in 33. above, the V buffer is formed by non-vitally testing the least significant bit of each 32-bit value in the X buffer, corresponding 1 for 1 with each vital direct output port in the system, used or unused, in "logical" order.

If the LSB of the X entry=0, then the corresponding output is "false", or "off", and the corresponding bit in V=0.

If the LSB of the X entry=1, then the corresponding output is "true", or "on", and the corresponding bit in V=1.

The contents of V are output to the direct output ports just before completion of the "FORMYV" routine.

The formation of the data in the Y(E) buffer is as follows:

A. A unique "true" name is defined for each 32-bit entry in YE, and there is a 1 to 1 correspondence between the entries in X and X' and the entries in YE. These names are not necessarily codewords in any code.

This true name value is called YE (T).

B. If either of the corresponding values in X or X' is "false", then the "0000" value is assigned to that position in YE.

C. If both of the corresponding values in X and X' are "true", then the YE (T) entry is constructed by preconditioning the PD with constant PREYET and subsequent PD "addition" of the corresponding 32-bit entries in the X and X', in that order, using PD code 3,1 or PE1.

This value is then inserted into YE.

The formation of the YO buffer is equivalent, except that the true values are YO (T), where YO (T) is constructed using PREYOT and the values in X' and X in that order, using PD code 3,2 or PE2.

This value is then inserted into YO.

The use of the YE and YO values will become clear in the description of the "TREX" routine (see 43. below). Suffice it to say now that these values are used by the recheck routines to form recheck cycle checkwords every 50 ms to prove that no vital direct output port is in its permissive state without having the corresponding CH1 and CH2 expressions evaluated as "true".

35. YNVCLR—Clear Buffers YE(N-1), YO(N-1) and V—

The "N-1" notation in the buffer names above denotes "the previous cycle", i.e. if the current cycle is "N", these buffers hold data which pertains to the previous cycle, or the "N-1" cycle.

Each 50 ms the recheck routine executes. The 50 ms interrupt which activates the recheck routine is asynchronous with the start or completion of the "FORMYV" routine described in 34. above.

The recheck routine forms a recheck checkword set which uses data derived from the current state of the output ports in conjunction with data in the Y buffers.

Thus the recheck routine must have at any given time data in the Y buffers which corresponds to the current state of the output ports. If it does not, it will generate incorrect checkwords and the VRD will fall.

Therefore, while the "FORMYV" routine executes, the data generated by the "FORMYV" routine on the previous cycle is contained in the YN-1 buffers (YE(N-1) and YO(N-1)).

Thus, while the YE and YO buffers are being filled with data during the "FORMYV" routine on cycle "N", cycle "N-1's data in YE(N-1) and YO(N-1) is still valid, that is still reflects the state of the outputs.

The transfer of data from the Y buffers to the YN-1 buffers is made during the "YVNXFR" routine, described next in 36.

Just before completion of the "FORMYV" routine, a flag is set in MISC memory (the USEY flag) and the contents of the just filled V buffer are transferred to the output ports.

At the beginning of the recheck routine execution, the USEY flag is checked. If set, the recheck routine accesses the Y buffers YE or YO. If the flag is not set, the recheck routine accesses the YN-1 buffers YE(N-1) and YO(N-1).

Once each main cycle, the YE(N-1) & YO(N-1) buffers are cleared as follows:
Formed by "PD sum" (via C3,1 or PE1) of:
YE(N-1) Start Address
YE(N-1) Fill Contents with KYEN
YE(N-1) End Address
YO(N-1) Start Address
YO(N-1) Fill Contents with KYON
YO(N-1) End Address
Sum Preconditioned by Constant PREYN Note that the V buffer again is cleared to all zero's. This is a non-vital clear, and no checkword is generated.

36. YNXFR—Transfer Data from YE to YE(N-1) and From YO to YO(N-1)—

As discussed in 35. above, data from YE is transferred to YE(N-1) and from YO to YO(N-1).

After the transfer is complete, the USEY flag in MISC is reset, so that the recheck routine will access data from YE(N-1) and YO(N-1) on even and odd cycles respectively.

38. MEMCHK—PROM Memory Check—

In order to apply yet another diverse process to increase to "vital assurance" of the system as a whole, a portion of the PROM-based memory is checked each main cycle.

The PROM memory is that memory which includes the vital system routines as well as the application data structures.

The entire PROM memory is divided into sub-blocks of N-bytes per sub-block. On successive main cycles, these sub-blocks are "summed" in the PD, one sub-block per main cycle.

Consecutive 4-byte sections of the sub-block are "added" to the PD which has been pre-conditioned with a 32-bit constant particular to that sub-block.

The result is a main-cycle checkword with the appropriate partial offset so that the sub-blocks cannot be summed out of order.

The consecutive sub-blocks are first summed using evaluate mode, PE1 and then summed using evaluate mode, PC2.

Thus, if there are M sub-blocks, after 2M main cycles each sub-block in PROM memory will have been represented by 2 32-bit main cycle checkwords passed to the VRD.

If a sub-block consists of 2K bytes, and there is a maximum of 128K bytes of PROM memory, then the "cycle time" required for all PROM memory to be checked with 2 32-bit checkwords is 128 sec.

39. RECHK—Recheck Routine (Executed Every 50 ms)—

The purpose of the RECHK routine is to vitally confirm that the states of all of the vital direct output ports are in their "off" (non-permissive) state unless the 2 32-bit results in X and X' indicate that the expressions corresponding to that particular output port allow it to be in its "on" (permissive) state.

The recheck routine performs this vital confirmation by vitally sensing the "off" state of each output port (by passing a 32-bit parameter value through the port's A.O.C.D.) and combining the returning values with data compiled in the Y buffers.

Because of execution time constraints, the RECHK routine operates on "even" and "odd" cycles.

The RECHK routine calls several sub-routines to perform the RECHK function.

"TREINT" is called to vitally clear the TRE and TRETMP buffers.

"TREX" is called to circulate 32-bit parameter values through the A.O.C.D. circuitry of each output port to test the state of each port.

"FORMWR" is called to form the recheck checkword set.

"XMTWR" is called to transmit the checkword set to the VRD.

40. TREINT—Initialize the TRE and TRETMP Buffers—

The TREINT routine calls 2 subroutines to vitally clear the TRE and TRETMP buffers. These routines (TRECLR and TPTCLR) are described below.

The checkwords produced by these routines are included in the recheck checkword set sent to the VRD.

41. TRECLR—Vitally Clear the TRE Buffer—

The TRE buffer is used to hold the set of 32-bit parameter values circulated through all of the output port A.O.C.D.'s each recheck cycle. These values are listed in the "logical" order of the output ports and correspond 1 for 1 with entries in the YE and YO and the YE(N-1) and YO(N-1) buffers.

The TRE buffer holds the output port circulated values on both "even" and "odd" recheck cycles.

The TRE buffer is vitally cleared at the beginning of each recheck cycle (every 50 ms) as follows:

—On "Even" Recheck Cycles—
A. Fill the TRE buffer with 32-bit constant KTREE.
B. Get the starting address of TRE.
C. Add (via PD code C3,1 or PE1) the contents of TRE.
D. Add to this the end address of TRE.
E. Precondition the PD with constant PRETRE.
F. Store the result as checkword CHKTRE.

—On "Odd" Recheck Cycles—
A. Fill the TRE buffer with 32-constant KTREO.
B. Get the starting address of TRE.
C. Add (via PD code C3,2 or PE2) the contents of TRE.
D. Add to this the end address of TRE.
E. Precondition the PD with constant PRETRO.
F. Store the result as checkword CHKTRO.

Note that there is no CH2 counterpart of TRE.

42. TPTCLR—Clear the TRE Temporary Buffer TRETMP—

TRETMP is the buffer used to temporarily store the data returned from the output ports when circulating 32-bit values through the ports' A.O.C.D.'s. TRETMP is only large enough to hold 16 such returned values so that the same buffer space is used over again to hold the returned values for each successive output port group tested.

TRETMP is vitally cleared once each recheck cycle (odd or even) as follows:

A. Fill the TRETMP buffer with 32-bit constant KTTP.
B. Get the starting address of TRETMP.
C. Add (via PD code C3,1 or PE1) the contents of TRETMP.
D. Add to this the end address of TRETMP.
E. Precondition the PD with constant PRETTP.
F. Store the result as checkword CHKTTP.

Note that there is no CH2 counterpart for TRETMP.

43. TREX—Execute the Compilation of Output Port Recheck Test Data in TRE—

The taskof the "TREX" routine is to circulate 32-bit "true" values through the A.O.C.D.'s of all the vital direct output ports and arrange the returned data in TRE in "logical order".

Since the recheck routine operates with different data on "even" and "odd" cycles, the 32-bit values are different on even and odd cycles.

Each output port (used or unused) is assigned 2 names. These names are codewords in CH1 and CH2 respectively. The CH1 pair is used on even cycles, and the CH2 pair is used on odd cycles. CH1 is also designated C1,1 and CH2 is designated C1,2.

The purpose of this data is to vitally test the state of each output port for its "off" condition. The output port must be proven to be "off" unless allowed to be "on" by the corresponding expression results in X and X'.

The operation of the "TREX" routine is described as follows:

"Even" Cycle Operation:

A. A set of 32-bit "true" even cycle recheck parameters (TREE(T)) are circulated through the A.O.C.D.'s of the output ports, one output port group at a time.

As with input port parameter values, these "true" values are arranged "vertically" in system PROM and are not directly machine readable.

B. The returned 32-bit values are received into TRETMP in "signature" order. TRETMP is large enough to accommodate only 16 32-bit values, or those from 1 output port group. Thus, the "true" values are circulated through 1 output port group at a time.

If the port was "off", the "TREE(T)" should be returned. If the port was "on", the "0000" should be returned. If the circulation of the 32-bit value through the A.O.C.D. of the port was incorrect, then some value other than "TREE(T)" will be returned. While we say the "true" values are "circulated", in fact without particular A.O.C.D., we actually drive the A.O.C.D. with the complement of the "true" value. If the port is off, the A.O.C.D. inverts the pattern and returns the "true" value.

C. The contents of TRETMP are then transferred to TRE and arranged in logical order.

At this point, each output port is represented by some 32-bit value in TRE. If the output port is "off" it is represented by the "true" value of the C1,1 or CH1, denoted "TREE (T)".

If the output port is not "off", it is represented by "0000" returned value, or by some 32-bit value which is not "TREE(T)".

—Odd Cycle Operation—

The odd recheck cycle operation of "TREX" is identical to that of the even cycle, except that the CH2 name value is used.

Therefore, after the "TREX" routine is completed, the state of each output port is represented by a 32-bit value in TRE. If the output port is "off", it is represented by the "true" value of the CH2 name pair, denoted "TREO (T)".

If the output port is not "off", then it is represented by the "0000" or by some value which is not "TREO (T)".

44. FORMWR—Form the Recheck Checkword Set—

The "FORMWR" routine operates on different data on even and odd recheck cycles. Its function is to compile a set of recheck checkwords each 50 ms. which prove that those vital direct output ports not allowed to be in their permissive ("on") states are actually in their "off" states, and that the data indicating that a port is allowed to be in its permissive state is absolutely correct.

The converse of this argument (i.e. that those output ports allowed to be in their "on" states are actually in their "on" states) is not necessary to be vitally proven.

The operation of the "FORMWR" routine is as follows:

—Even Cycle Operation—

A. The USEY flag in MISC is tested. If the flag is set, the YE buffer is accessed. If the flag is not set, the YE(N-1) buffer is accessed.

In the following description the notation YE is used to refer to either the YE or the YE(N-1) buffer.

The entries in YE correspond 1 for 1 with those in the TRE buffer, that is the corresponding entries in the 2 buffers both contain information which represent the same output port.

Note that since this is an even recheck cycle, the entries in TRE are normally either TREE (T) or "0000", where the TREE (T) entry means that the output port is "off" and the "0000" entry means that the output port is assumed to be "on" (cannot be proven to be "off").

The corresponding entries in YE which are "true" are denoted YE (T). As described in note 34. above, the YE (T) value is calculated by combining the "PREYET" and the corresponding entries in X and X', (where both X and X' are "true" results of the appropriate expressions in CH1 and CH2.

A value of YE (T) in the YE buffer means that the output port is allowed to be "on".

B. A "set" of 32-bit values is now collected. Each value in this set is determined as follows:

1. The entry in YE is non-vitally tested.
    If the LSB of the YE entry=0 (port must be off) then the corresponding TREE entry is used.
    If the LSB of the YE entry=1 (port allowed to be on) then the YE entry is used.

Note: The numerical value of YE (T) is identical to the value for TREE (T), so that if either of these 2 values are present in either the YE buffer or the TRE buffer, the state of the output port represented by those particular entries is in an acceptable state, i.e. either the output port is allowed to be on (YE entry=YE (T)), or the output port is proven to be off (TRE entry=TREE (T)).

C. The "set" of YE/TREE values are then collected and used to form a recheck checkword.

The number of YE/TREE values in the set is arbitrary, determined by the amount of time available for "RECHK" routine execution.

If the number of YE/TREE values in the set is "N", then it can be seen that the collection of "N" output ports is represented by 32-bit checkword for this even recheck cycle.

D. The recheck checkword generated by the combination of "N" YE/TREE terms is formed as follows:
1. The PD is set to evaluate coe C3,1 or PE1.
2. The PD is loaded with preconditioning constant "PREZE".
3. The YE/TREE terms are "added" into the PD in the order in which they were collected.
4. The result is recheck checkword "CHKZE".
5. The process is repeated for all sets containing "N" YE/TREE terms unitl checkwords representing all output ports have been generated.

—Odd Cycle Operation—

The "odd" recheck cycle operation is identical to "even" cycle operation, except that:

The Y buffer accessed is either YO or YO(N-1), and is denoted YO.

The TRE buffer contains values TREO(T) or "0000".

The "set" of "N" terms YO/TREO used in each odd cycle recheck checkword correspond 1 for 1 with those used on the even recheck cycle.

Odd cycle recheck checkwords are formed using preconditioning constants "PREZO" and PD code C3,2 or PE2, and are denoted as "CHKZO".

An overview of the recheck routine shows that each output port receives "32-bit protection" each 50 ms recheck cycle, and that protection is expanded to 64-bits over a pair of even and odd recheck cycles.

—Recheck Checkword List—

| | | |
|---|---|---|
| A. RCKSUM - PD "sum" of following check words | | |
| B. CHKTRE/CHKTRO - TRE buffer vitally cleared | | |
| C. CHKTTP - TRETMP buffer vitally cleared. | | |
| D. CHKZE(0)/CHKZO(0) - formed by 1st "N" | | YE/TREE or YO/TREO terms |
| CHKZE(1)/CHKZO(1) - formed by 2nd "N" | | YE/TREE or YO/TREO terms |
| CHKZE(2)/CHKZO(2) - | | |
| . | | |
| . | | |
| CHKZE(M)/CHKZO(M) - | | |

As with the main checkword set, each set of recheck checkwords (as well as successive words within each set) are "offset" before being sent to the VRD.

The recheck offset cycle, however, begins from its initial set of offset values at the beginning of each main cycle.

The recheck checkword offset initial values are sent to the VRD at the head of each main checkword set. These values are RD, RI, RD' and RI' and they are described in note 4. above. Their use in determining the offset for a given individual recheck checkword is similar to that used for main cycle checkwords, again described in note 4. above.

The RAM, or the primary processor 3, is broken up into a number of segments, many of which have already been described. The segments include the six sections of the input buffer (DINA, DINB and DIN, DINA', DINB' and DIN'). In addition to these direct input values, buffers are provided for OCK and OCK', CS and $CS_{40}$, LA and LA', CR and CR', LAT and LAT', as discussed above. Furthermore, output buffers X and X', Y(E) and Y(O), Y(E)N-1, Y(O)N-1, TEMPI and TEMPI'. The output processing also uses buffers TRE(E/O), W(RECHK), W(MAIN), TEMPO, TRETMP, V and V(N-1).

In order to enable the processor to locate and address desired data, the application data structure takes the form which is illustrated in FIGS. 11-14.

FIG. 11 shows the DINADS headblock (or direct input appliction data structure-headblock). The location of the various words in DIHEAD are indicated in the lefthand column relative to the base address. Aside from locating various start addresses for the different buffers, DIHEAD also includes a plurality of constants, since these constants are 32-bits long, they are stored in two 16-bit groups, a low bit group and a high bit group. The constants KIO, KIA, KIB and KIT are all 32-bit words obeying the code rules in channel 1, and KIO', KIA', KIB' and KIT' are code words obeying the channel 2 code rules. KIA and KIB are used as "offsets" in determining the values of DI1(L,X,Y)(T) and DI1(L,X,Y)(F), and KIA' and KIB' are used as offsets in determining the values at the corresponding channel 2 values. Constants KIO, KIA, KIB and KIT are used for "vitally clearing" the direct in buffers, DINA, DINB, DIN and TEMPI, while the constants KIO', KIA', KIB' and KIT' are used for vitally clearing the corresponding channel 2 buffers.

The preconditioning constants PREIO, PREIA, PREIB and PREIT are selected so that the main check words formed by vitally clearing the direct input buffers DINA, DINB, DIN and TEMPI produce the accepted check words, e.g. the check words CKIO, CKIA, CKIB and CKIT. Likewise, the preconditioning constants PREIO', PREIA', PREIB' and PREIT' perform the same function in clearing the channel 2 buffers and producing the channel 2 check words CKIO', CKIA', CKIB' and CKIT'. The last entry in DIHEAD (FIG. 11) is a location or address, relative to RAMSTART, for the check word CKIO in [W] (MAIN). The other seven check words which are written to [W] (MAIN) are written in predetermined order relative to the address of CKIO.

FIG. 12 illustrates the contents of DIGRXY. DIGRXY defines information with respect to a specific port group, e.g. port group X,Y. The numbers in the lefthand column are relative addressed, relative to the start of DIGRXY. There is a DIGRXY for each input port group. In the main, the information contained in DIGRXY are pointers to the various sections of the buffers and other data storage devices associated with the ports in the group X,Y. The contents of DIS1XY, DIS2XY, TIL1XY and TIL2XY will be explained below.

The next data block DISIXY, shown in FIG. 13, provides more information about a particular port group, e.g., X, Y. More particularly, each port in the group is identified, in signature order (hence SO) and its port type, logical port number, number of cycles of forgiveness, and the signature order of the shift register number are given. In addition, the false value of the "name" is defined. For example, addresses 2 and 4 (relative to the beginning of DIS1XY) provide the low order and high order 16 bits of the false name for the port SO, X,Y. Similar information is given for all 16 ports in the group. The information in DIS1XY is the false name in channel 1. Not shown, but obviously similar is the application data block DIS2XY, which gives the channel 2 information for the same ports.

FIG. 14 shows the makeup of TIL1(L,X,Y) which is the application data structure from which the sense words are derived. FIG. 14 illustrates the channel 1 values, a similar TIL2(L,X,Y) data block is provided for channel 2 values. The use of the designation L identifies the order in which this information is assembled as logical order, not signature order. In order to generate this information, the 16 32-bit valus DI1(L,X,Y) are listed in logical order. For each value which has two cycles of forgiveness, the sum (KIA+KIB) is added, modulo 2, to the "name". If the function has one cycle of forgiveness, then the constant KIB is added (modulo 2). Thereafter, the resulting 32-bit "names" are arranged in logical order. As is apparent from FIG. 14, the data block is broken up into four sections, each section holding a different byte. Section 1 is derived as follows:

Take the complement of the low order 8 bits of the 16 32-bit true "names" which have been arranged in logical order and list them horizontally in row, with the highest ordered name (L=F, hex) at the top to L=0 at the bottom. We now have a block of 16 rows, each 8 bits or 8 columns long. This block is now rotated counterclockwise 90° so that we now have a block of 8 rows, each 16 bits or 16 colums long. This is section 1.

Section 2 is formed in a similar manner except that the complement of the low byte of the 32-bit name is not used, but the byte consisting of bits 8-15 is used. Block 3 uses the same procedure, but now instead of using bits 8-15, we use bits 16-23. Finally, block 4 is made up with the same procedure by using the high order byte, e.g. bits 24-31.

Not illustrated of course is TIL2(L,X,Y) but from the preceding description, those skilled in the art would be able to understand how TIL2(L,X,Y) is constructed.

I claim:

1. A machine-implemented method of producing plural outputs, each for controlling a corresponding one of plural elements in dependence on plural binary inputs, comprising the steps of:
  (a) assigning to each of said inputs first and second groups of binary digits, one of said groups representing a true state of the corresponding input and the other of said groups representing the false state of said input, said first and second groups being different from each other and different from all other groups of binary digits assigned to all other inputs,
  (b) assigning each of said outputs first and second groups of binary digits, one of said groups representing the true state of the corresponding output and the other group representing the false state of the corresponding output, said first and second groups being different from each other, different from all other binary groups assigned to all other outputs, and different from all binary groups assigned to all said inputs, such that a particular binary group not only represents the condition of the corresponding input or output but also serves to identify the corresponding input or output,
  (c) storing a set of equations relating each output to one or more of said inputs and none, one or more of said outputs, where each such equation is a sum of terms wherein factors of each term are selected from said inputs and outputs,
  (d) sensing said inputs and writing a selected group of binary digits, one for each input, selected from the groups assigned to said input in dependence on the result of sensing of the input,
  (e) computing values for each of said outputs in accordance with said equations and said selected groups of binary digits,
  (f) controlling said outputs in accordance with said computed value for the corresponding output,
whereby the absence of fault is confirmed by said computed values for each output being identical to the assigned binary group corresponding to the controlled condition of the output.

2. The method of claim 1 in which said step (e) includes:
  preconditioning said computation with a preconditioning constant dependent at least on the output for which an output value is being computed.

3. The method of claim 1 in which said step (e) includes:

preconditioning said computation with a preconditioning constant dependent on the output for which an output value is being computed as well as on the term of said equation used to compute said output value.

4. The method of claim 1 in which said step (d) includes:
   (i) directing a sequence of bits at each said input consisting of the complement of one of said groups and logically AND'ing a complement of said sequence with a binary value representing a current state of said input to produce a result consisting of a null string if said binary value is zero, or the complement of said sequence if said binary value is one,
   (ii) testing said result of step (i) and:
      (a) writing said other of said groups of binary digits if said result is a null string or violates a first code rule,
      (b) in any other case writing said result.

5. The method of claim 1 in which said step (c) includes:
   ordering said set of equations as stored in step (c) to insure that no output appears as a dependent variable until subsequent to its evaluation.

6. The method of claim 5 which includes the steps of:
   providing a table for writing said selected groups of binary digits and for said computed values, and
   in which said steps (d) to (f) are performed cyclically including, subsequent to effecting said step (f) and prior to effecting step (d) in the next cycle, the step of:
      (i) erasing said tables of selected groups of binary digits and said computed values to prevent stale data from being used.

7. The method of claim 6 in which said step (i) includes the steps of:
   (ii) replacing all current table values with non-usable values,
   (iii) performing an operation using said non-usable values to produce at least one telltale word and providing said telltale word for a checking operation to prove that said current table values had been replaced.

8. A method of vitally sensing binary data at an input terminal comprising the steps of:
   (1) storing multi-bit units created such that complements of a sequence of isolated data bits conform to a predetermined code rule,
   (2) isolating from a sequence of said multi-bit units a single data bit of each unit, occupying the same relative location in each of said units, and
   (3) logically AND'ing a sequence of complements of said isolated single data bits with the binary data at said input terminal to produce a result which is a null string in the event said binary data is a logic zero or a string complementary to said sequence in the event said binary data is a logic one.

9. The method of claim 8 which further comprises:
   (4) checking said result and determining whether said binary data is:
      (a) a logic zero in case said result is a null string, or
      (b) a logic one in case said result is a string conforming to said predetermined code rule, or
      (c) indeterminate in any other case.

10. The method of claim 9 which includes the further step of:
    (5) providing an input buffer with a location corresponding to said input terminal, and
    (6) storing in said input buffer said string in the event that said binary data is determined to be a logic one, or in any other case, storing a predetermined data unit corresponding to said input terminal.

11. The method of claim 9 for vitally sensing binary data at a plurality of input terminals in which said step (2) comprises:
    isolating from a sequence of multi-bit units, a single data bit of each unit, for each of said input terminals, a single data bit being isolated for one terminal different from the single data bit isolated for a different terminal.

12. A logic processor operating on a table of current multi-bit values for input functions to produce a corresponding table of multi-bit values for output functions in accordance with a sequence of logic equations, each equation including one or more expressions in a sum of products format relating input and output functions, said processor comprising:
    a first input matrix storing a set of first input representations, each first input representation representing a corresponding input and comprising a multi-bit representation different from any other first input representation, all of said first input representations including a value bit in a specified location,
    logic program means for directing evaluation of said sequence of logic equations,
    processing means responsive to said logic program means and to said first input matrix for deriving said multi-bit values for output functions, said processing means comprising:
    selecting means to select, in sequence, said logic equations for evaluation,
    scanning means responsive to selection of a given logic equation for, in turn, evaluating each term therein by scanning the value bit of each first input representation in said term to locate at least a first term with a given value or for determining that no term of said expression has said given value,
    a polynominal divider,
    first interim processing means for summing, in said polynominal divider, each first input representation making up a term located by said scanning means to produce a first sum,
    checking means for checking said first sum to determine whether or not a first sum passes a statistically significant output test, said checking means leaving any first sum which passes said output test undisturbed, and otherwise writing a predetermined value in a predetermined location of said table of multi-bit output values.

13. The logic processor of claim 12 in which each of said first input representations is in conformance with a first specified code rule, and said statistically significant output test determines whether or not each said first sum conforms or does not conform to said first code rule.

14. The logic processor of claim 12 in which said first interim processing means includes preconditioning means for preconditioning said polynomial divider, and a preconditioning store from which a preconditioning constant for preconditioning said polynomial divider is selected in dependence on said term, each term therefore having a different preconditioning constant in said preconditioning store.

15. The logic processor of claim 12 which further includes:

a second input matrix storing a set of second input representations, each second input representation comprising a multi-bit representation different from any other second input representation, each second input representation corresponding to one and only one first input representation, each said second input representation including a value bit in a specified location, wherein:

said processing means is also responsive to said second input matrix for deriving multi-bit values for output functions, said processing means including:

second interim processing means for summing, in said polynomial divider, each second input representation of a term located by said scanning means to produce a second sum;

said checking means further includes means for checking said second sum to determine whether or not a second sum passes a statistically significant output test, and writing a predetermined value for a second sum corresponding to a second sum which fails said output test.

16. The logic processor of claim 15 in which each of said second input representations is in conformance with a second specified code rule, and said statistically significant output test determines whether or not each said second sum conforms or does not conform to said second code rule.

17. The logic processor of claim 15 in which said second interim processing means includes preconditioning means for preconditioning said polynomial divider, and a preconditioning store from which a preconditioning constant for preconditioning said polynomial divider is selected in dependence on said term, each term therefore having a different preconditioning constant in said preconditioning store.

* * * * *